(12) United States Patent
Ohtake et al.

(10) Patent No.: US 8,228,620 B2
(45) Date of Patent: Jul. 24, 2012

(54) VARIABLE FOCAL LENGTH LENS SYSTEM AND IMAGE PICKUP DEVICE

(75) Inventors: Motoyuki Ohtake, Saitama (JP); Masayuki Murata, Tokyo (JP); Atsuo Kikuchi, Kanagawa (JP)

(73) Assignee: Sony Corporation, Tokyo (JP)

( * ) Notice: Subject to any disclaimer, the term of this patent is extended or adjusted under 35 U.S.C. 154(b) by 123 days.

(21) Appl. No.: 12/923,549

(22) Filed: Sep. 28, 2010

(65) Prior Publication Data

US 2011/0085248 A1    Apr. 14, 2011

(30) Foreign Application Priority Data

Oct. 1, 2009   (JP) .................................. 2009-229578
Oct. 26, 2009  (JP) .................................. P2009-245743

(51) Int. Cl.
 *G02B 9/60* (2006.01)
(52) U.S. Cl. ......................................................... 359/766
(58) Field of Classification Search ................... 359/766
See application file for complete search history.

(56) References Cited

U.S. PATENT DOCUMENTS 7,830,612 B2 * 11/2010 Hagiwara ..................... 359/676

FOREIGN PATENT DOCUMENTS

| JP | 2006-189598 | 7/2006 |
|---|---|---|
| JP | 2007-079194 | 3/2007 |
| JP | 2007-264174 | 10/2007 |
| JP | 2007-292994 | 11/2007 |

* cited by examiner

Primary Examiner — Joseph P Martinez
(74) Attorney, Agent, or Firm — Rader Fishman & Grauer, PLLC

(57) ABSTRACT

Disclosed herein is a variable focal length lens system including a first lens group, a second lens group, a third lens group, a fourth lens group, and a fifth lens group. The first to the fifth lens groups are arranged in order from an object side. The variable focal length lens system satisfies following conditional expressions (1) to (3):

$$0.95 < f13T/ft < 1.4 \quad (1)$$

$$0.08 < f2/f4 < 0.3 \quad (2)$$

$$0.06 < \Delta 3/ft < 0.22 \quad (3)$$

where f13T is combined focal length of the first to third lens groups in the telephoto end state, ft is focal length of the lens system as a whole in the telephoto end state, f2 is focal length of the second lens group, f4 is focal length of the fourth lens group, and Δ3 is an amount of travel of the third lens group from the wide-angle end state to the telephoto end state.

16 Claims, 35 Drawing Sheets

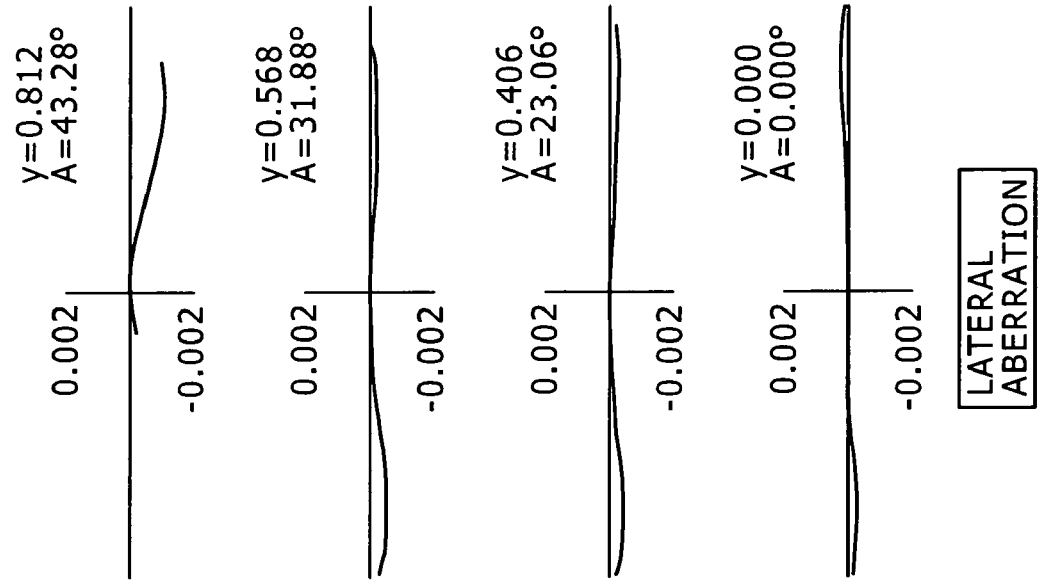
FIG. 3

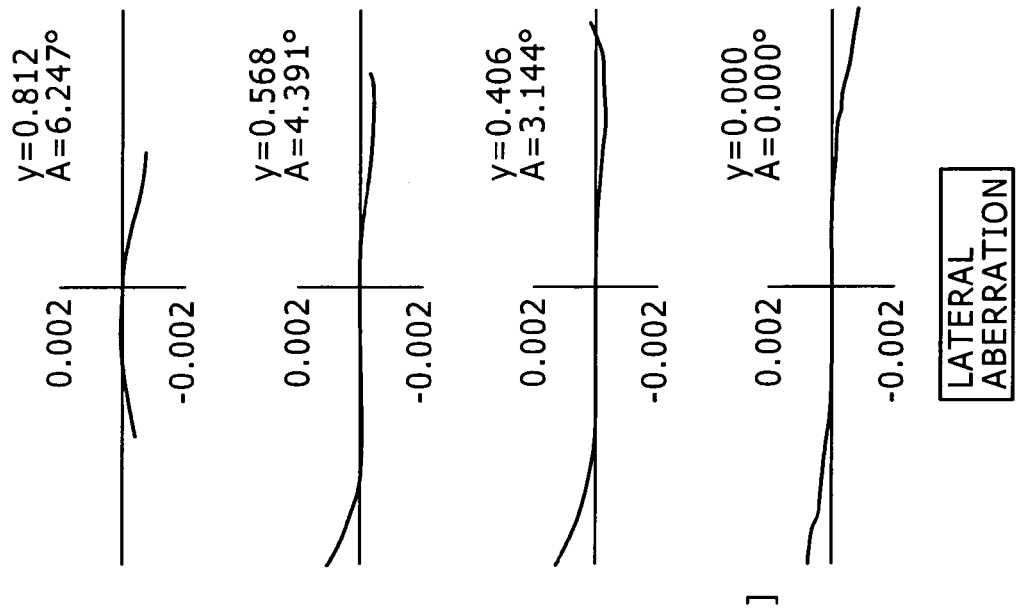
FIG. 5
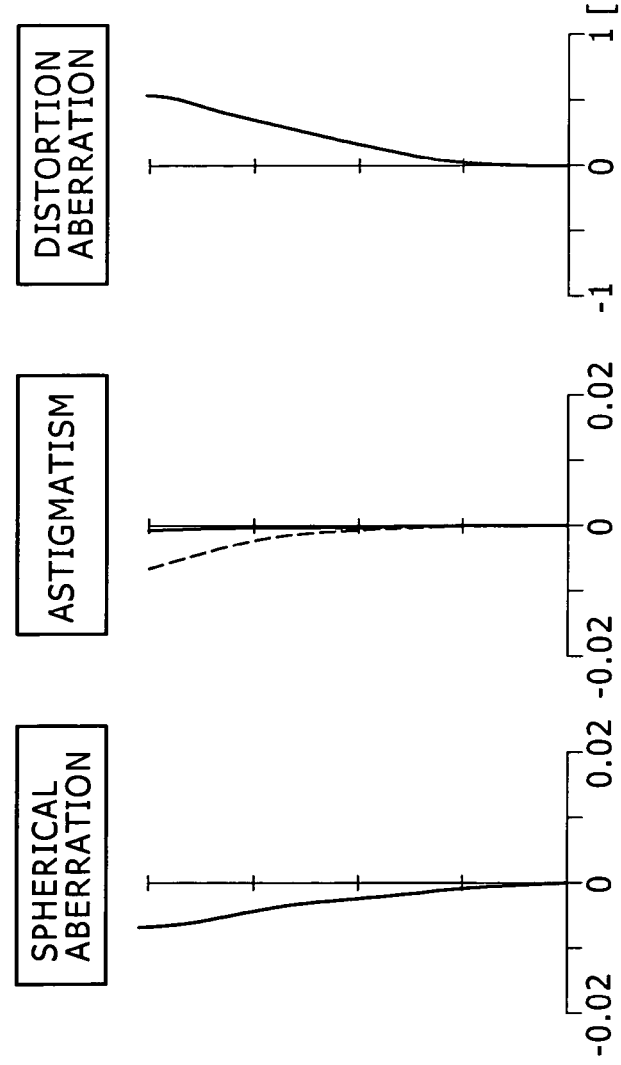

FIG. 6
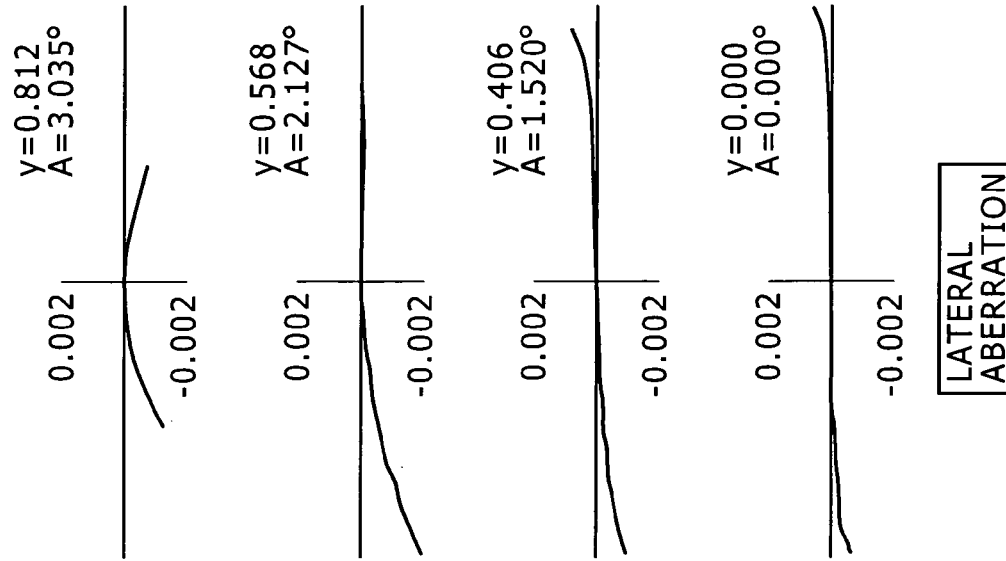
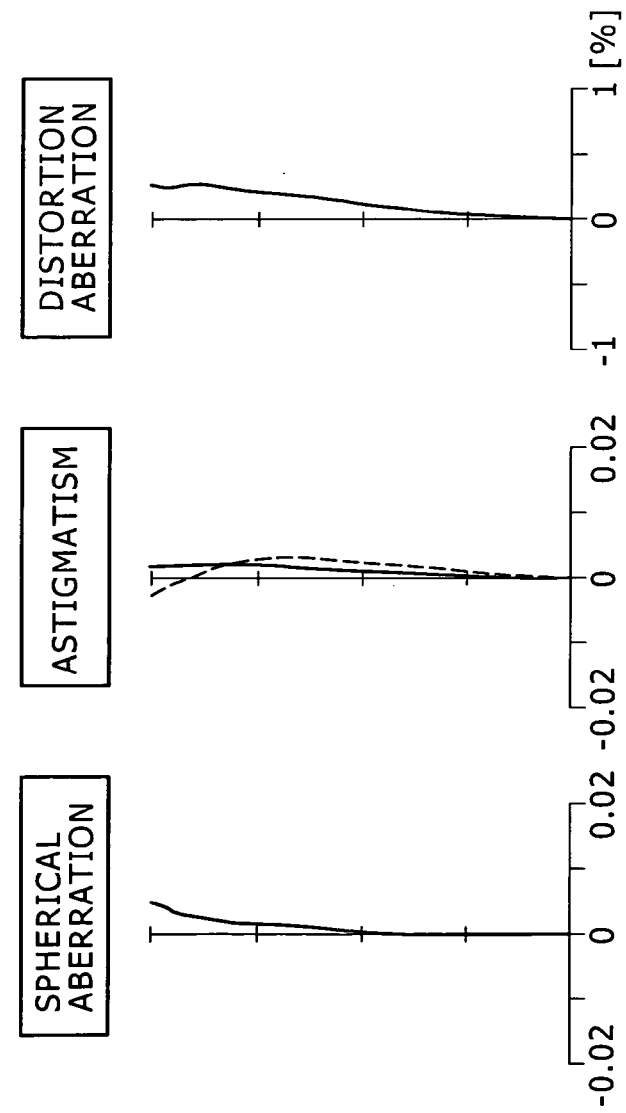

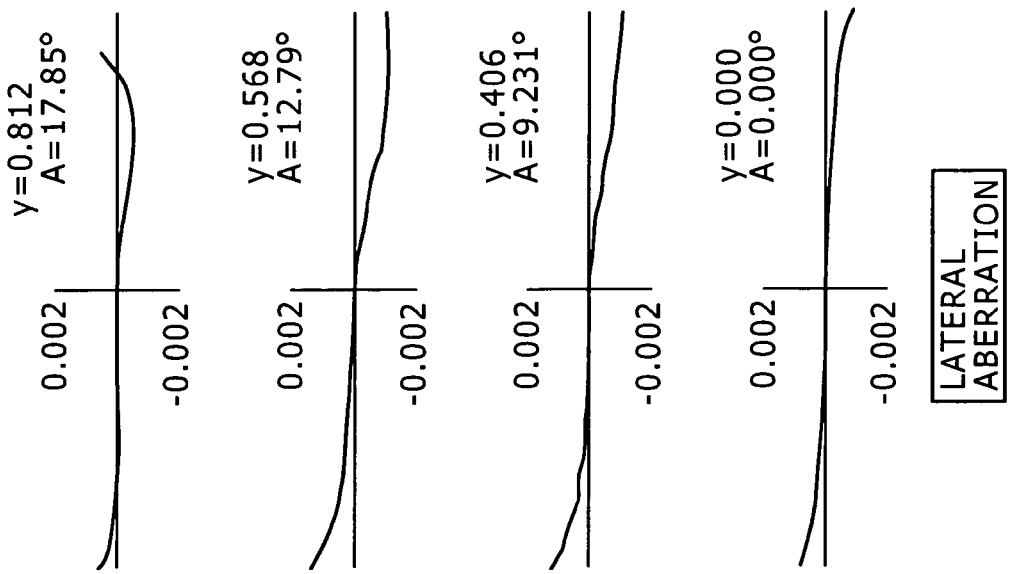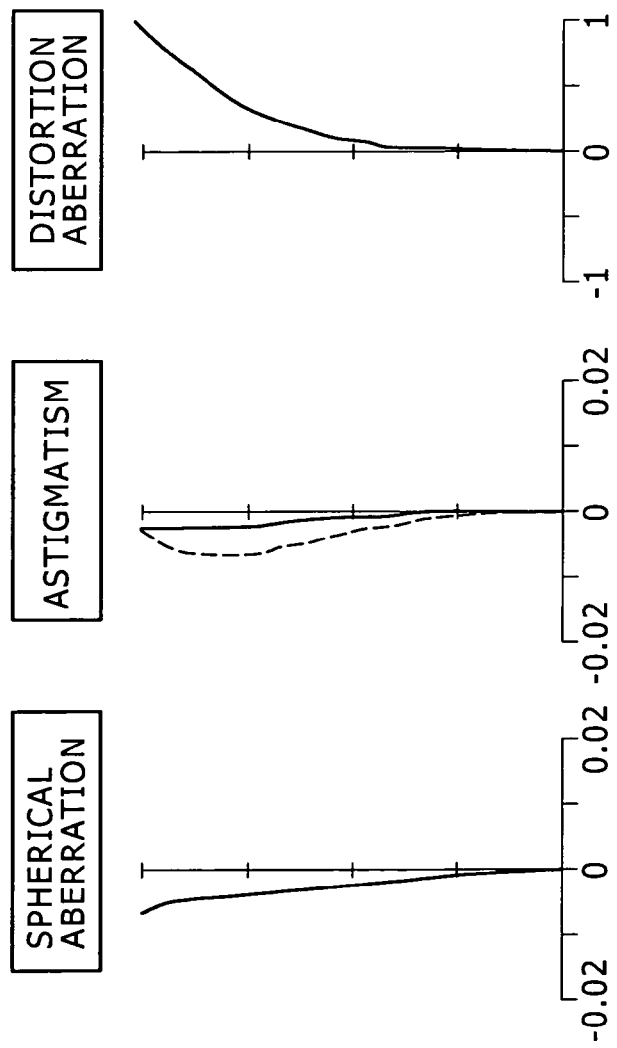
FIG. 16

VARIABLE FOCAL LENGTH LENS SYSTEM AND IMAGE PICKUP DEVICE

BACKGROUND OF THE INVENTION

1. Field of the Invention

The present invention relates to a variable focal length lens system and an image pickup device, and particularly to the technical field of a variable focal length lens system and an image pickup device that are used in a video camera, a digital still camera and the like, whose angle of view in a wide-angle end state exceeds 74 degrees, and whose variable power ratio exceeds 30 times.

2. Description of the Related Art

In the past, a method that converts an amount of light of a subject image formed on an image pickup element surface into electric output by an image pickup element using a photoelectric conversion element such as a CCD (Charge Coupled Device), a CMOS (Complementary Metal Oxide Semiconductor) or the like, and which records the electric output is known as recording means in a camera.

With the recent progress of microfabrication techniques, central processing units (CPU) have been increased in speed and storage media have been increased in degree of integration, so that high-volume image data that has heretofore been unable to be handled can be processed at higher speed. In addition, light receiving elements have been increased in degree of integration and reduced in size. The increased degree of integration has enabled recording of high spatial frequencies, and the reduced size has make it possible to miniaturize the camera as a whole.

However, the increased degree of integration and the reduced size as described above decreases the light receiving area of each individual photoelectric conversion element (light receiving element), and effect of noise is increased as electric output is decreased. Accordingly, in order to reduce such noise effect, an amount of light arriving on the light receiving element may be increased by a higher aperture ratio of an optical system. In addition, a minute lens element referred to as a microlens array may be disposed immediately in front of the light receiving element.

The microlens array leads a luminous flux going between elements adjacent to each other onto the light receiving elements, but limits the exit pupil position (distance from an image surface to the exit pupil position) of a lens system. This is because when the exit pupil position of the lens system approaches a light receiving element, an angle formed between a principal ray reaching the light receiving element and an optical axis is increased, thus an off-axis luminous flux going toward a peripheral part of a screen forms a great angle with the optical axis, and as a result, a necessary amount of light does not reach the light receiving element, thus inviting a lack of an amount of light.

User needs have recently been diversified as digital cameras spread. There is particularly a desire for a camera reduced in size and including a zoom lens having a high variable power ratio (variable focal length lens system).

A four-group configuration of a positive group, a negative group, a positive group, and a positive group has conventionally been used as a type representing a configuration of a variable focal length lens system having a high variable power ratio in the past.

The variable focal length lens system of the four-group configuration of a positive group, a negative group, a positive group, and a positive group is formed by arranging a first lens group having positive refractive power, a second lens group having negative refractive power, a third lens group having positive refractive power, and a fourth lens group having positive refractive power in order from an object side to an image side.

A variable focal length lens system described in Japanese Patent Laid-Open No. 2006-189598 (referred to as Patent Document 1 hereinafter), for example, is known as a variable focal length lens system of the four-group configuration of a positive group, a negative group, a positive group, and a positive group as described above.

It is generally known that as the number of movable lens groups is increased, a degree of freedom of selection of the locus of each lens group at a time of zooming from a wide-angle end state to a telephoto end state is increased, and it is therefore possible to achieve a higher variable power ratio and achieve higher performance as well.

Variable focal length lens systems described in Japanese Patent Laid-Open No. 2007-79194 and Japanese Patent Laid-Open No. 2007-292994 (hereinafter referred to as Patent Document 2 and Patent Document 3, respectively), for example, are known as variable focal length lens systems that achieve such a higher variable power ratio and such higher performance.

The variable focal length lens systems described in Patent Document 2 and Patent Document 3 have a configuration in which a fifth lens group fixed in the direction of an optical axis is disposed on the image side of a variable focal length lens system of a four-group configuration of a positive group, a negative group, a positive group, and a positive group.

In addition, a variable focal length lens system of a five-group configuration of a positive group, a negative group, a positive group, a negative group, and a positive group described in Japanese Patent Laid-Open No. 2007-264174 (referred to as Patent Document 4 hereinafter), for example, is known as a variable focal length lens system of another five-group configuration. The variable focal length lens system of the five-group configuration of a positive group, a negative group, a positive group, a negative group, and a positive group is formed by arranging a first lens group having positive refractive power, a second lens group having negative refractive power, a third lens group having positive refractive power, a fourth lens group having negative refractive power, and a fifth lens group having positive refractive power in order from an object side to an image side.

In the variable focal length lens system described in Patent Document 4, when a lens position state changes from a wide-angle end state to a telephoto end state, the first lens group and the third lens group move to the object side, the second lens group moves to the object side after once moving to the image side, the fourth lens group is fixed in the direction of an optical axis, and the fifth lens group moves in the direction of the optical axis.

SUMMARY OF THE INVENTION

However, when a variable power ratio exceeding 20 times is to be secured in the variable focal length lens system of the four-group configuration of a positive group, a negative group, a positive group, and a positive group, it is difficult to achieve sufficient miniaturization.

Specifically, the variable power ratio of the variable focal length lens system can be heightened without increasing total optical length by strengthening the refractive power of each lens group. However, when the refractive power of each lens group is strengthened, variation in various aberrations which variation occurs at a time of change in focal length may not be corrected. Thus, when a high variable power ratio is to be secured by strengthening the refractive power of each lens group, predetermined optical performance may not be obtained. Consequently, to secure a high variable power ratio and obtain predetermined optical performance as well, it is difficult to avoid a size increase.

When the number of movable lens groups is increased by making the variable focal length lens system have a five-group configuration, on the other hand, a degree of freedom of selection of the locus of each lens group at a time of zooming is increased. Thus, variation in various aberrations which variation occurs at a time of change in focal length can be corrected excellently, and higher variable power and smaller size can be achieved.

However, the variable focal length lens systems described in Patent Document 2 and Patent Document 3 have a fifth lens group as a fixed group disposed on the image side of the four-group configuration of a positive group, a negative group, a positive group, and a positive group, and are not of a configuration in which a movable lens group is added to the four-group configuration. It is therefore difficult to achieve both even higher variable power and smaller size.

In addition, in the case of the variable focal length lens system described in Patent Document 4, total lens length in the telephoto end state is not shortened sufficiently. When the variable power ratio is to be heightened, it is difficult to achieve sufficient miniaturization.

It is accordingly desirable to overcome the above-described problems, and ensure miniaturization and achieve higher variable power as well.

According to an embodiment of the present invention, there is provided a variable focal length lens system including a first lens group having positive refractive power, a second lens group having negative refractive power, a third lens group having positive refractive power, a fourth lens group having negative refractive power, and a fifth lens group having positive refractive power, the first lens group, the second lens group, the third lens group, the fourth lens group, and the fifth lens group being arranged in order from an object side, wherein when a lens position state is changed from a wide-angle end state to a telephoto end state, each lens group moves such that an air interval between the first lens group and the second lens group is increased, an air interval between the second lens group and the third lens group is decreased, an air interval between the third lens group and the fourth lens group is increased, and an air interval between the fourth lens group and the fifth lens group is changed, the second lens group moves to an image side, the third lens group moves to the object side, the first lens group is situated on the object side in the telephoto end state as compared with the wide-angle end state, and an aperture stop is disposed in proximity to the third lens group, and the variable focal length lens system satisfies following conditional expressions (1) to (3):

$$0.95 < f13T/ft < 1.4 \quad (1)$$

$$0.08 < f2/f4 < 0.3 \quad (2)$$

$$0.06 < \Delta 3/ft < 0.22 \quad (3)$$

where f13T is combined focal length of the first to third lens groups in the telephoto end state, ft is focal length of the lens system as a whole in the telephoto end state, f2 is focal length of the second lens group, f4 is focal length of the fourth lens group, and $\Delta 3$ is an amount of travel of the third lens group from the wide-angle end state to the telephoto end state.

This conditional expression (1) defines the combined focal length f13T of the first to third lens groups in the telephoto end state, and is to miniaturize a lens system as a whole due to strengthened combined refractive power of the first to third lens groups.

This variable focal length lens system is characterized in that a maximum value of the conditional expression (1) is lower than a value in the related art in order to shorten total lens length while increasing a zoom ratio.

When f13T/ft exceeds the upper limit value of the conditional expression (1), the total lens length of the variable focal length lens system in the telephoto end state is lengthened, and thus the variable focal length lens system is increased in size, which is contrary to the spirit of the present invention.

When f13T/ft is less than the lower limit value of the conditional expression (1), the magnification of the fourth lens group in the variable focal length lens system in the telephoto end state is increased, and it is difficult to excellently correct variation in axial aberration which variation is attendant on change in the lens position state.

The conditional expression (2) defines a refractive power ratio between the second lens group and the fourth lens group, and is to excellently correct negative distortion aberration that tends to occur in the wide-angle end state due to making refractive power arrangements in front of and in the rear of the aperture stop closer to a symmetric type.

When f2/f4 exceeds the upper limit value of the conditional expression (2), the variable focal length lens system strengthens the negative refractive power of the fourth lens group and weakens the negative refractive power of the second lens group at the same time, an off-axis luminous flux incident on the first lens group in the wide-angle end state goes away from an optical axis, and the lens diameter of the first lens group is increased.

As a result, in the variable focal length lens system, it is difficult to excellently correct off-axis aberration occurring in a peripheral part of a screen in the wide-angle end state, and the variable focal length lens system may not be miniaturized sufficiently.

When f2/f4 is less than the lower limit value of the conditional expression (2), the variable focal length lens system strengthens the negative refractive power of the second lens group and weakens the negative refractive power of the fourth lens group at the same time, and an off-axis luminous flux passing the second lens group in the wide-angle end state approaches the optical axis.

As a result, in the variable focal length lens system, there is no difference in range of passage between the height of the off-axis luminous flux passing through the second lens group in the wide-angle end state and the height of the off-axis luminous flux passing through the second lens group in the telephoto end state. It is thus difficult to correct a variation in off-axis aberration and a variation in axial aberration, which variations occur as the lens position state is changed, in a well-balanced manner.

The conditional expression (3) defines a ratio between the amount $\Delta 3$ of travel of the third lens group, the amount $\Delta 3$ of travel of the third lens group being attendant on change in the lens position state, and the focal length ft in the telephoto end state, and is to achieve a high variable power ratio by increasing combinations such that lens groups adjacent to each other have opposite refractive powers.

When $\Delta 3$/ft exceeds the upper limit value of the conditional expression (3), the amount of travel of the third lens group in the variable focal length lens system is increased, a distance between the third lens group and an image surface changes greatly, and variation in exit pupil position which variation is attendant on the lens position state is increased.

As a result, in the variable focal length lens system, the off-axis luminous flux passing through the fifth lens group in the telephoto end state is greatly separated from the optical axis, and it is difficult to excellently correct coma aberration occurring in a peripheral part of a screen.

When Δ3/ft is less than the lower limit value of the conditional expression (3), on the other hand, the third lens group remains in a similar position regardless of the lens position state of the variable focal length lens system, and the lateral magnification of the second lens group greatly changes in the wide-angle end state and the telephoto end state.

As a result, the variable focal length lens system may not excellently correct variation in off-axis aberration which variation is attendant on change in the lens position state, and it is difficult to improve the performance of the variable focal length lens system sufficiently.

In addition, according to an embodiment of the present invention, there is provided an image pickup device including: a variable focal length lens system; and an image pickup element for converting an optical image formed by the variable focal length lens system into an electric signal; wherein the variable focal length lens system includes a first lens group having positive refractive power, a second lens group having negative refractive power, a third lens group having positive refractive power, a fourth lens group having negative refractive power, and a fifth lens group having positive refractive power, the first lens group, the second lens group, the third lens group, the fourth lens group, and the fifth lens group being arranged in order from an object side, when a lens position state is changed from a wide-angle end state to a telephoto end state, each lens group moves such that an air interval between the first lens group and the second lens group is increased, an air interval between the second lens group and the third lens group is decreased, an air interval between the third lens group and the fourth lens group is increased, and an air interval between the fourth lens group and the fifth lens group is changed, the second lens group moves to an image side, the third lens group moves to the object side, the first lens group is situated on the object side in the telephoto end state as compared with the wide-angle end state, and an aperture stop is disposed in proximity to the third lens group, and the variable focal length lens system satisfies following conditional expressions (1) to (3):

$$0.95 < f13T/ft < 1.4 \quad (1)$$

$$0.08 < f2/f4 < 0.3 \quad (2)$$

$$0.06 < \Delta 3/ft < 0.22 \quad (3)$$

where f13T is combined focal length of the first to third lens groups in the telephoto end state, ft is focal length of the lens system as a whole in the telephoto end state, f2 is focal length of the second lens group, f4 is focal length of the fourth lens group, and Δ3 is an amount of travel of the third lens group from the wide-angle end state to the telephoto end state.

In the variable focal length lens system of the image pickup device, the conditional expression (1) defines the combined focal length f13T of the first to third lens groups in the telephoto end state, and is to miniaturize a lens system as a whole due to strengthened combined refractive power of the first to third lens groups.

In this variable focal length lens system, a maximum value of the conditional expression (1) is lower than a value in the related art in order to shorten total lens length while increasing a zoom ratio.

When f13T/ft exceeds the upper limit value of the conditional expression (1), the total lens length of the variable focal length lens system in the telephoto end state is lengthened, and thus the variable focal length lens system is increased in size, which is contrary to the spirit of the present invention.

When f13T/ft is less than the lower limit value of the conditional expression (1), the magnification of the fourth lens group in the variable focal length lens system in the telephoto end state is increased, and it is difficult to excellently correct variation in axial aberration which variation is attendant on change in the lens position state.

The conditional expression (2) defines a refractive power ratio between the second lens group and the fourth lens group, and is to excellently correct negative distortion aberration that tends to occur in the wide-angle end state due to making refractive power arrangements in front of and in the rear of the aperture stop closer to a symmetric type.

When f2/f4 exceeds the upper limit value of the conditional expression (2), the variable focal length lens system strengthens the negative refractive power of the fourth lens group and weakens the negative refractive power of the second lens group at the same time, an off-axis luminous flux incident on the first lens group in the wide-angle end state goes away from an optical axis, and the lens diameter of the first lens group is increased.

As a result, in the variable focal length lens system, it is difficult to excellently correct off-axis aberration occurring in a peripheral part of a screen in the wide-angle end state, and the variable focal length lens system may not be miniaturized sufficiently.

When f2/f4 is less than the lower limit value of the conditional expression (2), the variable focal length lens system strengthens the negative refractive power of the second lens group and weakens the negative refractive power of the fourth lens group at the same time, and an off-axis luminous flux passing the second lens group in the wide-angle end state approaches the optical axis.

As a result, in the variable focal length lens system, there is no difference in range of passage between the height of the off-axis luminous flux passing through the second lens group in the wide-angle end state and the height of the off-axis luminous flux passing through the second lens group in the telephoto end state. It is thus difficult to correct a variation in off-axis aberration and a variation in axial aberration, which variations occur as the lens position state is changed, in a well-balanced manner.

The conditional expression (3) defines a ratio between the amount Δ3 of travel of the third lens group, the amount Δ3 of travel of the third lens group being attendant on change in the lens position state, and the focal length ft in the telephoto end state, and is to achieve a high variable power ratio by increasing combinations such that lens groups adjacent to each other have opposite refractive powers.

When Δ3/ft exceeds the upper limit value of the conditional expression (3), the amount of travel of the third lens group in the variable focal length lens system is increased, a distance between the third lens group and an image surface changes greatly, and variation in exit pupil position which variation is attendant on the lens position state is increased.

As a result, in the variable focal length lens system, the off-axis luminous flux passing through the fifth lens group in the telephoto end state is greatly separated from the optical axis, and it is difficult to excellently correct coma aberration occurring in a peripheral part of a screen.

When Δ3/ft is less than the lower limit value of the conditional expression (3), on the other hand, the third lens group remains in a similar position regardless of the lens position state of the variable focal length lens system, and the lateral magnification of the second lens group greatly changes in the wide-angle end state and the telephoto end state.

As a result, the variable focal length lens system may not excellently correct variation in off-axis aberration which variation is attendant on change in the lens position state, and it is difficult to improve the performance of the variable focal length lens system sufficiently.

Another variable focal length lens system is formed by arranging a first lens group having positive refractive power, a second lens group having negative refractive power, a third lens group having positive refractive power, a fourth lens group having negative refractive power, and a fifth lens group having positive refractive power in order from an object side to an image side, wherein when a lens position state is changed from a wide-angle end state to a telephoto end state, the first lens group, the fourth lens group, and the fifth lens group move in a direction of an optical axis, the second lens group moves to the image side, and the third lens group moves to the object side such that an interval between the first lens group and the second lens group is increased, an interval between the second lens group and the third lens group is decreased, an interval between the third lens group and the fourth lens group is increased, and an interval between the fourth lens group and the fifth lens group is changed, the first lens group is situated on the object side in the telephoto end state as compared with the wide-angle end state, an aperture stop moves integrally with the third lens group, and the other variable focal length lens system satisfies following conditional expressions (9) and (10):

$$0.4 < f1/ft < 0.6 \tag{9}$$

$$0.15 < \Delta 1/ft < 0.45 \tag{10}$$

where f1 is focal length of the first lens group, ft is focal length of the lens system as a whole in the telephoto end state, and Δ1 is an amount of travel of the first lens group from the wide-angle end state to the telephoto end state.

Thus, in the other variable focal length lens system, adequate refractive power of the first lens group is secured, and the amount of travel of the first lens group is reduced.

The other variable focal length lens system described above desirably satisfies a following conditional expression (11):

$$0.8 < Lt/ft < 1.1 \tag{11}$$

where Lt is total length in the telephoto end state.

When the other variable focal length lens system satisfies the conditional expression (11), an adequate travel distance of each group from a wide-angle end to a telephoto end is secured, and the occurrence of aberrations is suppressed.

The other variable focal length lens system described above desirably satisfies a following conditional expression (12):

$$-2.5 < f4/(fw \cdot ft)^{1/2} < -1.3 \tag{12}$$

where f4 is focal length of the fourth lens group, and fw is focal length of the lens system as a whole in the wide-angle end state.

When the other variable focal length lens system satisfies the conditional expression (12), an adequate refractive power of the fourth lens group is secured, and off-axis aberration can be corrected excellently.

In the other variable focal length lens system described above, the first lens group is desirably formed by a cemented lens formed by joining together a negative lens situated on the object side and a positive lens situated on the image side and a positive lens situated on the image side of the cemented lens.

The first lens group formed as described above suppresses the occurrence of spherical aberration and chromatic aberration.

In the other variable focal length lens system described above, the second lens group is desirably formed by a cemented lens formed by joining together a negative lens of a biconcave shape situated on the object side and a positive lens of a biconvex shape situated on the image side and a negative lens of a meniscus shape situated on the object side of the cemented lens and having a concave surface facing the image side.

The second lens group formed as described above suppresses the occurrence of off-axis aberration.

In the other variable focal length lens system described above, the third lens group is desirably formed by a cemented lens formed by joining together a positive lens of a biconvex shape situated on the object side and a negative lens of a biconcave shape situated on the image side and a positive lens situated on the image side of the cemented lens.

The third lens group formed as described above suppresses variation in spherical aberration.

In the other variable focal length lens system described above, the fourth lens group is desirably formed by a negative lens of a biconcave shape.

The fourth lens group formed as described above suppresses variation in spherical aberration.

In the other variable focal length lens system described above, the fifth lens group is desirably formed by a cemented lens formed by joining together a positive lens of a biconvex shape situated on the object side and a negative lens of a meniscus shape situated on the image side and having a concave surface facing the object side.

The fifth lens group formed as described above suppresses aberration variation occurring according to a photographing distance.

Another image pickup device includes: a variable focal length lens system; and an image pickup element for converting an optical image formed by the variable focal length lens system into an electric signal; wherein the variable focal length lens system is formed by arranging a first lens group having positive refractive power, a second lens group having negative refractive power, a third lens group having positive refractive power, a fourth lens group having negative refractive power, and a fifth lens group having positive refractive power in order from an object side to an image side, wherein the first lens group, the fourth lens group, and the fifth lens group move in a direction of an optical axis, the second lens group moves to the image side, the third lens group moves to the object side, and the first lens group is situated on the object side in a telephoto end state as compared with a wide-angle end state such that when a lens position state is changed from the wide-angle end state to the telephoto end state, an interval between the first lens group and the second lens group is increased, an interval between the second lens group and the third lens group is decreased, an interval between the third lens group and the fourth lens group is increased, and an interval between the fourth lens group and the fifth lens group is changed, and an aperture stop moves integrally with the third lens group, and the other variable focal length lens system satisfies following conditional expressions (9) and (10):

$$0.4 < f1/ft < 0.6 \tag{9}$$

$$0.15 < \Delta 1/ft < 0.45 \tag{10}$$

where f1 is focal length of the first lens group, ft is focal length of the lens system as a whole in the telephoto end state, and Δ1 is an amount of travel of the first lens group from the wide-angle end state to the telephoto end state.

Thus, in the other image pickup device, adequate refractive power of the first lens group is secured, and the amount of travel of the first lens group is reduced.

The variable focal length lens system according to an embodiment of the present invention and another embodiment of the present invention can achieve both a much higher variable power ratio and a much smaller size than the related art.

In addition, the image pickup device according to the above-described embodiment of the present invention can achieve much higher performance by a variable focal length lens system that achieves both a much higher variable power ratio and a much smaller size than the related art.

BRIEF DESCRIPTION OF THE DRAWINGS

FIG. 3, in conjunction with FIGS. 4 to 7, is a diagram of aberrations of a numerical example in which concrete numerical values are applied to the first embodiment, the present diagram showing spherical aberration, astigmatism, distortion aberration, and lateral aberration in a wide-angle end state;

FIG. 5 is a diagram showing spherical aberration, astigmatism, distortion aberration, and lateral aberration in a second intermediate focal length state;

FIG. 6 is a diagram showing spherical aberration, astigmatism, distortion aberration, and lateral aberration in a third intermediate focal length state;

FIG. 16 is a diagram showing spherical aberration, astigmatism, distortion aberration, and lateral aberration in a first intermediate focal length state;

DETAILED DESCRIPTION OF THE PREFERRED EMBODIMENTS

Figure 1:
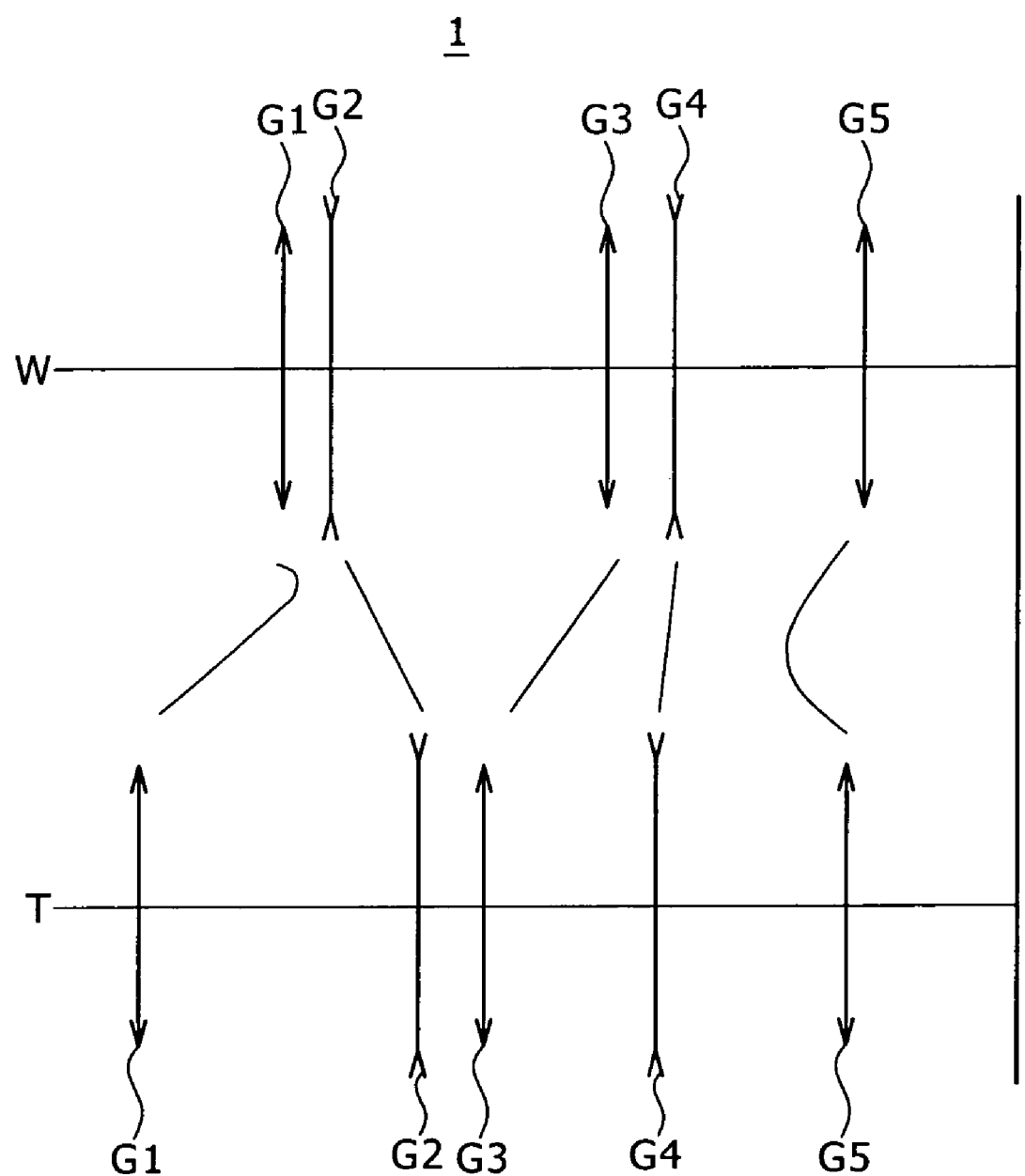
FIG. 1 is a diagram showing a refractive power distribution in each embodiment of a variable focal length lens system according to the present invention.

In the present invention, a lens system whose focusing point changes with change in focal length will be referred to as a variable focal length lens system. On the other hand, a zoom lens is a lens system whose focusing point does not change even when focal length is changed, and is thus positioned as one of variable focal length lens systems.

[Variable Focal Length Lens System According to an Embodiment of the Present Invention and Image Pickup Device According to an Embodiment of the Present Invention]

The best modes for carrying out a variable focal length lens system according to the present invention and an image pickup device according to the present invention (embodiments) will hereinafter be described.

[Configuration of Variable Focal Length Lens System]

A variable focal length lens system according to an embodiment of the present invention includes a first lens group having positive refractive power, a second lens group having negative refractive power, a third lens group having positive refractive power, a fourth lens group having negative refractive power, and a fifth lens group having positive refractive power in order from an object side.

Specifically, in the variable focal length lens system, when a lens position state is changed from a wide-angle end state to a telephoto end state, an air interval between the first lens group and the second lens group is increased, an air interval between the second lens group and the third lens group is decreased, an air interval between the third lens group and the fourth lens group is increased, and an air interval between the fourth lens group and the fifth lens group is changed, and the first lens group moves to the object side after once moving to an image side, the second lens group moves to the image side, the third lens group moves to the object side, the fourth lens group is movable in a direction of an optical axis, and the fifth lens group moves so as to compensate for variation in an image surface position, the variation in the image surface position being attendant on movement of each lens group.

Incidentally, in the variable focal length lens system, an aperture stop is disposed in the vicinity of the third lens group, for example on the object side of the third lens group, and moves in a state of being independent of the third lens group.

Three effects [A], [B], and [C] in the following are achieved by disposing the fourth lens group having negative refractive power in the variable focal length lens system.

[A] The lens system as a whole is miniaturized by strengthening combined refractive power of the first to third lens groups in a positive direction.

[B] Distortion aberration is corrected excellently by making refractive power arrangement of the lens system as a whole close to a symmetric type.

[C] Degradation in optical performance which degradation is attendant on increase in magnification is prevented by increasing lens groups with a power varying effect.

In a four-group type zoom lens having positive, negative, positive, and positive power, on the other hand, combined refractive power of the first to third lens groups is weak, and it is difficult to shorten total lens length.

This is because the four-group type zoom lens having positive, negative, positive, and positive power is formed by dividing the third lens group of a three-group type zoom lens having positive, negative, and positive power into two positive lens groups, and the four-group type zoom lens has a desire of suppressing variation in off-axis aberration which variation is attendant on change in a lens position state by changing an interval between the two positive lens groups.

In this case, by forming the four-group type zoom lens having positive, negative, positive, and positive power such that light rays between the third lens group and the fourth lens group are substantially collimated light, spherical aberration does not change but only off-axis aberration changes when an interval between the two lens groups, that is, the third lens group and the fourth lens group is changed.

In actuality, in the variable focal length lens system, by disposing the fourth lens group having negative refractive power between the first to third lens groups and the fifth lens group, the combined refractive power of the first to third lens groups can be strengthened. As a result, mutual intervals between the first to third lens groups are shortened, and thus the total lens length can be shortened. The variable focal length lens system can thereby provide the above effect [A].

In addition, the variable focal length lens system includes the first to fifth lens groups that are positive, negative, positive, negative, and positive, respectively, and has an aperture stop disposed in the vicinity of the third lens group, whereby at least one positive lens and one negative lens can be arranged on the object side and the image side of the aperture stop.

As a result, in the variable focal length lens system, refractive power arrangements in front of and in the rear of the aperture stop approximates a symmetric type, and negative distortion aberration, which tends to occur in a wide-angle end state, can be corrected excellently. The variable focal length lens system can thereby provide the above effect [B].

Functions of each lens group in the variable focal length lens system will be described. In general, letting $\phi A$ and $\phi B$ be the refractive powers of two lens groups GA and GB, and letting d be an interval between the lens groups GA and GB, a combined refractive power $\phi$ is expressed as $\phi = \phi A + \phi B - \phi A \cdot \phi B \cdot d$.

When the refractive powers of the lens groups GA and GB have different signs, the refractive powers of the two lens groups GA and GB cancel each other out, so that $\phi A + \phi B$ of the combined refractive power $\phi$ has a low value and $\phi A \cdot \phi B$ remains. This means that $\phi A \cdot \phi B$ greatly affects the combined refractive power $\phi$, and the combined refractive power $\phi$ changes easily when the interval d is changed.

When the refractive powers of the lens groups GA and GB have an identical sign, on the other hand, the refractive powers of the two lens groups GA and GB strengthen each other, so that $\phi A + \phi B$ of the combined refractive power $\phi$ has a high value. This means that $\phi A + \phi B$ greatly affects the combined refractive power $\phi$, and the combined refractive power $\phi$ changes to a small degree when the interval d is changed.

That is, a high variable power ratio can be achieved by increasing combinations such that lens groups adjacent to each other have opposite refractive powers. Thus, by arranging the first to fifth lens groups that are positive, negative, positive, negative, and positive, respectively, in order from the object side, the variable focal length lens system can thereby provide the above effect [C].

An aberration correcting function of the variable focal length lens system will next be described. In a wide-angle end state, an off-axis luminous flux passing through the first lens group and the second lens group is distant from an optical axis because of a wide angle of view. Thus, in the variable focal length lens system, the off-axis luminous flux passing through the first lens group is prevented from spreading too much by arranging the first lens group and the second lens group in proximity to each other.

The variable focal length lens system narrows the angle of view and shortens a distance between the second lens group and the aperture stop when the lens position state is changed from the wide-angle end state to a telephoto end state, so that the off-axis luminous flux passing through the first lens group and the second lens group approaches the optical axis.

Therefore, the variable focal length lens system can excellently correct variation in off-axis aberration which variation is attendant on change in the lens position state using such change in height of the off-axis luminous flux passing through the first lens group and the second lens group.

In the variable focal length lens system, the fourth lens group and the fifth lens group are arranged on the image side of the aperture stop, so that distances between the aperture stop, the fourth lens group, and the fifth lens group change when the lens position state is changed.

As a result, in the variable focal length lens system, the height of the off-axis luminous flux passing through the fourth lens group and the fifth lens group changes, and thus variation in off-axis aberration which variation is attendant on change in the lens position state can be corrected excellently.

Features of the variable focal length lens system using conditional expressions will next be described concretely. In actuality, a variable focal length lens system includes a first lens group having positive refractive power, a second lens group having negative refractive power, a third lens group having positive refractive power, a fourth lens group having negative refractive power, and a fifth lens group having positive refractive power, the first lens group, the second lens group, the third lens group, the fourth lens group, and the fifth lens group being arranged in order from an object side, wherein when a lens position state is changed from a wide-angle end state to a telephoto end state, each lens group moves such that an air interval between the first lens group and the second lens group is increased, an air interval between the second lens group and the third lens group is decreased, an air interval between the third lens group and the fourth lens group is increased, and an air interval between the fourth lens group and the fifth lens group is changed, the second lens group moves to an image side, the third lens group moves to the object side, the first lens group is situated on the object side in the telephoto end state as compared with the wide-angle end state, and an aperture stop is disposed in proximity to the third lens group, and the variable focal length lens system satisfies the following conditional expression (1):

$$0.95 < f13T/ft < 1.4 \tag{1}$$

where f13T is combined focal length of the first to third lens groups in the telephoto end state, and ft is focal length of the lens system as a whole in the telephoto end state.

This conditional expression (1) defines the combined focal length f13T of the first to third lens groups in the telephoto end state, and is to provide the above effect [A] due to strengthened combined refractive power of the first to third lens groups.

This variable focal length lens system is characterized in that a maximum value of the conditional expression (1) is lower than a value in the related art in order to shorten total lens length while increasing a zoom ratio.

When f13T/ft exceeds the upper limit value of the conditional expression (1), the total lens length of the variable focal length lens system in the telephoto end state is lengthened, and thus the variable focal length lens system is increased in size, which is contrary to the spirit of the present invention.

When f13T/ft is less than the lower limit value of the conditional expression (1), the magnification of the fourth lens group in the variable focal length lens system in the telephoto end state is increased, and it is difficult to excellently correct variation in axial aberration which variation is attendant on change in the lens position state.

In addition, a variable focal length lens system includes a first lens group having positive refractive power, a second lens group having negative refractive power, a third lens group having positive refractive power, a fourth lens group having negative refractive power, and a fifth lens group having positive refractive power, the first lens group, the second lens group, the third lens group, the fourth lens group, and the fifth lens group being arranged in order from an object side, wherein when a lens position state is changed from a wide-angle end state to a telephoto end state, each lens group moves such that an air interval between the first lens group and the second lens group is increased, an air interval between the second lens group and the third lens group is decreased, an air interval between the third lens group and the fourth lens group is increased, and an air interval between the fourth lens group and the fifth lens group is changed, the second lens group moves to an image side, the third lens group moves to the object side, the first lens group is situated on the object side in the telephoto end state as compared with the wide-angle end state, and an aperture stop is disposed in proximity to the third lens group, and the variable focal length lens system satisfies the following conditional expression (2):

$$0.08 < f2/f4 < 0.3 \tag{2}$$

where f2 is focal length of the second lens group, and f4 is focal length of the fourth lens group.

The conditional expression (2) defines a refractive power ratio between the second lens group and the fourth lens group, and is to provide the above effect [B] due to making refractive power arrangements in front of and in the rear of the aperture stop closer to a symmetric type.

When f2/f4 exceeds the upper limit value of the conditional expression (2), the variable focal length lens system strengthens the negative refractive power of the fourth lens group and weakens the negative refractive power of the second lens group at the same time, an off-axis luminous flux incident on the first lens group in the wide-angle end state goes away from an optical axis, and the lens diameter of the first lens group is increased.

As a result, in the variable focal length lens system, it is difficult to excellently correct off-axis aberration occurring in a peripheral part of a screen in the wide-angle end state, and the variable focal length lens system may not be miniaturized sufficiently.

When f2/f4 is less than the lower limit value of the conditional expression (2), the variable focal length lens system strengthens the negative refractive power of the second lens group and weakens the negative refractive power of the fourth lens group at the same time, and an off-axis luminous flux passing the second lens group in the wide-angle end state approaches the optical axis.

As a result, in the variable focal length lens system, there is no difference in range of passage between the height of the off-axis luminous flux passing through the second lens group in the wide-angle end state and the height of the off-axis luminous flux passing through the second lens group in the telephoto end state. It is thus difficult to correct a variation in off-axis aberration and a variation in axial aberration, which variations occur as the lens position state is changed, in a well-balanced manner.

Further, a variable focal length lens system includes a first lens group having positive refractive power, a second lens group having negative refractive power, a third lens group having positive refractive power, a fourth lens group having negative refractive power, and a fifth lens group having positive refractive power, the first lens group, the second lens group, the third lens group, the fourth lens group, and the fifth lens group being arranged in order from an object side, wherein when a lens position state is changed from a wide-angle end state to a telephoto end state, each lens group moves such that an air interval between the first lens group and the second lens group is increased, an air interval between the second lens group and the third lens group is decreased, an air interval between the third lens group and the fourth lens group is increased, and an air interval between the fourth lens group and the fifth lens group is changed, the second lens group moves to an image side, the third lens group moves to the object side, the first lens group is situated on the object side in the telephoto end state as compared with the wide-angle end state, and an aperture stop is disposed in proximity to the third lens group, and the variable focal length lens system satisfies the following conditional expression (3):

$$0.06<\Delta 3/ft<0.22 \tag{3}$$

where ft is focal length of the lens system as a whole in the telephoto end state, and Δ3 is an amount of travel of the third lens group from the wide-angle end state to the telephoto end state.

The conditional expression (3) defines a ratio between the amount Δ3 of travel of the third lens group, the amount Δ3 of travel of the third lens group being attendant on change in the lens position state, and the focal length ft in the telephoto end state, and is to provide the above effect [C].

Letting Z be a zoom ratio (ft/fw), the denominator ft of the conditional expression (3) can be written as ft=fw·Z. Then, the conditional expression (3) can also be said to define Δ3/Z by replacing the denominator ft with fw·Z and normalizing the fw.

When Δ3/ft exceeds the upper limit value of the conditional expression (3), the amount of travel of the third lens group in the variable focal length lens system is increased, a distance between the third lens group and an image surface changes greatly, and variation in exit pupil position which variation is attendant on the lens position state is increased.

As a result, in the variable focal length lens system, the off-axis luminous flux passing through the fifth lens group in the telephoto end state is greatly separated from the optical axis, and it is difficult to excellently correct coma aberration occurring in a peripheral part of a screen.

When Δ3/ft is less than the lower limit value of the conditional expression (3), on the other hand, the third lens group remains in a similar position regardless of the lens position state of the variable focal length lens system, and the lateral magnification of the second lens group greatly changes in the wide-angle end state and the telephoto end state.

As a result, the variable focal length lens system may not excellently correct variation in off-axis aberration which variation is attendant on change in the lens position state, and it is difficult to improve the performance of the variable focal length lens system sufficiently.

The variable focal length lens system can be miniaturized and improved in performance by appropriately setting the lateral magnification of the second lens group in the wide-angle end state and the telephoto end state, and desirably satisfies the following conditional expression (4) in particular:

$$0.35<\beta 2w\cdot \beta 2t<0.6 \tag{4}$$

where β2w is the lateral magnification of the second lens group in the wide-angle end state, and β2t is the lateral magnification of the second lens group in the telephoto end state.

The conditional expression (4) defines the lateral magnification of the second lens group. The variable focal length lens system can be reduced in lens diameter while achieving predetermined optical performance by satisfying the conditional expression (4).

When β2w·β2t is less than the lower limit value of the conditional expression (4), the fifth lens group in the variable focal length lens system is situated at a position much nearer to an image side in the wide-angle end state, approaches an image surface, and is separated from the image surface in the telephoto end state, and the luminous flux going to the peripheral part of the screen in the wide-angle end, state in particular is strongly refracted by the fifth lens group.

As a result, the variable focal length lens system causes a high degree of aberration in the peripheral part of the screen, and thus may not offer predetermined optical performance.

When β2w·β2t exceeds the upper limit value of the conditional expression (4), on the other hand, the fifth lens group in the variable focal length lens system is situated at a position much nearer to the image side in the telephoto end state, is separated from the image surface, and approaches the image surface in the telephoto end state, and change in exit pupil position which variation is attendant on the lens position state is greatly increased.

As a result, in the variable focal length lens system, the luminous flux going to the peripheral part of the screen in the telephoto end state in particular is shaded by an on-chip lens. Thus, an amount of ambient light has to be further increased, and it is difficult to achieve reduction in lens diameter.

The variable focal length lens system desirably moves the fifth lens group in the direction of the optical axis when a subject position changes, and desirably satisfies the following conditional expression (5):

$$0.45<\beta 5t<0.7 \tag{5}$$

where β5t is the lateral magnification of the fifth lens group in the telephoto end state.

In the variable focal length lens system, the fifth lens group used for focus adjustment is disposed foremost on the image side of the lens system. An axial luminous flux and an off-axis luminous flux therefore pass through the fifth lens group in a separated state. Thereby, when the subject position changes, the variable focal length lens system readily corrects variation in off-axis aberration occurring when the fifth lens group is moved, and can offer high optical performance regardless of a subject distance.

The conditional expression (5) defines the lateral magnification of the fifth lens group in the telephoto end state. When β5t exceeds the upper limit value of the conditional expression (5), an amount of travel of the fifth lens group in the variable focal length lens system which amount of travel is attendant on change in subject position is increased.

Thus, in the variable focal length lens system, the amount of lens travel of the fifth lens group for a given subject is increased, and the workload of the fifth lens group is also increased. As a result, in the variable focal length lens system, operating speed is not increased and a user has an uncomfortable feeling, or a driving system is increased in size and lens barrel size is increased.

When β5t is less than the lower limit value of the conditional expression (5), on the other hand, the combined refractive power of the first to fourth lens groups in the telephoto end state of the variable focal length lens system is weakened. Thus, total lens length in the telephoto end state is lengthened, and the variable focal length lens system is increased in size.

Further, the variable focal length lens system desirably satisfies a conditional expression (6) in order to further shorten the total lens length in the telephoto end state:

$$0.3<f1/ft<0.5 \tag{6}$$

where f1 is focal length of the first lens group.

The conditional expression (6) defines the focal length f1 of the first lens group. When f1/ft exceeds the upper limit value of the conditional expression (6), the variable focal length lens system may not shorten the total lens length in the telephoto end state, and thus may not be further miniaturized.

When f1/ft is less than the lower limit value of the conditional expression (6), on the other hand, the off-axis luminous flux passing through the first lens group in the telephoto end state of the variable focal length lens system goes away from the optical axis, and causes an increase in lens diameter.

Further, in the variable focal length lens system, by appropriately setting an amount of travel of the first lens group which amount of travel is attendant on change in the lens position state, a decrease in lens diameter and an improvement in performance are made compatible with each other, and a further improvement in performance can be achieved. At this time, it is desirable to satisfy a conditional expression (7).

$$0.03 < \Delta 1/ft < 0.2 \tag{7}$$

where $\Delta 1$ is an amount of change of the first lens group in the wide-angle end state and the telephoto end state (supposing that a direction from the image surface to the object side is a positive direction).

The conditional expression (7) defines an amount of travel of the first lens group which amount of travel is attendant on change in the lens position state. Letting Z be a zoom ratio (ft/fw), the denominator ft of the conditional expression (7) can be written as ft=fw·Z. Then, the conditional expression (7) can also be said to define $\Delta 1/Z$ by replacing the denominator ft with fw·Z and normalizing the fw.

When $\Delta 1/ft$ exceeds the upper limit value of the conditional expression (7), the total lens length of the variable focal length lens system in the wide-angle end state is shortened, the negative refractive power of the second lens group is strengthened, and at the same time, the off-axis luminous flux passing through the first lens group and the second lens group approaches the optical axis. As a result, in the variable focal length lens device, it is difficult to excellently correct variation in off-axis aberration which variation is attendant on change in the lens position state.

When $\Delta 1/ft$ is less than the lower limit value of the conditional expression (7), on the other hand, the total lens length of the variable focal length lens system in the wide-angle end state is lengthened. In this case, when the total lens length of the variable focal length lens system in the wide-angle end state is lengthened, an amount of travel of the first lens group from a collapsed state to the wide-angle end state is increased, so that an amount of rotation of a lens barrel which amount of rotation is necessary to make a transition from the collapsed state to the wide-angle end state is increased, and an angle of rotation from the wide-angle end state to the telephoto end state is decreased.

As a result, in the variable focal length lens system, an angle of inclination of a cam for moving each lens group is increased too much, and thus the lens barrel may not be formed. In the variable focal length lens system, the angle of inclination of the cam can be decreased by increasing the diameter of the lens barrel. However, the increased diameter of the lens barrel results in an increase in the size of the camera at a time of being carried.

Further, the variable focal length lens system desirably satisfies a conditional expression (8) to be miniaturized by shortening the total lens length in the telephoto end state even when a very high zoom magnification is obtained.

$$0.7 < TLt/ft < 0.9 \tag{8}$$

where TLt is the total lens length in the telephoto end state.

This conditional expression (8) defines the total lens length in the telephoto end state, and is characterized by being less than 1.0.

When TLt/ft exceeds the upper limit value of the conditional expression (8), the variable focal length lens system increases the size of the camera and thus impairs portability, which is contrary to the spirit of the present invention. This is because the total lens length in the telephoto end state is lengthened, and an effect of miniaturization by a zoom type according to an embodiment of the present invention is lost.

When TLt/ft is less than the lower limit value of the conditional expression (8), on the other hand, the variable focal length lens system may not provide stable optical performance at a time of manufacturing. This is because the total lens length in the telephoto end state becomes extremely short, and even a minute decentration occurring at the time of manufacturing greatly degrades optical performance.

Incidentally, in the variable focal length lens system according to the embodiment of the present invention, each lens group is desirably formed as follows in order to achieve both high optical performance and miniaturization.

In the variable focal length lens system, in order to achieve even higher performance, the first lens group is desirably formed by, in order from the object side, a cemented lens of a negative lens and a positive lens and two positive lenses disposed on the image side of the cemented lens.

Because an axial luminous flux is made incident on the first lens group with a large luminous flux diameter in the telephoto end state in particular, negative spherical aberration tends to occur. In addition, because an off-axis luminous flux is made incident on the first lens group in a state of being separated from the optical axis, off-axis aberration tends to occur.

In this variable focal length lens system, a cemented lens formed by a negative lens and a positive lens is disposed foremost on the object side in the first lens group, whereby negative spherical aberration and longitudinal chromatic aberration are excellently corrected.

Incidentally, in the variable focal length lens system, two positive lenses disposed on the image side of the cemented lens in the first lens group excellently correct mainly variation in coma aberration which variation is attendant on change in angle of view. By dividing the functions of each lens, even higher optical performance can be achieved.

Incidentally, in the variable focal length lens system, in order to achieve even higher performance, the cemented lens in the first lens group is desirably formed in a state of being separated into two lenses, that is, a negative lens and a positive lens.

Further, in the variable focal length lens system, in order to excellently correct various aberrations occurring in the second lens group and obtain even higher optical performance, the second lens group is desirably formed by two partial groups, that is, a first partial group and a second partial group.

Specifically, the first partial group is formed by a negative lens of a meniscus shape having a concave surface facing the image side, and is disposed at a distance from the aperture stop in the wide-angle end state. Thus, the height of passing light rays changes greatly according to change in angle of view. The first partial group is consequently suitable for correcting off-axis aberration.

The second partial group is composed of at least one negative lens and one positive lens, and is formed by, in order from the object side, a negative lens of a biconcave shape and a positive lens having a convex surface facing the object side. The composition of the second partial group is simplified by making the positive lens and the negative lens form a cemented lens, or even higher performance can be achieved by forming the positive lens by a cemented lens of a positive lens and a negative lens.

In addition, the second lens group is disposed close to the aperture stop, and is thus intended mainly to correct axial aberration. Therefore the second lens group is desirably of a doublet configuration or a triplet configuration.

In this variable focal length lens system, the second lens group is formed by two partial groups, that is, a first partial group and a second partial group as described above, thereby clearly dividing roles in aberration correction, and obtaining excellent image forming performance.

In the third lens group of the variable focal length lens system, a positive lens having a convex surface facing the object side is desirably disposed foremost on the object side. Thereby the total lens length of the variable focal length lens system can be shortened.

In particular, by imparting a so-called triplet configuration formed by arranging three lenses, that is, a first positive lens, a negative lens, and a second positive lens in order from the object side to the third lens group, high optical performance can be obtained irrespective of the position state of the third lens group.

In addition, by forming the first positive lens and the negative lens in the third lens group into a cemented lens, the third lens group can be formed by two lens blocks, and consequently stable optical performance can be obtained also at the time of manufacturing. Incidentally, by forming a lens surface foremost on the object side in the third lens group into an aspheric shape, negative spherical aberration can be excellently corrected even with strong refractive power.

The fourth lens group of the variable focal length lens system desirably has a triplet configuration formed by arranging three lenses that are a first negative lens, a positive lens, and a second negative lens in order from the object side. As a result, the variable focal length lens system can correct axial aberration and off-axis aberration occurring in the fourth lens group by itself. Therefore even higher performance can be achieved irrespective of the lens position state.

The fifth lens group of the variable focal length lens system desirably has a doublet configuration formed by arranging a positive lens having a convex surface facing the object side and a negative lens having a concave surface facing the image side in order from the object side. Thereby the variable focal length lens system can correct off-axis aberration and axial aberration at the same time, and excellently correct variations in various aberrations occurring when the subject position is changed. Incidentally, the fifth lens group can also be formed by a single lens of relatively low dispersion.

In addition, in the variable focal length lens system, a glass material of high anomalous dispersibility is desirably used for the first lens group in order to suppress variation in chromatic aberration more excellently. In particular, the use of a glass material of high anomalous dispersibility for the positive lens in the cemented lens forming the first lens group in the variable focal length lens system makes it possible to excellently correct secondary dispersion occurring in a central part of a screen in the telephoto end state.

Further, the variable focal length lens system can achieve even higher optical performance by using an aspheric lens for the first to fifth lens groups. In particular, by using an aspheric lens in the second lens group, the variable focal length lens system can also excellently correct variation in coma aberration due to an angle of view occurring in the wide-angle end state. Incidentally, in the variable focal length lens system, it is needless to say that even higher optical performance can be obtained by using a plurality of aspheric surfaces in one optical system.

Further, the variable focal length lens system can shift an image position with respect to the image surface by shifting one lens group or a part of lens components of one lens group among the first to fifth lens groups forming the optical system in a direction substantially perpendicular to the optical axis. In particular, in the variable focal length lens system, the third lens group is shifted in a direction substantially perpendicular to the optical axis, and aberration change at this time can be reduced.

In practice, the variable focal length lens system capable of shifting such an image position can be combined with a detecting system for obtaining hand movement information by detecting a fall of the camera as a movement angle, an operation system for calculating lens position information necessary to correct hand movement on the basis of the hand movement information, and a driving system for shifting one lens according to the lens position information.

The variable focal length lens system thereby enables the camera to function as a vibration-proof camera that cancels or alleviates an image blur due to hand movement or the like occurring at a time of a shutter release by a lens shift.

Incidentally, the variable focal length lens system of course allows a low-pass filter to be disposed therein to prevent so-called moire fringes on the image side of the lens system or allows an infrared cutoff filter to be disposed therein according to the spectral sensitivity characteristics of a light receiving element.

[Numerical Examples of Variable Focal Length Lens System According to an Embodiment of the Present Invention]

Numerical examples in which concrete numerical values are applied to the variable focal length lens system according to the foregoing embodiment of the present invention will next be described in the following with reference to drawings (see FIGS. 1 to 19) and tables (see Tables 1 to 12). In each numerical example, an aspheric surface is expressed by the following Equation 1:

$$x = \frac{cy^2}{[1 + \{1 - (1+\kappa)c^2 y^2\}^{1/2}]} + Ay^4 + By^6 + \ldots \quad \text{[Equation 1]}$$

where y is height from an optical axis, x is an amount of sag, c is curvature, k is a conic constant, and A, B, ... are aspheric coefficients.

FIG. 1 shows a refractive power arrangement of a variable focal length lens system 1 according to each numerical example of the present invention as a whole, the variable focal length lens system being formed by, in order from an object side, a first lens group G1 having positive refractive power, a second lens group G2 having negative refractive power, a third lens group G3 having positive refractive power, a fourth lens group G4 having negative refractive power, and a fifth lens group G5 having positive refractive power.

In the variable focal length lens system 1, in power variation from a wide-angle end state to a telephoto end state, an air interval between the first lens group G1 and the second lens group G2 is increased, an air interval between the second lens group G2 and the third lens group G3 is decreased, an air interval between the third lens group G3 and the fourth lens group G4 is increased, and an air interval between the fourth lens group G4 and the fifth lens group is changed.

At this time, the first lens group G1 moves to the object side after once moving to an image side, the second lens group G2 moves to the image side, the third lens group G3 moves to the object side, the fourth lens group G4 moves in a direction of an optical axis while describing a curve in the shape of an S or an inverted S, and the fifth lens group G5 moves to the image side after once moving to the object side. Incidentally, the fifth lens group G5 moves so as to compensate for variation in an image surface position, the variation in the image surface position being attendant on movement of each lens group, and moves to the object side at a time of short-range focusing.

First Embodiment

First Numerical Example

Figure 2:
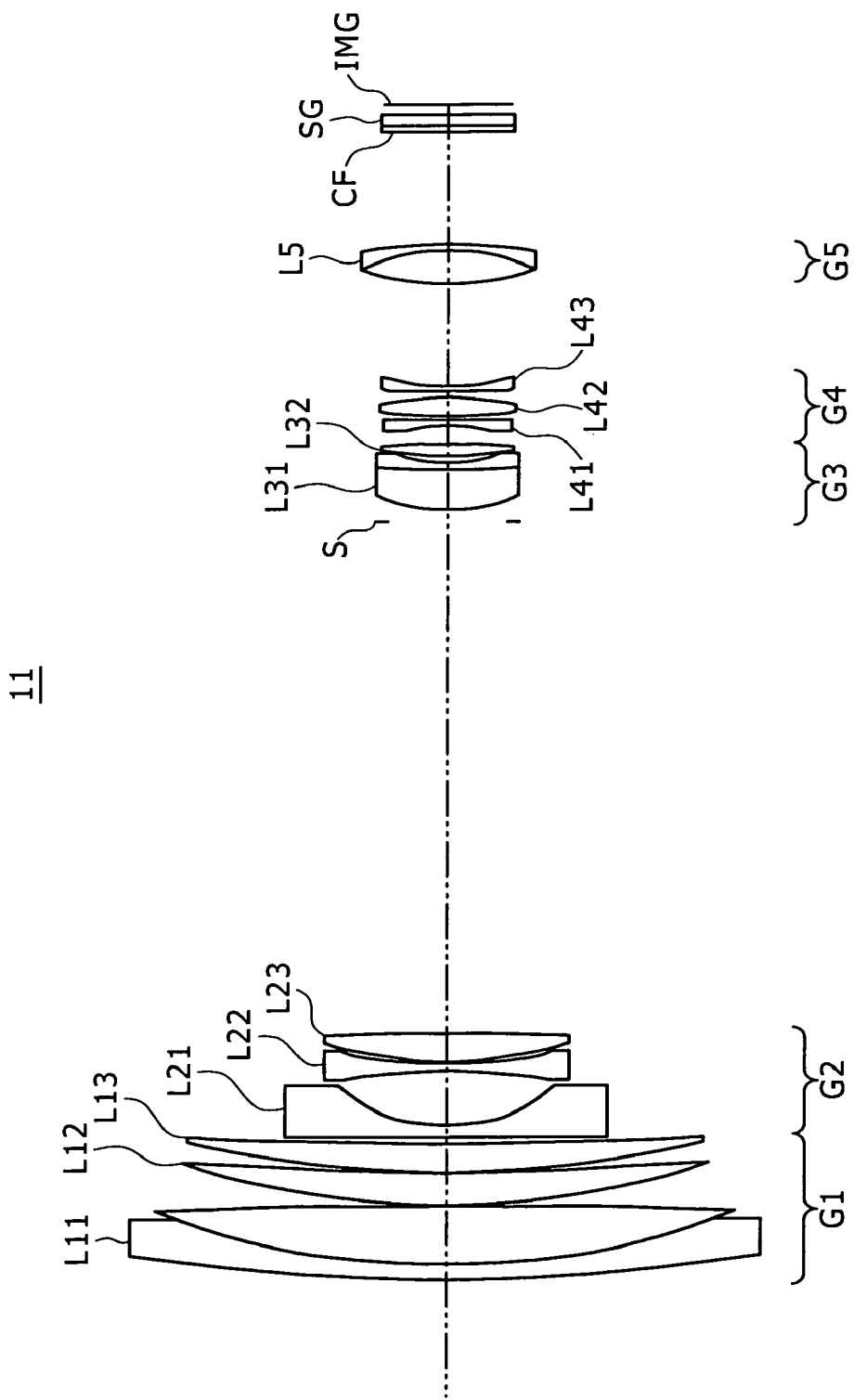
FIG. 2 is a diagram showing a lens configuration of a first embodiment of the variable focal length lens system according to the present invention.

FIG. 2 shows a variable focal length lens system 11 in a first numerical example, the variable focal length lens system 11 being formed by, in order from an object side, a first lens group G1 having positive refractive power, a second lens group G2 having negative refractive power, a third lens group G3 having positive refractive power, a fourth lens group G4 having negative refractive power, and a fifth lens group G5 having positive refractive power.

In this variable focal length lens system 11, the first lens group G1 is formed by a cemented lens L11 of a negative lens of a meniscus shape having a convex surface facing the object side and a positive lens having a convex surface facing the object side, a positive lens L12 of a meniscus shape having a convex surface facing the object side, and a positive lens L13 of a meniscus shape having a convex surface facing the object side.

The second lens group G2 is formed by a negative lens L21 having a concave surface facing the image side, a negative lens L22 of a biconcave shape, and a positive lens L23 of a biconvex shape.

The third lens group G3 is formed by a cemented lens L31 of a positive lens of a meniscus shape having a convex surface facing the object side and a negative lens of a meniscus shape having a concave surface facing the image side and a positive lens L32 of a biconvex shape.

The fourth lens group G4 is formed by a negative lens L41 of a meniscus shape having a concave surface facing the object side, a positive lens L42 of a biconvex shape, and a negative lens L43 of a meniscus shape having a concave surface facing the image side.

The fifth lens group G5 is formed by a cemented lens L5 of a positive lens of a biconvex shape and a negative lens of a meniscus shape having a concave surface facing the object side. The fifth lens group G5 is used for focus adjustment.

Incidentally, the variable focal length lens system 11 has an aperture stop S disposed in the vicinity of the third lens group G3 on the object side of the third lens group G3. The aperture stop is moved integrally with the third lens group G3. Incidentally, an IR cutoff filter CF and a seal glass SG for protecting an image surface IMG are disposed between the fifth lens group G5 and the image surface IMG in the variable focal length lens system 11.

Thus, the variable focal length lens system 11 having a lens element configuration as described above can achieve both a high variable power ratio and miniaturization, and excellently correct various aberrations of the lens system.

The following Table 1 shows specification values of the first numerical example in the present invention. In the specification table in the first numerical example, f denotes focal length, FNO denotes an F-number, and 2ω denotes an angle of view, and an index of refraction is a value corresponding to a d-line (wavelength of 587.6 nm). Incidentally, a radius of curvature "0.0000" in Table 1 means a plane.

TABLE 1 f 1.00 ~ 2.284 ~ 7.377 ~ 15.277 ~ 33.723
FNO 2.88 ~ 3.55 ~ 4.00 ~ 4.16 ~ 4.99
2ω 86.56 ~ 39.05 ~ 12.49 ~ 6.07 ~ 2.71°

| SURFACE NUMBER | RADIUS OF CURVATURE | SURFACE INTERVAL | INDEX OF REFRACTION | ABBE NUMBER |
|---|---|---|---|---|
| 1 | 24.0711 | 0.316 | 1.91082 | 35.26 |
| 2 | 9.6397 | 1.179 | 1.49700 | 81.60 |
| 3 | −170.2927 | 0.023 | | |
| 4 | 10.0481 | 0.654 | 1.60300 | 65.50 |
| 5 | 32.5872 | 0.023 | | |
| 6 | 14.0309 | 0.528 | 1.60300 | 65.50 |
| 7 | 54.3531 | (D7) | | |
| 8 | 0.0000 | 0.226 | 1.88072 | 37.30 |
| 9 | 2.2079 | 1.076 | | |
| 10 | −6.6061 | 0.135 | 1.84548 | 43.20 |
| 11 | 5.6597 | 0.023 | | |
| 12 | 4.5669 | 0.564 | 1.94595 | 17.98 |
| 13 | −69.9367 | (D13) | | |
| 14 (APERTURE STOP) | 0.0000 | 0.248 | | |
| 15 | 2.3180 | 0.808 | 1.76802 | 50.33 |
| 16 | 41.2872 | 0.135 | 1.79978 | 29.86 |
| 17 | 2.2033 | 0.124 | | |
| 18 | 6.3185 | 0.226 | 1.77263 | 49.61 |
| 19 | −7.5875 | (D19) | | |
| 20 | −3.3829 | 0.135 | 1.75119 | 30.00 |
| 21 | 45.2652 | 0.048 | | |
| 22 | 4.2865 | 0.394 | 1.80390 | 25.50 |
| 23 | −4.5371 | 0.147 | | |
| 24 | 15.1649 | 0.113 | 1.80550 | 28.97 |
| 25 | 2.8191 | (D25) | | |
| 26 | 3.5641 | 0.632 | 1.59535 | 66.32 |
| 27 | −2.5023 | 0.124 | 1.80258 | 28.25 |
| 28 | −6.3517 | (D28) | | |
| 29 | 0.0000 | 0.097 | 1.51680 | 64.20 |
| 30 | 0.0000 | 0.226 | 1.55440 | 63.41 |
| 31 | 0.0000 | (Bf) | | |

Incidentally, an 8th surface, a 9th surface, a 13th surface, a 15th surface, and a 23rd surface have an aspheric shape, and the aspheric coefficients of the surfaces are as shown in Table 2. Incidentally, for example, "0.26029E−05" denotes "0.26029×10$^{-5}$."

TABLE 2

| | | | | | |
|---|---|---|---|---|---|
| 8TH SURFACE | κ = 0.000000 | A = 0.581241E−02 | B = −0.180639E−02 | C = 0.234250E−03 | D = −0.118301E−04 |
| 9TH SURFACE | κ = 0.000000 | A = 0.739965E−02 | B = −0.411593E−04 | C = −0.116228E−04 | D = −0.784965E−04 |
| 13TH SURFACE | κ = 0.000000 | A = −0.175118E−02 | B = −0.217517E−03 | C = 0.722426E−04 | D = 0.000000E+00 |
| 15TH SURFACE | κ = 0.589204 | A = −0.995337E−02 | B = −0.185934E−02 | C = −0.991149E−04 | D = −0.270293E−03 |
| 23RD SURFACE | κ = 0.000000 | A = 0.508026E−02 | B = 0.862361E−04 | C = −0.379216E−03 | D = 0.253729E−03 |

Next, variable intervals when a lens position state changes in the variable focal length lens system 11 are shown in the following Table 3.

TABLE 3

| f   | 1.000  | 2.284 | 7.377 | 15.277 | 33.723 |
|-----|--------|-------|-------|--------|--------|
| D7  | 0.169  | 2.672 | 7.167 | 8.930  | 10.062 |
| D13 | 10.213 | 5.870 | 2.777 | 1.272  | 0.237  |
| D19 | 0.338  | 2.000 | 3.588 | 4.129  | 4.130  |
| D25 | 2.059  | 1.985 | 1.068 | 0.793  | 2.843  |
| D28 | 2.302  | 2.376 | 3.206 | 3.481  | 1.431  |
| Bf  | 0.159  | 0.159 | 0.159 | 0.159  | 0.159  |

The following Table 4 shows conditional expression correspondence values in the variable focal length lens system 11 according to the first numerical example. Bf denotes back focus.

TABLE 4 f13T = 36.6022
f2 = −2.1233
f4 = −10.4794
Δ3 = 3.7042
β2w = −0.1971
β2t = −2.4175
β5t = 0.5554
f1 = 14.0338
Δ1 = 3.6201
(1) f13T/ft = 1.085
(2) f2/f4 = 0.203
(3) Δ3/ft = 0.110
(4) β2w · β2t = 0.477
(5) β5t = 0.555
(6) f1/ft = 0.416
(7) Δ1/ft = 0.107
(7) TLt/ft = 0.803

Figure 4:
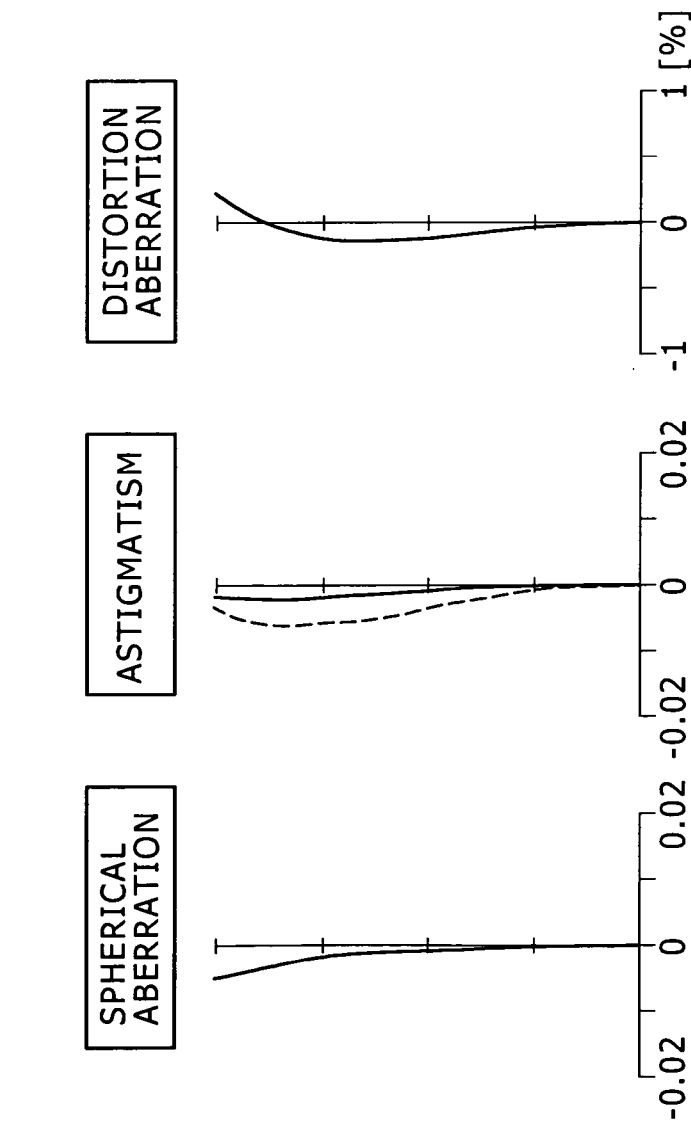
FIG. 4 is a diagram showing spherical aberration, astigmatism, distortion aberration, and lateral aberration in a first intermediate focal length state.
Figure 7:
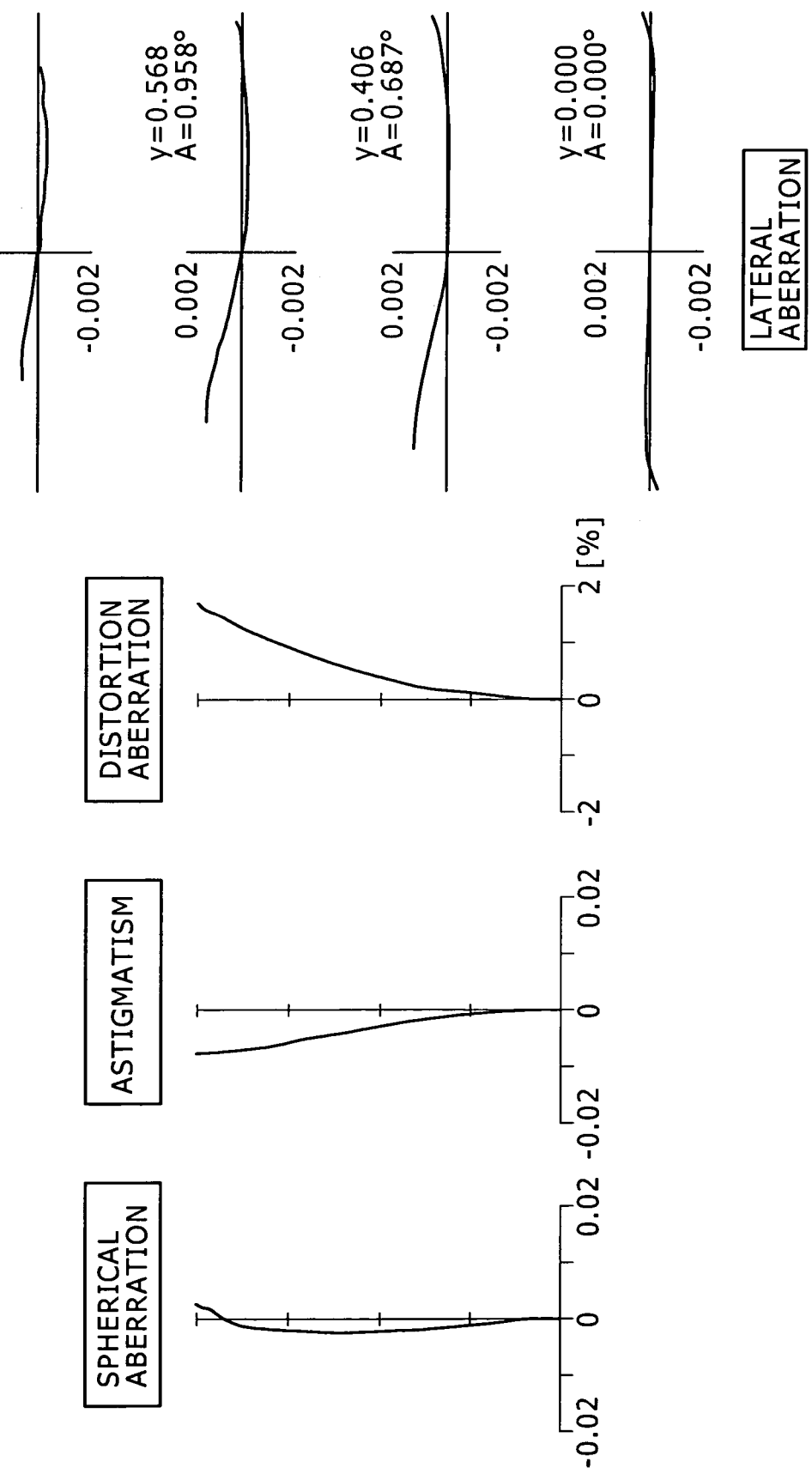
FIG. 7 is a diagram showing spherical aberration, astigmatism, distortion aberration, and lateral aberration in a telephoto end state.

Next, FIGS. 3 to 7 are diagrams of various aberrations in an infinity focused state of the first numerical example. FIG. 3 shows various aberrations in a wide-angle end state (f=1.000). FIG. 4 shows various aberrations in a first intermediate focal length state (f=2.284). FIG. 5 shows various aberrations in a second intermediate focal length state (f=7.377). FIG. 6 shows various aberrations in a third intermediate focal length state (f=15.277). FIG. 7 shows various aberrations in a telephoto end state (f=33.723).

In FIGS. 3 to 7, a solid line in spherical aberration diagrams indicates spherical aberration, a solid line in astigmatism diagrams represents a sagittal image surface and a broken line in the astigmatism diagrams represents a meridional image surface, a solid line in distortion aberration diagrams indicates distortion aberration, and A in lateral aberration diagrams denotes an angle of view (half angle of view) and y in the lateral aberration diagrams denotes image height. It is clear from the aberration diagrams that the variable focal length lens system 11 according to the first numerical example excellently corrects various aberrations, and has excellent image forming performance.

Second Embodiment

Second Numerical Example

Figure 8:
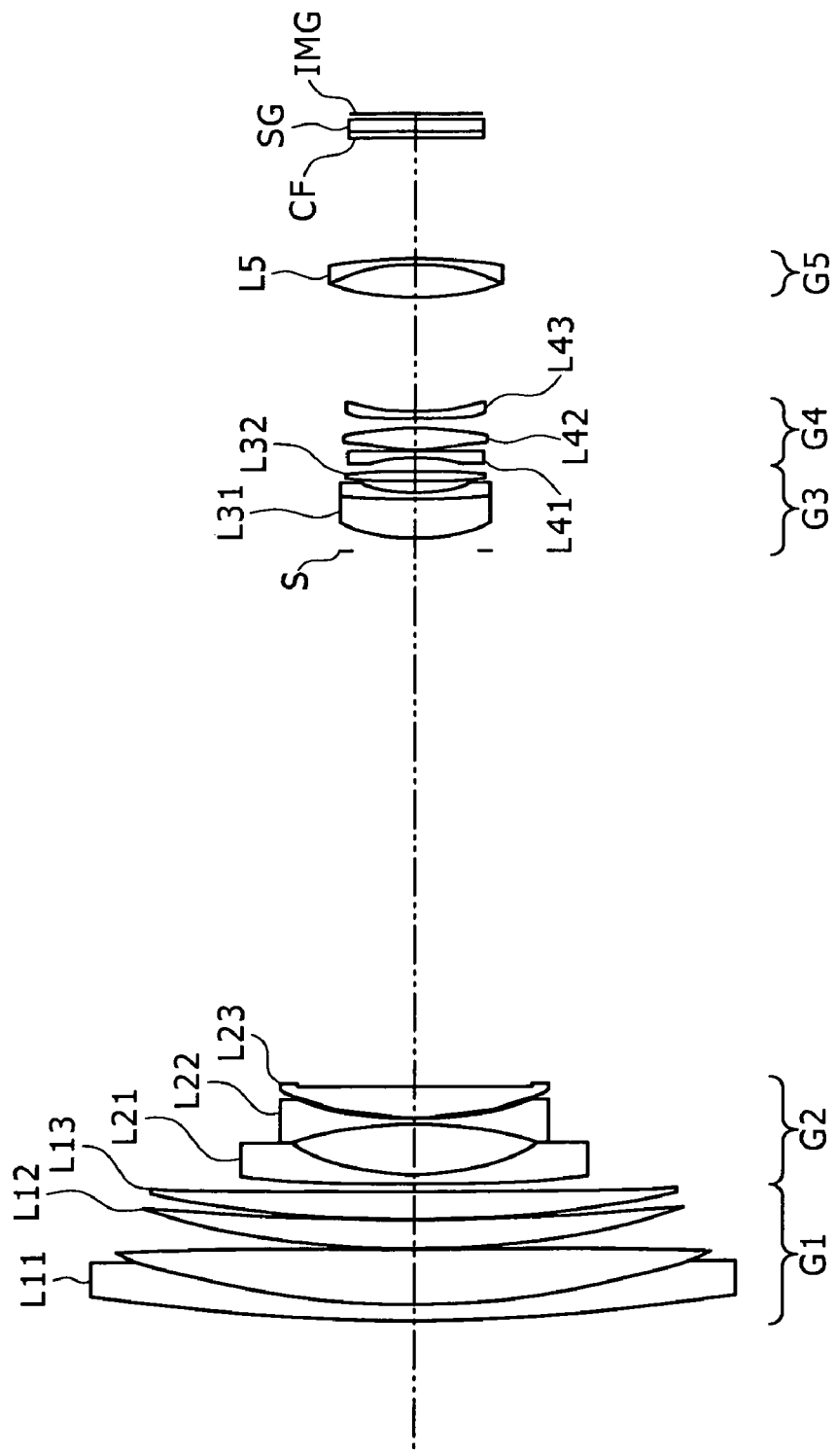
FIG. 8 is a diagram showing a lens configuration of a second embodiment of the variable focal length lens system according to the present invention.

FIG. 8 shows a variable focal length lens system 12 in a second numerical example, the variable focal length lens system 12 being formed by, in order from an object side, a first lens group G1 having positive refractive power, a second lens group G2 having negative refractive power, a third lens group G3 having positive refractive power, a fourth lens group G4 having negative refractive power, and a fifth lens group G5 having positive refractive power.

In this variable focal length lens system 12, the first lens group G1 is formed by a cemented lens L11 of a negative lens of a meniscus shape having a convex surface facing the object side and a positive lens having a convex surface facing the object side, a positive lens L12 of a meniscus shape having a convex surface facing the object side, and a positive lens L13 of a meniscus shape having a convex surface facing the object side.

The second lens group G2 is formed by a negative lens L21 having a concave surface facing the image side, a negative lens L22 of a biconcave shape, and a positive lens L23 of a biconvex shape.

The third lens group G3 is formed by a cemented lens L31 of a positive lens of a meniscus shape having a convex surface facing the object side and a negative lens of a meniscus shape having a concave surface facing the image side and a positive lens L32 of a biconvex shape.

The fourth lens group G4 is formed by a negative lens L41 of a meniscus shape having a concave surface facing the object side, a positive lens L42 of a biconvex shape, and a negative lens L43 of a meniscus shape having a concave surface facing the image side.

The fifth lens group G5 is formed by a cemented lens L5 of a positive lens of a biconvex shape and a negative lens of a meniscus shape having a concave surface facing the object side. The fifth lens group G5 is used for focus adjustment.

Incidentally, the variable focal length lens system 12 has an aperture stop S disposed in the vicinity of the third lens group G3 on the object side of the third lens group G3. The aperture stop is moved integrally with the third lens group G3. Incidentally, an IR cutoff filter CF and a seal glass SG for protecting an image surface IMG are disposed between the fifth lens group G5 and the image surface IMG in the variable focal length lens system 12.

Thus, the variable focal length lens system 12 having a lens element configuration as described above can achieve both a high variable power ratio and miniaturization, and excellently correct various aberrations of the lens system.

The following Table 5 shows specification values of the second numerical example in the present invention. In the specification table in the second numerical example, f denotes focal length, FNO denotes an F-number, and 2ω denotes an angle of view, and an index of refraction is a value corresponding to a d-line (wavelength of 587.6 nm). Incidentally, a radius of curvature "0.0000" in Table 5 means a plane.

TABLE 5 f 1.00 ~ 2.295 ~ 4.987 ~ 15.948 ~ 33.792
FNO 2.87 ~ 3.52 ~ 3.83 ~ 4.01 ~ 5.58
2ω 79.77 ~ 35.13 ~ 16.36 ~ 5.15 ~ 2.39°

| SURFACE NUMBER | RADIUS OF CURVATURE | SURFACE INTERVAL | INDEX OF REFRACTION | ABBE NUMBER |
|---|---|---|---|---|
| 1  | 22.6862   | 0.279 | 1.91082 | 35.26 |
| 2  | 8.7195    | 1.051 | 1.49700 | 81.60 |
| 3  | −113.7351 | 0.020 |         |       |
| 4  | 9.1954    | 0.542 | 1.60300 | 65.50 |
| 5  | 26.4829   | 0.020 |         |       |
| 6  | 12.8318   | 0.509 | 1.60300 | 65.50 |
| 7  | 82.3048   | (D7)  |         |       |
| 8  | 0.0000    | 0.199 | 1.88072 | 37.30 |
| 9  | 3.0614    | 0.947 |         |       |
| 10 | −3.9918   | 0.120 | 1.84548 | 43.20 |
| 11 | 4.1123    | 0.020 |         |       |
| 12 | 3.6832    | 0.564 | 1.94595 | 17.98 |

TABLE 5-continued f 1.00 ~ 2.295 ~ 4.987 ~ 15.948 ~ 33.792
FNO 2.87 ~ 3.52 ~ 3.83 ~ 4.01 ~ 5.58
2ω 79.77 ~ 35.13 ~ 16.36 ~ 5.15 ~ 2.39°

| SURFACE NUMBER | RADIUS OF CURVATURE | SURFACE INTERVAL | INDEX OF RE-FRACTION | ABBE NUMBER |
|---|---|---|---|---|
| 13 | −531.7063 | (D13) | | |
| 14 (APERTURE STOP) | 0.0000 | 0.219 | | |
| 15 | 2.2369 | 0.738 | 1.75500 | 52.30 |
| 16 | 26.5820 | 0.120 | 1.80000 | 29.9 |
| 17 | 2.1815 | 0.138 | | |
| 18 | 6.7075 | 0.199 | 1.80420 | 46.50 |
| 19 | −7.3457 | (D19) | | |
| 20 | −2.9914 | 0.120 | 1.71736 | 29.50 |
| 21 | 8.3298 | 0.056 | | |
| 22 | 4.0859 | 0.409 | 1.80518 | 25.46 |
| 23 | −4.0548 | 0.185 | | |
| 24 | 6.8609 | 0.100 | 1.72825 | 28.50 |
| 25 | 2.4928 | (D25) | | |
| 26 | 3.1659 | 0.632 | 1.60300 | 65.50 |
| 27 | −2.5198 | 0.110 | 1.80000 | 29.90 |
| 28 | −7.2331 | (D28) | | |
| 29 | 0.0000 | 0.086 | 1.51680 | 64.20 |
| 30 | 0.0000 | 0.199 | 1.55440 | 63.41 |
| 31 | 0.0000 | (Bf) | | |

Incidentally, an 8th surface, a 9th surface, a 13th surface, a 15th surface, and a 23rd surface have an aspheric shape, and the aspheric coefficients of the surfaces are as shown in Table 6. Incidentally, for example, "0.26029E−05" denotes "0.26029×10$^{-5}$."

TABLE 6

| 8TH SURFACE | κ = 0.000000 | A = 0.982892E−02 | B = −0.154593E−02 | C = 0.120787E−03 | D = 0.232524E−06 |
|---|---|---|---|---|---|
| 9TH SURFACE | κ = 0.000000 | A = 0.106799E−01 | B = 0.293628E−03 | C = 0.262710E−03 | D = −0.694714E−04 |
| 13TH SURFACE | κ = 0.000000 | A = 0.190641E−02 | B = −0.123463E−03 | C = 0.209405E−03 | D = 0.000000E+00 |
| 15TH SURFACE | κ = 0.904218 | A = −0.145900E−01 | B = −0.372533E−02 | C = −0.278415E−03 | D = −0.653110E−03 |
| 23RD SURFACE | κ = 0.000000 | A = 0.392202E−02 | B = −0.842858E−04 | C = 0.176014E−03 | D = 0.150038E−03 |

Next, variable intervals when a lens position state changes in the variable focal length lens system 12 are shown in the following Table 7.

TABLE 7

| f | 1.000 | 2.295 | 4.987 | 15.948 | 33.792 |
|---|---|---|---|---|---|
| D7 | 0.150 | 2.425 | 5.169 | 7.904 | 8.550 |
| D13 | 10.216 | 6.019 | 3.887 | 1.320 | 0.209 |
| D19 | 0.299 | 1.879 | 3.097 | 3.815 | 4.857 |
| D25 | 2.191 | 2.118 | 1.459 | 1.150 | 2.940 |
| D28 | 2.356 | 2.394 | 2.730 | 3.039 | 1.261 |
| Bf | 0.142 | 0.142 | 0.142 | 0.142 | 0.142 |

The following Table 8 shows conditional expression correspondence values in the variable focal length lens system 12 according to the second numerical example. Bf denotes back focus.

TABLE 8 f13T = 34.7961
f2 = −2.0978

TABLE 8-continued f4 = −9.6469
Δ3 = 4.2111
β2w = −0.2254
β2t = −2.3191
β5t = 0.5690
f1 = 12.5717
Δ1 = 2.6048
(1) f13T/ft = 1.030
(2) f2/f4 = 0.217
(3) Δ3/ft = 0.125
(4) β2w · β2t = 0.523
(5) β5t = 0.569
(6) f1/ft = 0.372
(7) Δ1/ft = 0.077
(7) TLt/ft = 0.756

Figure 9:
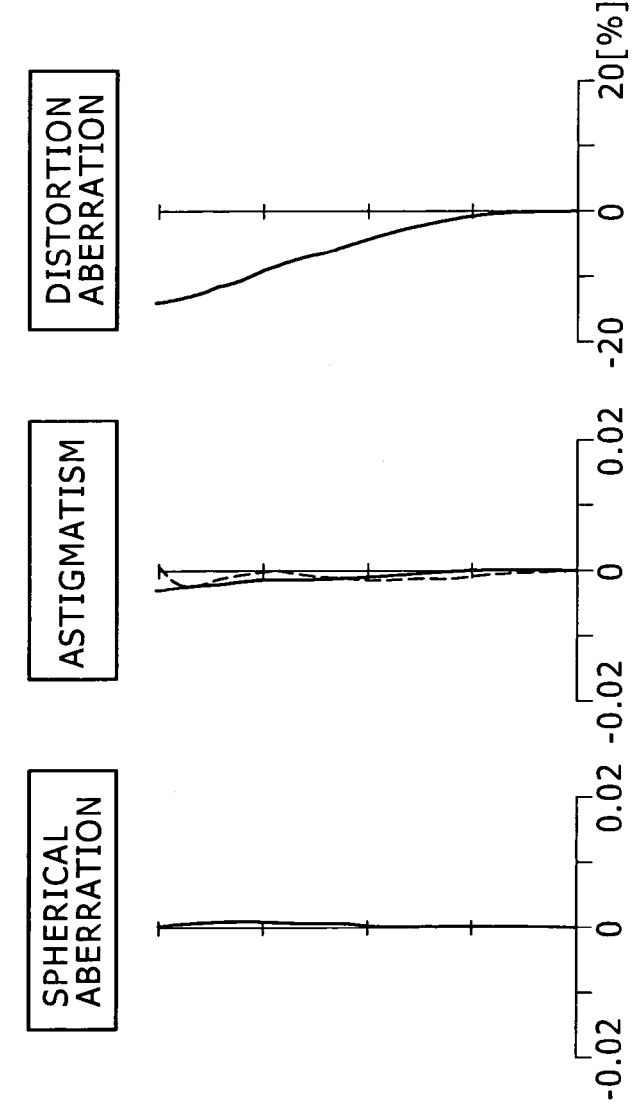
FIG. 9, in conjunction with FIGS. 10 to 13, is a diagram of aberrations of a numerical example in which concrete numerical values are applied to the second embodiment, the present diagram showing spherical aberration, astigmatism, distortion aberration, and lateral aberration in a wide-angle end state.
Figure 10:
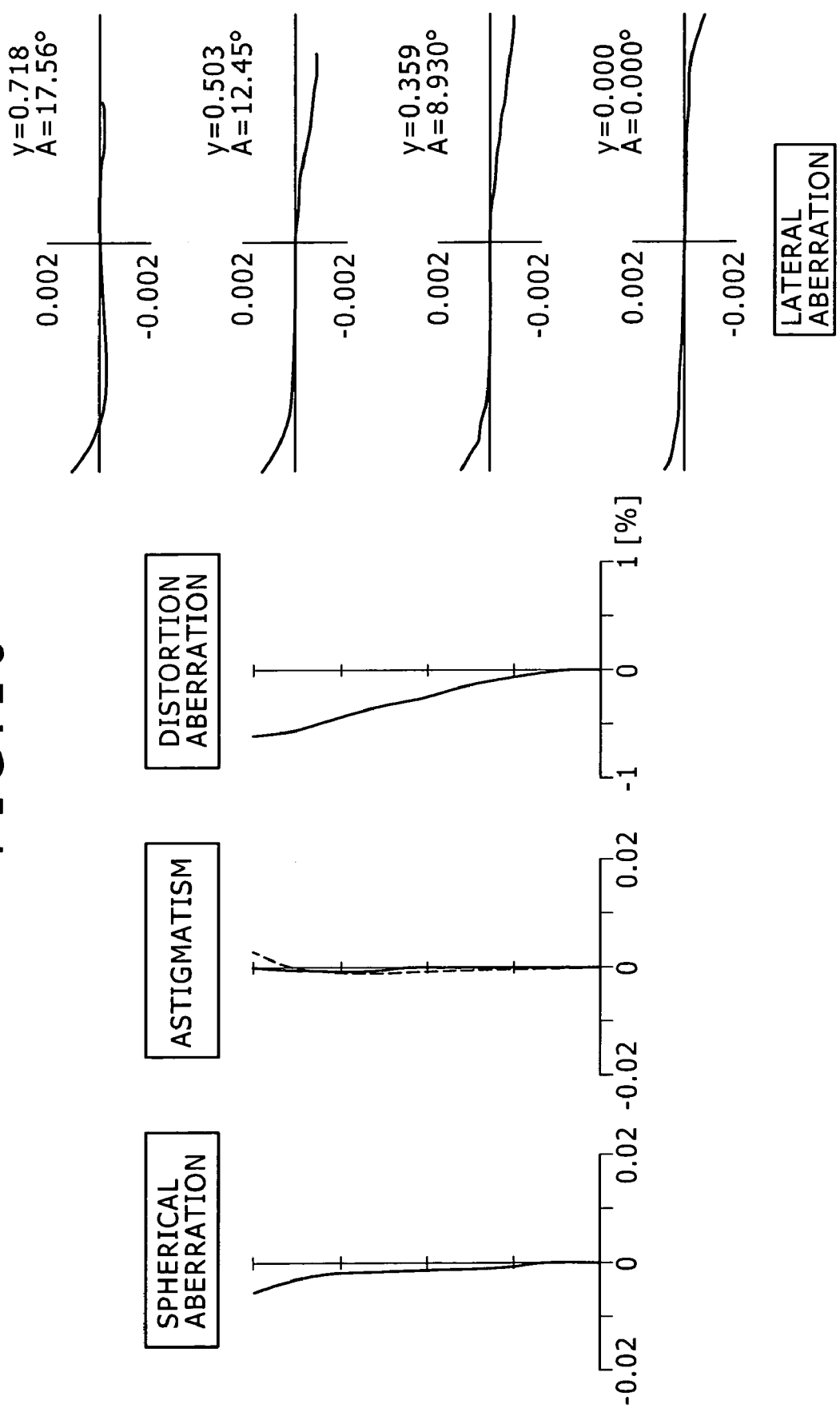
FIG. 10 is a diagram showing spherical aberration, astigmatism, distortion aberration, and lateral aberration in a first intermediate focal length state.
Figure 11:
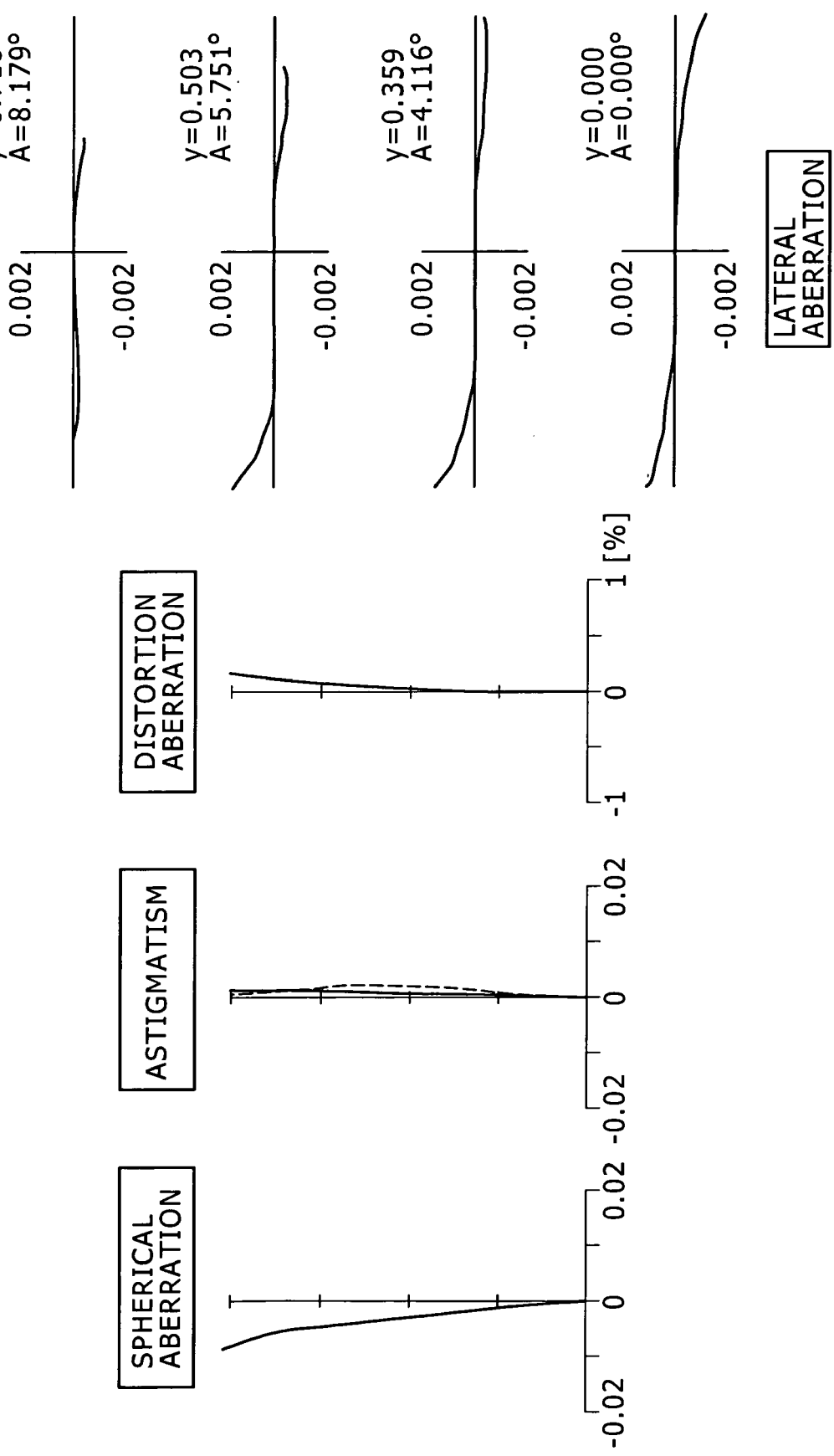
FIG. 11 is a diagram showing spherical aberration, astigmatism, distortion aberration, and lateral aberration in a second intermediate focal length state.
Figure 12:
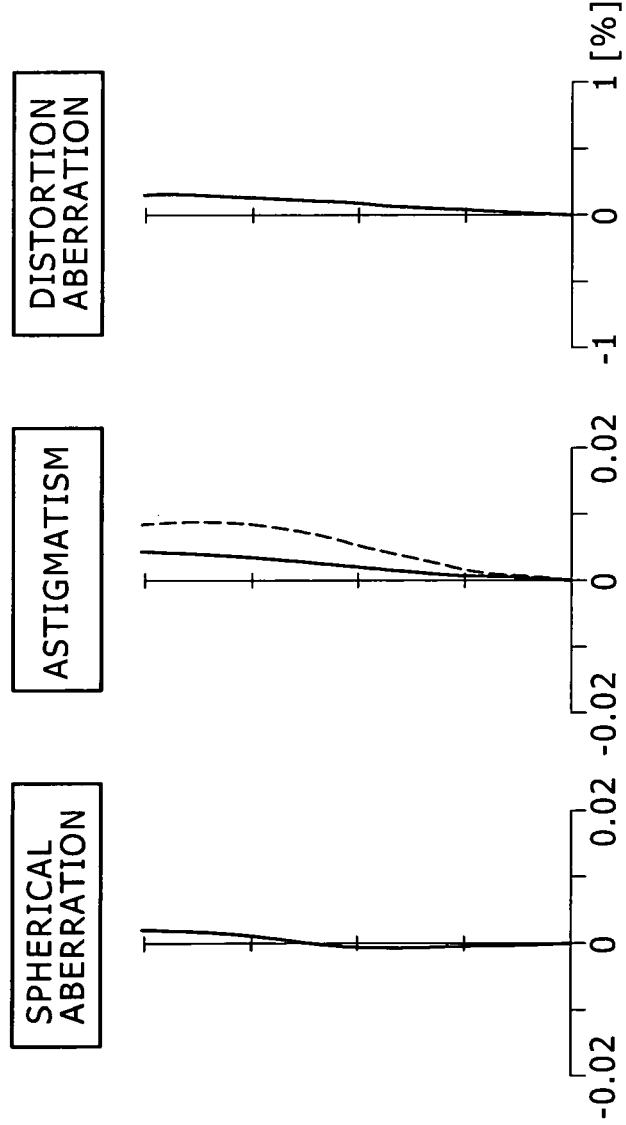
FIG. 12 is a diagram showing spherical aberration, astigmatism, distortion aberration, and lateral aberration in a third intermediate focal length state.
Figure 13:
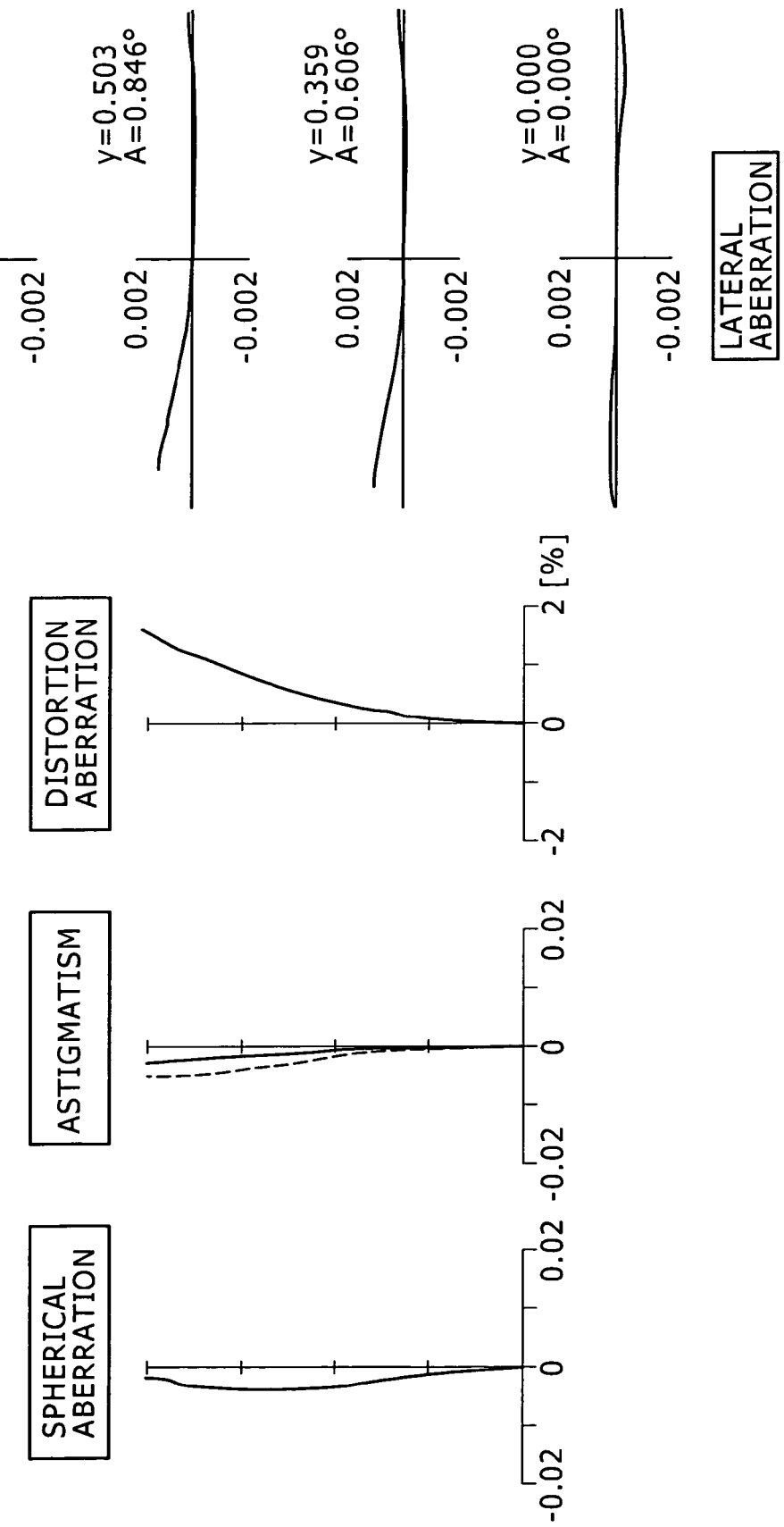
FIG. 13 is a diagram showing spherical aberration, astigmatism, distortion aberration, and lateral aberration in a telephoto end state.

Next, FIGS. 9 to 13 are diagrams of various aberrations in an infinity focused state of the second numerical example. FIG. 9 shows various aberrations in a wide-angle end state (f=1.000). FIG. 10 shows various aberrations in a first intermediate focal length state (f=2.295). FIG. 11 shows various aberrations in a second intermediate focal length state (f=4.987). FIG. 12 shows various aberrations in a third intermediate focal length state (f=15.948). FIG. 13 shows various aberrations in a telephoto end state (f=33.792).

In FIGS. 9 to 13, a solid line in spherical aberration diagrams indicates spherical aberration, a solid line in astigmatism diagrams represents a sagittal image surface and a broken line in the astigmatism diagrams represents a meridional image surface, a solid line in distortion aberration diagrams indicates distortion aberration, and A in lateral aberration diagrams denotes an angle of view (half angle of view) and y in the lateral aberration diagrams denotes image height. It is clear from the aberration diagrams that the variable focal length lens system 12 according to the second numerical example excellently corrects various aberrations, and has excellent image forming performance.

Third Embodiment

Third Numerical Example

Figure 14:
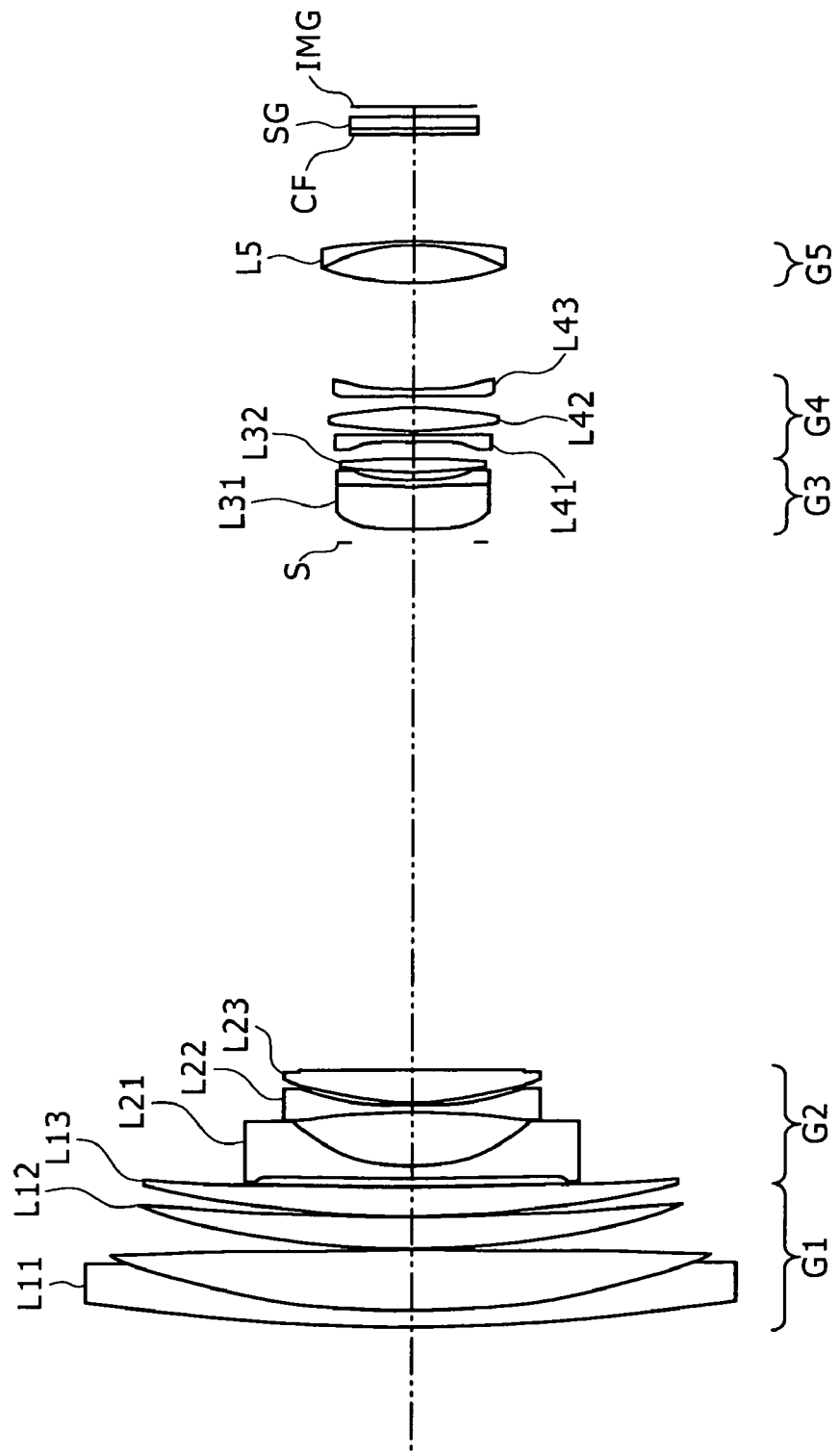
FIG. 14 is a diagram showing a lens configuration of a third embodiment of the variable focal length lens system according to the present invention.

FIG. 14 shows a variable focal length lens system 13 in a third numerical example, the variable focal length lens system 13 being formed by, in order from an object side, a first lens group G1 having positive refractive power, a second lens group G2 having negative refractive power, a third lens group G3 having positive refractive power, a fourth lens group G4 having negative refractive power, and a fifth lens group G5 having positive refractive power.

In this variable focal length lens system 13, the first lens group G1 is formed by a cemented lens L11 of a negative lens of a meniscus shape having a convex surface facing the object side and a positive lens having a convex surface facing the object side, a positive lens L12 of a meniscus shape having a convex surface facing the object side, and a positive lens L13 of a meniscus shape having a convex surface facing the object side.

The second lens group G2 is formed by a negative lens L21 having a concave surface facing the image side, a negative lens L22 of a biconcave shape, and a positive lens L23 of a biconvex shape.

The third lens group G3 is formed by a cemented lens L31 of a positive lens of a meniscus shape having a convex surface facing the object side and a negative lens of a meniscus shape having a concave surface facing the image side and a positive lens L32 of a biconvex shape.

The fourth lens group G4 is formed by a negative lens L41 of a meniscus shape having a concave surface facing the object side, a positive lens L42 of a biconvex shape, and a negative lens L43 of a meniscus shape having a concave surface facing the image side.

The fifth lens group G5 is formed by a cemented lens L5 of a positive lens of a biconvex shape and a negative lens of a meniscus shape having a concave surface facing the object side. The fifth lens group G5 is used for focus adjustment.

Incidentally, the variable focal length lens system 13 has an aperture stop S disposed in the vicinity of the third lens group G3 on the object side of the third lens group G3. The aperture stop is moved integrally with the third lens group G3. Incidentally, an IR cutoff filter CF and a seal glass SG for protecting an image surface IMG are disposed between the fifth lens group G5 and the image surface IMG in the variable focal length lens system 13.

Thus, the variable focal length lens system 13 having a lens element configuration as described above can achieve both a high variable power ratio and miniaturization, and excellently correct various aberrations of the lens system.

The following Table 9 shows specification values of the third numerical example in the present invention. In the specification table in the third numerical example, f denotes focal length, FNO denotes an F-number, and 2ω denotes an angle of view, and an index of refraction is a value corresponding to a d-line (wavelength of 587.6 nm). Incidentally, a radius of curvature "0.0000" in Table 9 means a plane.

TABLE 9 f 1.00~2.495~7.377~15.274~33.798
FNO 2.87~3.64~3.93~4.01~5.21
2ω 87.34~35.71~12.47~6.07~2.71°

| SURFACE NUMBER | RADIUS OF CURVATURE | SURFACE INTERVAL | INDEX OF REFRACTION | ABBE NUMBER |
|---|---|---|---|---|
| 1 | 24.6541 | 0.316 | 1.91082 | 35.26 |
| 2 | 9.6986 | 1.188 | 1.49700 | 81.60 |
| 3 | −128.4048 | 0.023 | | |
| 4 | 10.1787 | 0.613 | 1.60300 | 65.50 |
| 5 | 27.9198 | 0.023 | | |
| 6 | 13.5203 | 0.575 | 1.60300 | 65.50 |
| 7 | 65.5489 | (D7) | | |
| 8 | 0.0000 | 0.225 | 1.88072 | 37.30 |
| 9 | 2.2277 | 1.071 | | |
| 10 | −7.4585 | 0.135 | 1.84548 | 43.20 |
| 11 | 5.0668 | 0.023 | | |
| 12 | 4.4598 | 0.638 | 1.94595 | 17.98 |
| 13 | −92.4708 | (D13) | | |
| 14 (APERTURE STOP) | 0.0000 | 0.248 | | |
| 15 | 2.4446 | 0.834 | 1.75598 | 51.22 |
| 16 | 22.6732 | 0.135 | 1.80000 | 29.90 |
| 17 | 2.3502 | 0.156 | | |
| 18 | 7.1054 | 0.225 | 1.77250 | 49.62 |
| 19 | −8.0419 | (D19) | | |
| 20 | −3.3820 | 0.135 | 1.71736 | 29.50 |
| 21 | −53.0545 | 0.063 | | |
| 22 | 4.2874 | 0.462 | 1.77167 | 27.47 |
| 23 | −4.5810 | 0.210 | | |
| 24 | 22.8638 | 0.113 | 1.72825 | 28.50 |
| 25 | 2.8183 | (D25) | | |
| 26 | 3.5460 | 0.715 | 1.60300 | 65.50 |
| 27 | −2.5734 | 0.124 | 1.80000 | 29.90 |
| 28 | −7.0273 | (D28) | | |
| 29 | 0.0000 | 0.097 | 1.51680 | 64.20 |
| 30 | 0.0000 | 0.225 | 1.55440 | 63.41 |
| 31 | 0.0000 | (Bf) | | |

Incidentally, an 8th surface, a 9th surface, a 13th surface, a 15th surface, and a 23rd surface have an aspheric shape, and the aspheric coefficients of the surfaces are as shown in Table 10. Incidentally, for example, "0.26029E−05" denotes "0.26029×10$^{-5}$."

TABLE 10

| | | | | |
|---|---|---|---|---|
| 8TH SURFACE | κ = 0.000000 | A = 0.956308E−02 | B = −0.38648E−02 | C = 0.554308E−03 | D = −0.297003E−04 |
| 9TH SURFACE | κ = 0.000000 | A = 0.125178E−01 | B = −0.144504E−02 | C = −0.288014E−03 | D = −0.175469E−03 |
| 13TH SURFACE | κ = 0.000000 | A = −0.262749E−02 | B = −0.536219E−03 | C = 0.222253E−03 | D = 0.000000E+00 |
| 15TH SURFACE | κ = 0.560117 | A = −0.808144E−02 | B = −0.139130E−02 | C = −0.145139E−03 | D = −0.793073E−04 |
| 23RD SURFACE | κ = 0.000000 | A = 0.548455E−02 | B = 0.666740E−04 | C = −0.221067E−03 | D = 0.104159E−03 |

Next, variable intervals when a lens position state changes in the variable focal length lens system 13 are shown in the following Table 11.

TABLE 11

| f | 1.000 | 2.495 | 7.377 | 15.274 | 33.798 |
|---|---|---|---|---|---|
| D7 | 0.169 | 3.001 | 7.165 | 8.982 | 9.985 |

TABLE 11-continued

| D13 | 10.256 | 5.651 | 2.747 | 1.256 | 0.282 |
|---|---|---|---|---|---|
| D19 | 0.338 | 2.613 | 4.511 | 5.068 | 5.421 |
| D25 | 2.102 | 1.948 | 1.053 | 0.841 | 2.764 |
| D28 | 2.098 | 2.256 | 3.148 | 3.352 | 1.445 |
| Bf | 0.158 | 0.158 | 0.158 | 0.158 | 0.158 |

The following Table 12 shows conditional expression correspondence values in the variable focal length lens system 13 according to the third numerical example. Bf denotes back focus.

TABLE 12 f13T = 43.4872
f2 = −2.1512
f4 = −16.0695
Δ3 = 5.0919
β2w = −0.2000
β2t = −2.2920
β5t = 0.5482
f1 = 14.0354
Δ1 = 4.9343
(1) f13T/ft = 1.287
(2) f2/f4 = 0.133
(3) Δ3/ft = 0.151
(4) β2w · β2t = 0.458
(5) β5t = 0.548
(6) f1/ft = 0.415
(7) Δ1/ft = 0.146
(7) TLt/ft = 0.847

Figure 15:
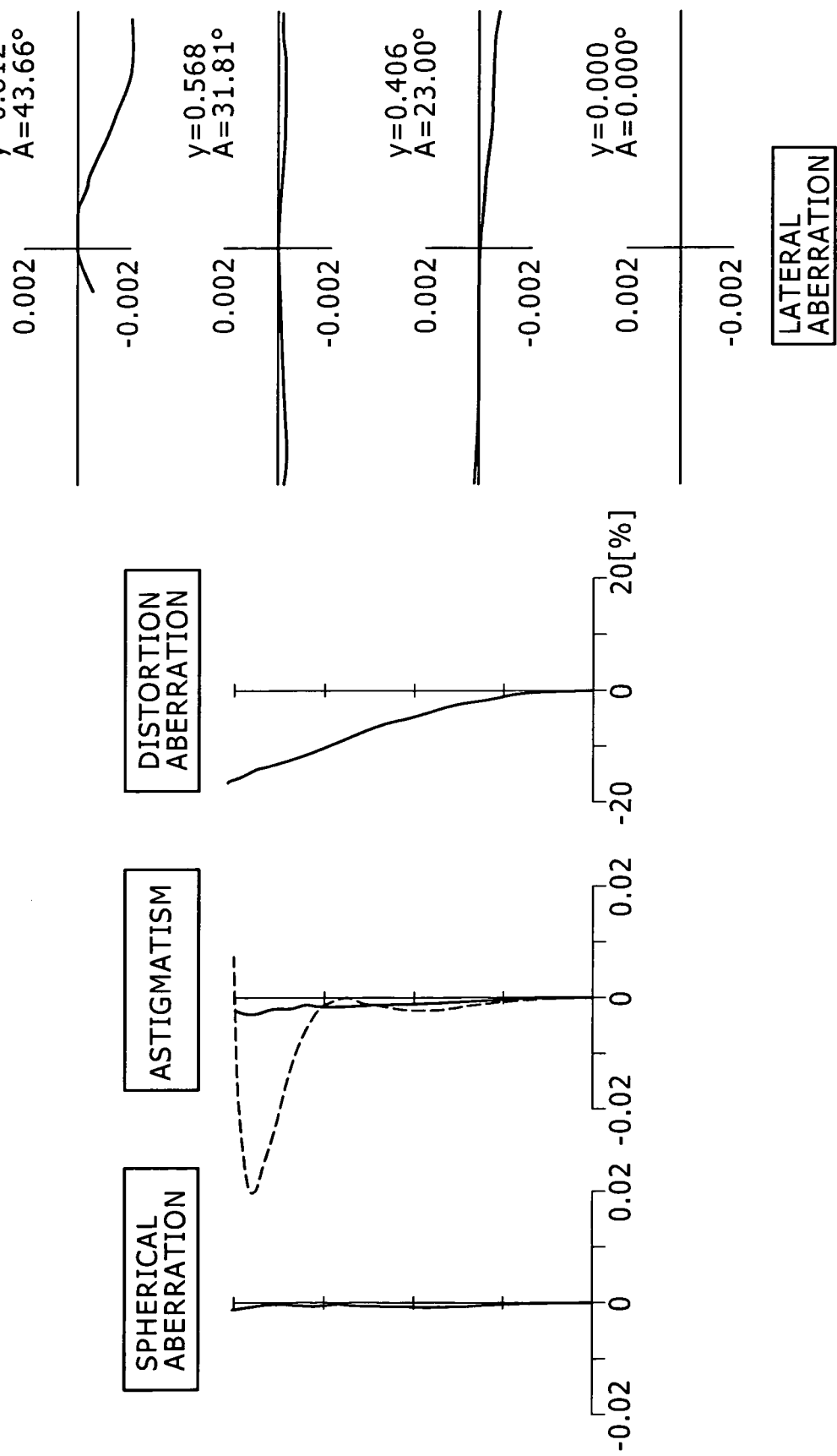
FIG. 15, in conjunction with FIGS. 16 to 19, is a diagram of aberrations of a numerical example in which concrete numerical values are applied to the third embodiment, the present diagram showing spherical aberration, astigmatism, distortion aberration, and lateral aberration in a wide-angle end state.
Figure 17:
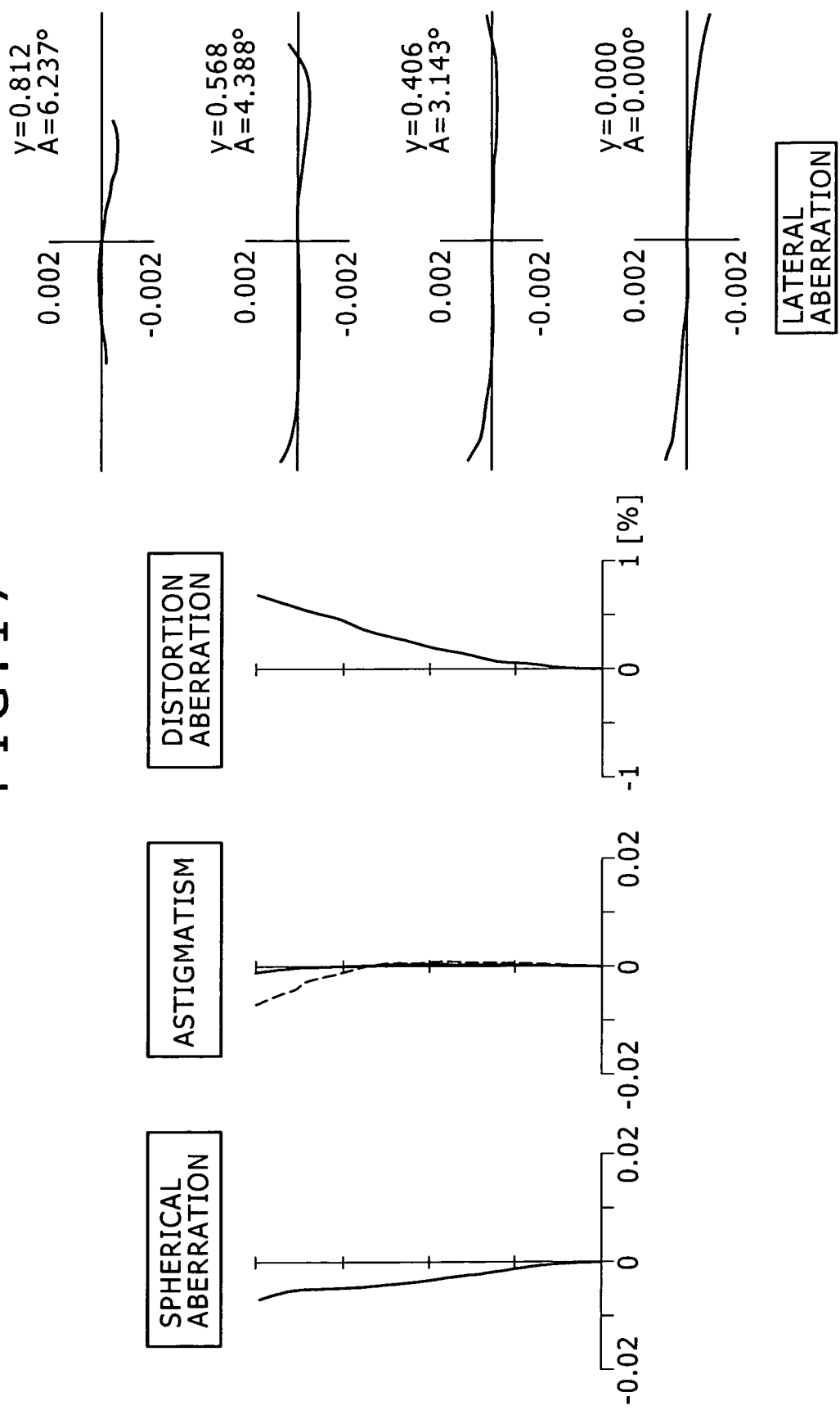
FIG. 17 is a diagram showing spherical aberration, astigmatism, distortion aberration, and lateral aberration in a second intermediate focal length state.
Figure 18:
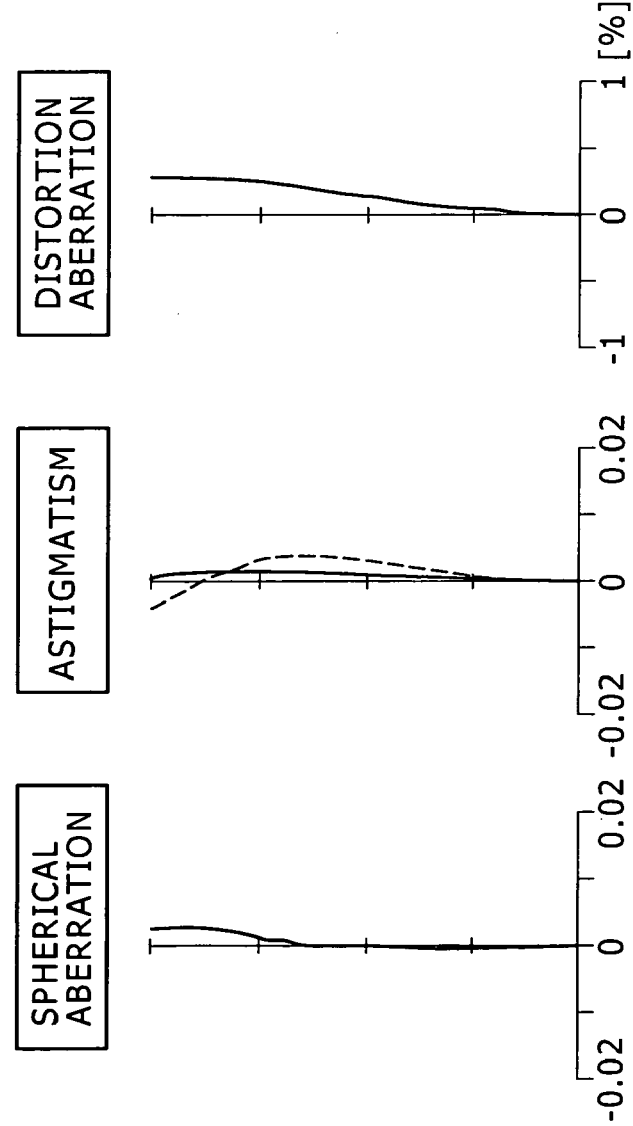
FIG. 18 is a diagram showing spherical aberration, astigmatism, distortion aberration, and lateral aberration in a third intermediate focal length state.
Figure 19:
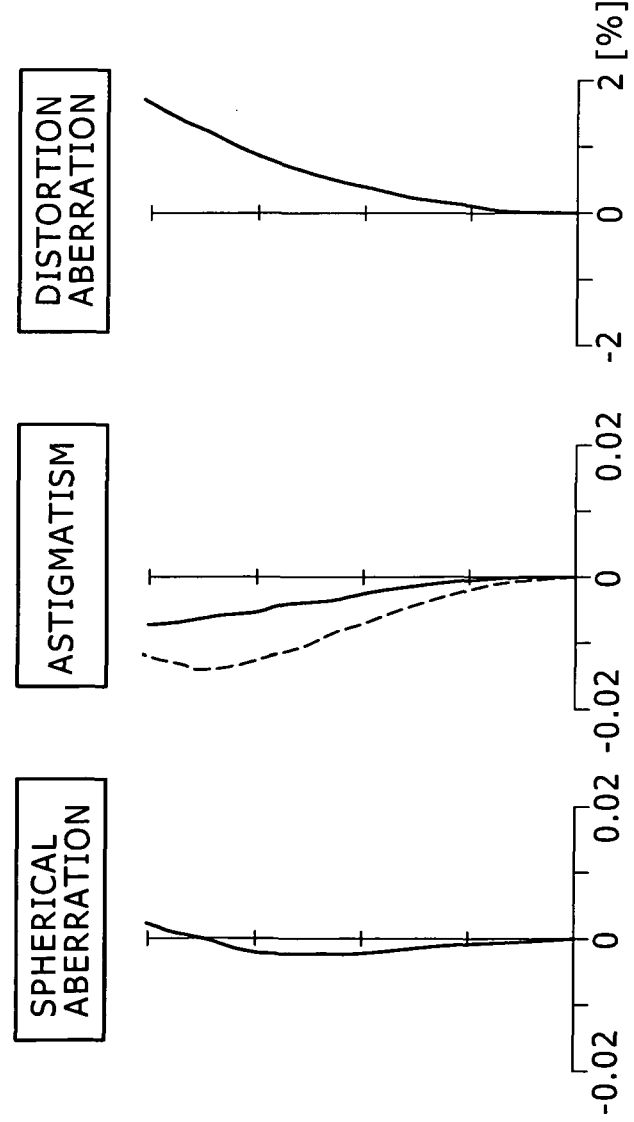
FIG. 19 is a diagram showing spherical aberration, astigmatism, distortion aberration, and lateral aberration in a telephoto end state.

Next, FIGS. 15 to 19 are diagrams of various aberrations in an infinity focused state of the third numerical example. FIG. 15 shows various aberrations in a wide-angle end state (f=1.000). FIG. 16 shows various aberrations in a first intermediate focal length state (f=2.495). FIG. 17 shows various aberrations in a second intermediate focal length state (f=7.377). FIG. 18 shows various aberrations in a third intermediate focal length state (f=15.274). FIG. 19 shows various aberrations in a telephoto end state (f=33.798).

In FIGS. 15 to 19, a solid line in spherical aberration diagrams indicates spherical aberration, a solid line in astigmatism diagrams represents a sagittal image surface and a broken line in the astigmatism diagrams represents a meridional image surface, a solid line in distortion aberration diagrams indicates distortion aberration, and A in lateral aberration diagrams denotes an angle of view (half angle of view) and y in the lateral aberration diagrams denotes image height. It is clear from the aberration diagrams that the variable focal length lens system 13 according to the third numerical example excellently corrects various aberrations, and has excellent image forming performance.

Incidentally, in the third numerical example, the first lens group G1 of the variable focal length lens system 13 linearly moves from the image surface side to the object side rather than moving to the object side after once moving to the image side.

Thus, according to the first to third numerical examples, the variable focal length lens systems 11, 12, and 13 have a very wide angle of view of mainly about 75 degrees to 95 degrees, as shown as 79.77 degrees, 86.56 degrees, and 87.34 degrees. At the same time, the variable focal length lens systems 11, 12, and 13 have a very high zoom ratio of about 30 times to about 40 times, as shown as 33.72 times to 33.80 times.

That is, the variable focal length lens systems 11, 12, and 13 are most suitable for a zoom lens whose F-number in the wide-angle end state is about 2.8, and the variable focal length lens systems 11, 12, and 13 can achieve a very wide angle of view of about 75 degrees to 95 degrees and a very high zoom ratio of about 30 times to about 40 times.

[Constitution of Image Pickup Device According to the Present Embodiment Having Variable Focal Length Lens System According to the Present Embodiment]

An image pickup device according to an embodiment of the present invention will next be described. This image pickup device includes the variable focal length lens system 1 (or 11, 12, or 13) according to an embodiment of the present invention and an image pickup element formed by a CCD (Charge Coupled Device) sensor or a CMOS (Complementary Metal Oxide Semiconductor) sensor, for example, for converting an optical image formed by the variable focal length lens system 1 into an electric signal.

The variable focal length lens system 1 (FIG. 1) includes a first lens group G1 having positive refractive power, a second lens group G2 having negative refractive power, a third lens group G3 having positive refractive power, a fourth lens group G4 having negative refractive power, and a fifth lens group G5 having positive refractive power in order from an object side.

Specifically, in the variable focal length lens system, when a lens position state is changed from a wide-angle end state to a telephoto end state, an air interval between the first lens group and the second lens group is increased, an air interval between the second lens group and the third lens group is decreased, an air interval between the third lens group and the fourth lens group is increased, and an air interval between the fourth lens group and the fifth lens group is changed, and the first lens group moves to the object side after once moving to an image side, the second lens group moves to the image side, the third lens group moves to the object side, the fourth lens group is movable in a direction of an optical axis, and the fifth lens group moves so as to compensate for variation in an image surface position, the variation in the image surface position being attendant on movement of each lens group.

Incidentally, in the variable focal length lens system, an aperture stop is disposed in the vicinity of the third lens group, for example on the object side of the third lens group, and moves in a state of being independent of the third lens group.

Three effects [A], [B], and [C] in the following are achieved by disposing the fourth lens group having negative refractive power in the variable focal length lens system.

[A] The lens system as a whole can be miniaturized by strengthening combined refractive power of the first to third lens groups in a positive direction.

[B] Distortion aberration can be corrected excellently by making refractive power arrangement of the lens system as a whole close to a symmetric type.

[C] Degradation in optical performance which degradation is attendant on increase in magnification can be prevented by increasing lens groups with a power varying effect.

In a four-group type zoom lens having positive, negative, positive, and positive power, on the other hand, combined refractive power of the first to third lens groups is weak, and it is difficult to shorten total lens length.

This is because the four-group type zoom lens having positive, negative, positive, and positive power is formed by dividing the third lens group of a three-group type zoom lens having positive, negative, and positive power into two positive lens groups, and the four-group type zoom lens has an objective of suppressing variation in off-axis aberration which variation is attendant on change in a lens position state by changing an interval between the two positive lens groups.

In this case, by forming the four-group type zoom lens having positive, negative, positive, and positive power such that light rays between the third lens group and the fourth lens group are substantially collimated light, spherical aberration does not change but only off-axis aberration changes when an interval between the two lens groups, that is, the third lens group and the fourth lens group is changed.

In actuality, in the variable focal length lens system, by disposing the fourth lens group having negative refractive power between the first to third lens groups and the fifth lens group, the combined refractive power of the first to third lens groups can be strengthened. As a result, mutual intervals between the first to third lens groups are shortened, and thus the total lens length can be shortened. The variable focal length lens system can thereby provide the above effect [A].

In addition, the variable focal length lens system includes the first to fifth lens groups that are positive, negative, positive, negative, and positive, respectively, and has an aperture stop disposed in the vicinity of the third lens group, whereby at least one positive lens and one negative lens can be arranged on the object side and the image side of the aperture stop.

As a result, in the variable focal length lens system, refractive power arrangements in front of and in the rear of the aperture stop approximates a symmetric type, and negative distortion aberration, which tends to occur in a wide-angle end state, can be corrected excellently. The variable focal length lens system can thereby provide the above effect [B].

Functions of each lens group in the variable focal length lens system will be described. In general, letting φA and φB be the refractive powers of two lens groups GA and GB, and letting d be an interval between the lens groups GA and GB, a combined refractive power φ is expressed as φ=φA+φB−φA·φB·d.

When the refractive powers of the lens groups GA and GB have different signs, the refractive powers of the two lens groups GA and GB cancel each other out, so that φA+φB of the combined refractive power φ has a low value and φA·φB remains. This means that φA·φB greatly affects the combined refractive power φ, and the combined refractive power φ changes easily when the interval d is changed.

When the refractive powers of the lens groups GA and GB have an identical sign, on the other hand, the refractive powers of the two lens groups GA and GB strengthen each other, so that φA+φB of the combined refractive power φ has a high value. This means that φA+φB greatly affects the combined refractive power φ, and the combined refractive power φ changes to a small degree when the interval d is changed.

That is, a high variable power ratio can be achieved by increasing combinations such that lens groups adjacent to each other have opposite refractive powers. Thus, by arranging the first to fifth lens groups that are positive, negative, positive, negative, and positive, respectively, in order from the object side, the variable focal length lens system can thereby provide the above effect [C].

An aberration correcting function of the variable focal length lens system will next be described. In a wide-angle end state, an off-axis luminous flux passing through the first lens group and the second lens group is distant from an optical axis because of a wide angle of view. Thus, in the variable focal length lens system, the off-axis luminous flux passing through the first lens group is prevented from spreading too much by arranging the first lens group and the second lens group in proximity to each other.

The variable focal length lens system narrows the angle of view and shortens a distance between the second lens group and the aperture stop when the lens position state is changed from the wide-angle end state to a telephoto end state, so that the off-axis luminous flux passing through the first lens group and the second lens group approaches the optical axis.

Therefore, the variable focal length lens system can excellently correct variation in off-axis aberration which variation is attendant on change in the lens position state using such change in height of the off-axis luminous flux passing through the first lens group and the second lens group.

In the variable focal length lens system, the fourth lens group and the fifth lens group are arranged on the image side of the aperture stop, so that distances between the aperture stop, the fourth lens group, and the fifth lens group change when the lens position state is changed. As a result, in the variable focal length lens system, the height of the off-axis luminous flux passing through the fourth lens group and the fifth lens group changes, and thus variation in off-axis aberration which variation is attendant on change in the lens position state can be corrected excellently.

Features of the variable focal length lens system using conditional expressions will next be described concretely. In actuality, a variable focal length lens system includes a first lens group having positive refractive power, a second lens group having negative refractive power, a third lens group having positive refractive power, a fourth lens group having negative refractive power, and a fifth lens group having positive refractive power, the first lens group, the second lens group, the third lens group, the fourth lens group, and the fifth lens group being arranged in order from an object side, wherein when a lens position state is changed from a wide-angle end state to a telephoto end state, each lens group moves such that an air interval between the first lens group and the second lens group is increased, an air interval between the second lens group and the third lens group is decreased, an air interval between the third lens group and the fourth lens group is increased, and an air interval between the fourth lens group and the fifth lens group is changed, the second lens group moves to an image side, the third lens group moves to the object side, the first lens group is situated on the object side in the telephoto end state as compared with the wide-angle end state, and an aperture stop is disposed in proximity to the third lens group, and the variable focal length lens system satisfies the following conditional expression (1):

$$0.95 < f13T/ft < 1.4 \tag{1}$$

where f13T is combined focal length of the first to third lens groups in the telephoto end state, and ft is focal length of the lens system as a whole in the telephoto end state.

This conditional expression (1) defines the combined focal length f13T of the first to third lens groups in the telephoto end state, and is to provide the above effect [A] due to strengthened combined refractive power of the first to third lens groups.

This variable focal length lens system is characterized in that a maximum value of the conditional expression (1) is lower than a value in the related art in order to shorten total lens length while increasing a zoom ratio.

When f13T/ft exceeds the upper limit value of the conditional expression (1), the total lens length of the variable focal length lens system in the telephoto end state is lengthened, and thus the variable focal length lens system is increased in size, which is contrary to the spirit of the present invention.

When f13T/ft is less than the lower limit value of the conditional expression (1), the magnification of the fourth lens group in the variable focal length lens system in the telephoto end state is increased, and it is difficult to excellently correct variation in axial aberration which variation is attendant on change in the lens position state.

In addition, a variable focal length lens system includes a first lens group having positive refractive power, a second lens group having negative refractive power, a third lens group having positive refractive power, a fourth lens group having negative refractive power, and a fifth lens group having positive refractive power, the first lens group, the second lens group, the third lens group, the fourth lens group, and the fifth lens group being arranged in order from an object side, wherein when a lens position state is changed from a wide-angle end state to a telephoto end state, each lens group moves such that an air interval between the first lens group and the second lens group is increased, an air interval between the second lens group and the third lens group is decreased, an air interval between the third lens group and the fourth lens group is increased, and an air interval between the fourth lens group and the fifth lens group is changed, the second lens group moves to an image side, the third lens group moves to the object side, the first lens group is situated on the object side in the telephoto end state as compared with the wide-angle end state, and an aperture stop is disposed in proximity to the third lens group, and the variable focal length lens system satisfies the following conditional expression (2):

$$0.08 < f2/f4 < 0.3 \quad (2)$$

where f2 is focal length of the second lens group, and f4 is focal length of the fourth lens group.

The conditional expression (2) defines a refractive power ratio between the second lens group and the fourth lens group, and is to provide the above effect [B] due to making refractive power arrangements in front of and in the rear of the aperture stop closer to a symmetric type.

When f2/f4 exceeds the upper limit value of the conditional expression (2), the variable focal length lens system strengthens the negative refractive power of the fourth lens group and weakens the negative refractive power of the second lens group at the same time, an off-axis luminous flux incident on the first lens group in the wide-angle end state goes away from an optical axis, and the lens diameter of the first lens group is increased.

As a result, in the variable focal length lens system, it is difficult to excellently correct off-axis aberration occurring in a peripheral part of a screen in the wide-angle end state, and the variable focal length lens system may not be miniaturized sufficiently.

When f2/f4 is less than the lower limit value of the conditional expression (2), the variable focal length lens system strengthens the negative refractive power of the second lens group and weakens the negative refractive power of the fourth lens group at the same time, and an off-axis luminous flux passing the second lens group in the wide-angle end state approaches the optical axis.

As a result, in the variable focal length lens system, there is no difference in range of passage between the height of the off-axis luminous flux passing through the second lens group in the wide-angle end state and the height of the off-axis luminous flux passing through the second lens group in the telephoto end state. It is thus difficult to correct a variation in off-axis aberration and a variation in axial aberration, which variations occur as the lens position state is changed, in a well-balanced manner.

Further, a variable focal length lens system includes a first lens group having positive refractive power, a second lens group having negative refractive power, a third lens group having positive refractive power, a fourth lens group having negative refractive power, and a fifth lens group having positive refractive power, the first lens group, the second lens group, the third lens group, the fourth lens group, and the fifth lens group being arranged in order from an object side, wherein when a lens position state is changed from a wide-angle end state to a telephoto end state, each lens group moves such that an air interval between the first lens group and the second lens group is increased, an air interval between the second lens group and the third lens group is decreased, an air interval between the third lens group and the fourth lens group is increased, and an air interval between the fourth lens group and the fifth lens group is changed, the second lens group moves to an image side, the third lens group moves to the object side, the first lens group is situated on the object side in the telephoto end state as compared with the wide-angle end state, and an aperture stop is disposed in proximity to the third lens group, and the variable focal length lens system satisfies the following conditional expression (3):

$$0.06 < \Delta 3/ft < 0.22 \quad (3)$$

where ft is focal length of the lens system as a whole in the telephoto end state, and $\Delta 3$ is an amount of travel of the third lens group from the wide-angle end state to the telephoto end state.

The conditional expression (3) defines a ratio between the amount $\Delta 3$ of travel of the third lens group, the amount $\Delta 3$ of travel of the third lens group being attendant on change in the lens position state, and the focal length ft in the telephoto end state, and is to provide the above effect [C].

Letting Z be a zoom ratio (ft/fw), the denominator ft of the conditional expression (3) can be written as ft=fw·Z. Then, the conditional expression (3) can also be said to define $\Delta 3/Z$ by replacing the denominator ft with fw·Z and normalizing the fw.

When $\Delta 3/ft$ exceeds the upper limit value of the conditional expression (3), the amount of travel of the third lens group in the variable focal length lens system is increased, a distance between the third lens group and an image surface changes greatly, and variation in exit pupil position which variation is attendant on the lens position state is increased.

As a result, in the variable focal length lens system, the off-axis luminous flux passing through the fifth lens group in the telephoto end state is greatly separated from the optical axis, and it is difficult to excellently correct coma aberration occurring in a peripheral part of a screen.

When $\Delta 3/ft$ is less than the lower limit value of the conditional expression (3), on the other hand, the third lens group remains in a similar position regardless of the lens position state of the variable focal length lens system, and the lateral magnification of the second lens group greatly changes in the wide-angle end state and the telephoto end state.

As a result, the variable focal length lens system may not excellently correct variation in off-axis aberration which variation is attendant on change in the lens position state, and it is difficult to improve the performance of the variable focal length lens system sufficiently.

[Variable Focal Length Lens System According to Another Embodiment of the Present Invention and Image Pickup Device According to an Embodiment of Present Invention]

The best modes for carrying out a variable focal length lens system according to an embodiment of the present invention and an image pickup device according to an embodiment of the present invention will next be described.

[Configuration of Other Variable Focal Length Lens System]

A variable focal length lens system according to an embodiment of the present invention is formed by arranging a first lens group having positive refractive power, a second lens group having negative refractive power, a third lens group having positive refractive power, a fourth lens group having negative refractive power, and a fifth lens group having positive refractive power in order from an object side to an image side.

In addition, in the variable focal length lens system according to an embodiment of the present invention, when a lens position state is changed from a wide-angle end state to a telephoto end state, an interval between the first lens group and the second lens group is increased, an interval between the second lens group and the third lens group is decreased, an interval between the third lens group and the fourth lens group is increased, and an interval between the fourth lens group and the fifth lens group is changed.

Further, in the variable focal length lens system according to an embodiment of the present invention, when the lens position state is changed from the wide-angle end state to the telephoto end state, the first lens group, the fourth lens group, and the fifth lens group move in a direction of an optical axis, the second lens group moves to the image side, and the third lens group moves to the object side.

Further, in the variable focal length lens system according to an embodiment of the present invention, the first lens group is situated on the object side in the telephoto end state as compared with the wide-angle end state, and an aperture stop moves integrally with the third lens group.

In addition, the variable focal length lens system according to an embodiment of the present invention satisfies the following conditional expressions (9) and (10):

$$0.4 < f1/ft < 0.6 \quad (9)$$

$$0.15 < \Delta 1/ft < 0.45 \quad (10)$$

where f1 is focal length of the first lens group, ft is focal length of the lens system as a whole in the telephoto end state, and Δ1 is an amount of travel of the first lens group from the wide-angle end state to the telephoto end state.

The conditional expression (9) defines the focal length of the first lens group in the telephoto end state.

When f1/ft exceeds the upper limit of the conditional expression (9), the refractive power of the first lens group becomes too weak. Therefore, a travel distance from the wide-angle end to the telephoto end has to be lengthened to obtain a high variable power ratio, and miniaturization becomes difficult.

When f1/ft is less than the lower limit of the conditional expression (9), on the other hand, the refractive power of the first lens group becomes too strong. Thus, while miniaturization can be achieved, aberration tends to occur in the first lens group, and it is difficult for the second and subsequent lens groups to correct the aberration occurring in the first lens group.

Thus, when the variable focal length lens system satisfies the conditional expression (9), a higher variable power and miniaturization can be achieved, and higher performance can be achieved by suppressing the occurrence of aberration in the first lens group.

The conditional expression (10) defines an amount of travel of the first lens group from the wide-angle end state to the telephoto end state.

When Δ1/ft exceeds the upper limit of the conditional expression (10), the amount of travel of the first lens group is increased, an amount of travel of the lens system as a whole is increased, and thus miniaturization becomes difficult.

In a case where Δ1/ft is less than the lower limit of the conditional expression (10), on the other hand, aberration tends to occur when the refractive power of the first lens group is strengthened to achieve a higher variable power, so that characteristics are degraded.

Thus, when the variable focal length lens system satisfies the conditional expression (10), a higher variable power and miniaturization can be achieved, and higher performance can be achieved by suppressing the occurrence of aberration.

Incidentally, in the variable focal length lens system according to an embodiment of the present invention, the fifth lens group moves so as to compensate for variation in image surface position which variation is attendant on the movement of each lens group, and an aperture stop is disposed in the vicinity of the third lens group.

The variable focal length lens system according to an embodiment of the present invention, being formed as described above, can secure an angle of view in the wide-angle end state of 75 degrees to 95 degrees, a variable power ratio of 30 times to 40 times, and a value of about 2.8 as an F-number in the wide-angle end state.

Thus, miniaturization is ensured and a higher variable power can be achieved. In addition, lens barrel structure can be simplified.

The variable focal length lens system according to an embodiment of the present invention desirably satisfies the following conditional expression (11):

$$0.8 < Lt/ft < 1.1 \quad (11)$$

where Lt is total length in the telephoto end state.

The conditional expression (11) defines relation between total length and focal length in the telephoto end state.

When Lt/ft exceeds the upper limit of the conditional expression (11), the total length is increased, and thus miniaturization may not be achieved.

When Lt/ft is less than the lower limit of the conditional expression (11), on the other hand, a travel distance of each group from the wide-angle end to the telephoto end is reduced too much. The refractive power of each group therefore has to be strengthened to achieve a higher variable power. As a result, aberration tends to occur.

Thus, when the variable focal length lens system satisfies the conditional expression (11), a higher variable power and miniaturization can be achieved, and higher performance can be achieved by suppressing the occurrence of aberration.

The variable focal length lens system according to an embodiment of the present invention desirably satisfies the following conditional expression (12):

$$-2.5 < f4/(fw \cdot ft)^{1/2} < -1.3 \quad (12)$$

where f4 is focal length of the fourth lens group, and fw is focal length of the lens system as a whole in the wide-angle end state.

The conditional expression (12) defines the focal length of the fourth lens group.

When $f4/(fw \cdot ft)^{1/2}$ exceeds the upper limit of the conditional expression (12), the refractive power of the fourth lens group becomes too weak, and it is difficult to correct off-axis aberration. In addition, the optical system is increased in size.

When $f4/(fw \cdot ft)^{1/2}$ is less than the lower limit of the conditional expression (12), on the other hand, the refractive power of the fourth lens group becomes too strong, and it is difficult to balance with off-axis aberration occurring in the other lens groups.

Thus, when the variable focal length lens system satisfies the conditional expression (12), higher performance due to excellent correction of off-axis aberration and miniaturization can be achieved.

In the variable focal length lens system according to an embodiment of the present invention, the first lens group is desirably formed by a cemented lens formed by joining together a negative lens situated on the object side and a positive lens situated on the image side and a positive lens situated on the image side of the cemented lens.

The first lens group formed as described above can suppress the occurrence of spherical aberration and chromatic aberration when a higher variable power is achieved.

In addition, in the variable focal length lens system according to an embodiment of the present invention, the second lens group is desirably formed by a cemented lens formed by joining together a negative lens of a biconcave shape situated on the object side and a positive lens of a biconvex shape situated on the image side and a negative lens of a meniscus shape situated on the object side of the cemented lens and having a concave surface facing the image side.

The second lens group formed as described above can reduce off-axis aberration occurring at a time of zooming.

Further, in the variable focal length lens system according to an embodiment of the present invention, the third lens group is desirably formed by a cemented lens formed by joining together a positive lens of a biconvex shape situated on the object side and a negative lens of a biconcave shape situated on the image side and a positive lens situated on the image side of the cemented lens, a surface foremost on the object side being formed as an aspheric surface.

The third lens group formed as described above can excellently correct variation in spherical aberration occurring at a time of zooming.

Further, in the variable focal length lens system according to an embodiment of the present invention, the fourth lens group is desirably formed by a negative lens of a biconcave shape, a surface on the object side being formed as an aspheric surface.

The fourth lens group formed as described above can reduce spherical aberration occurring at a time of zooming.

In addition, in the variable focal length lens system according to an embodiment of the present invention, the fifth lens group is desirably formed by a cemented lens formed by joining together a positive lens of a biconvex shape situated on the object side and a negative lens of a meniscus shape situated on the image side and having a concave surface facing the object side.

The fifth lens group formed as described above and moved in the direction of an optical axis can suppress aberration variation occurring according to a photographing distance.

Incidentally, the variable focal length lens system according to an embodiment of the present invention can shift an image by moving (shifting) one lens group or a part of one lens group among the first to fifth lens groups in a direction substantially perpendicular to the optical axis. The variable focal length lens system can be made to function also as a vibration-proof optical system by thus moving a lens group or a part of the lens group in a direction substantially perpendicular to the optical axis and combining the variable focal length lens system with a detecting system for detecting an image blur, a driving system for shifting each lens group, and a controlling system for giving an amount of shift to the driving system on the basis of output of the detecting system.

In addition, by disposing the aperture stop in the vicinity of the third lens group, an off-axis luminous flux passes near the optical axis. It is therefore possible to suppress variation in off-axis aberration occurring when the third lens group is shifted in the substantially perpendicular direction.

Further, the variable focal length lens system according to an embodiment of the present invention allows a low-pass filter for preventing moire fringes to be disposed therein on the image side of the lens system or allows an infrared absorbing filter to be disposed therein according to the spectral sensitivity characteristics of a light receiving element.

In addition, higher optical performance can be ensured by forming a plurality of aspheric surfaces in the optical system of the variable focal length lens system.

[Numerical Examples of Variable Focal Length Lens System According to an Embodiment of the Present Invention]

Other concrete embodiment of the variable focal length lens system according to the present invention and numerical examples in which concrete numerical values are applied to the embodiment will be described in the following with reference to drawings (see FIGS. 20 to 34) and tables (see Tables 13 to 21).

Incidentally, the meanings and the like of symbols shown in each table and description in the following are as follows.

"ASP" in relation to a surface number (r) denotes that the surface in question is an aspheric surface. "BF" denotes back focus. "κ" denotes a conic constant. "A," "B," "C," and "D" denote aspheric coefficients of a 4th order, a 6th order, an 8th order, and a 10th order, respectively.

An index of refraction is a value corresponding to a d-line ($\lambda$=587.6 nm). A radius of curvature "∞" means that the surface in question is a plane.

Figure 20:
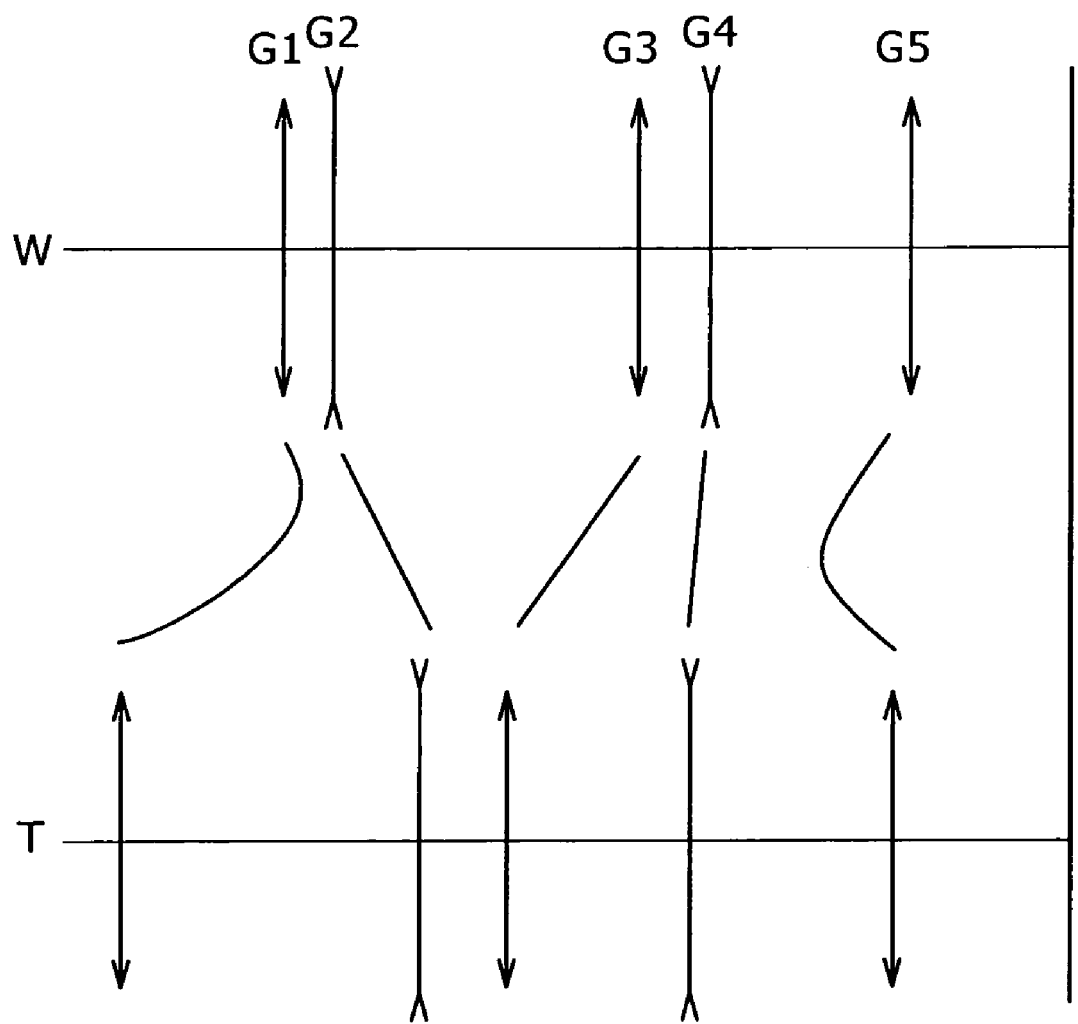
FIG. 20 is a diagram showing a refractive power distribution in each embodiment of a variable focal length lens system according to another present invention.

FIG. 20 shows a refractive power distribution in each example of a variable focal length lens system 2 according to an embodiment of the present invention.

The variable focal length lens system 2 is formed by arranging a first lens group G1 having positive refractive power, a second lens group G2 having negative refractive power, a third lens group G3 having positive refractive power, a fourth lens group G4 having negative refractive power, and a fifth lens group G5 having positive refractive power in order from an object side to an image side.

In the variable focal length lens system 2, when a lens position state is changed from a wide-angle end state to a telephoto end state, an interval between the first lens group G1 and the second lens group G2 is increased, an interval between the second lens group G2 and the third lens group G3 is decreased, an interval between the third lens group G3 and the fourth lens group G4 is increased, and an interval between the fourth lens group G4 and the fifth lens group G5 is changed. At this time, the first lens group G1 moves to the object side after once moving to the image side, the second lens group G2 moves to the image side, the third lens group G3 moves to the object side, the fourth lens group G4 moves in a direction of an optical axis, and the fifth lens group G5 moves to the image side after once moving to the object side. The fifth lens group G5 moves so as to compensate for variation in an image surface position, the variation in the image surface position being attendant on movement of each lens group, and moves to the object side at a time of short-range focusing. An aperture stop is disposed in the vicinity of the third lens group G3 on the object side of the third lens group G3, and moves integrally with the third lens group G3.

Fourth Embodiment

Fourth Numerical Example

Figure 21:
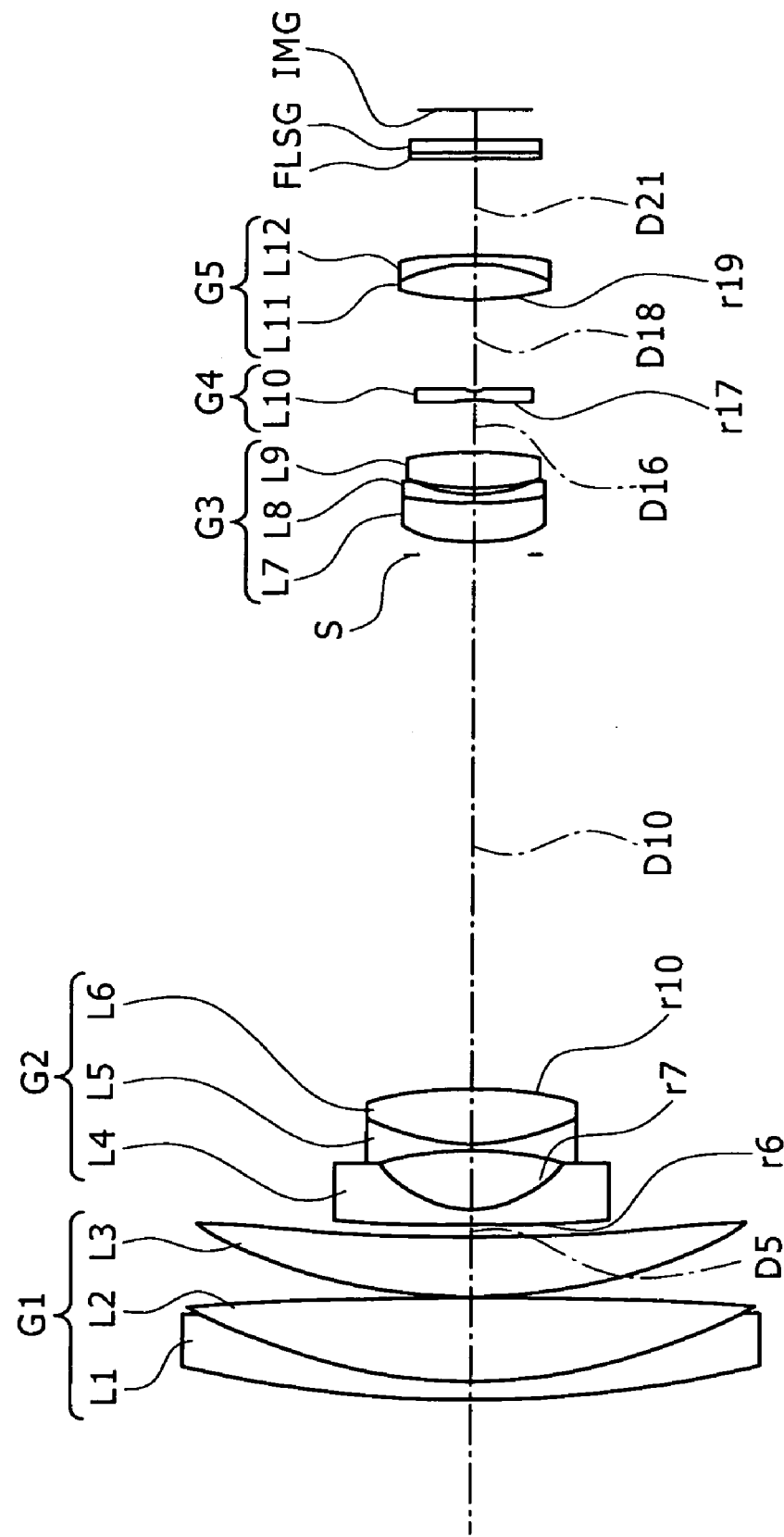
FIG. 21 is a diagram showing a lens configuration of a fourth embodiment of the variable focal length lens system according to the present invention.

FIG. 21 shows a lens configuration of a variable focal length lens system 14 according to a fourth embodiment. The variable focal length lens system 14 has 12 lenses.

A first lens group G1 is formed by arranging a cemented lens formed by joining together a negative lens L1 of a meniscus shape having a convex surface facing an object side and a positive lens L2 of a biconvex shape and a positive lens L3 of a meniscus shape having a convex surface facing the object side in order from the object side to an image side.

A second lens group G2 is formed by arranging a negative lens L4 having a concave surface facing the image side and a cemented lens formed by joining together a negative lens L5 of a biconcave shape and a positive lens L6 of a biconvex shape in order from the object side to the image side.

A third lens group G3 is formed by arranging a cemented lens formed by joining together a positive lens L7 of a meniscus shape having a convex shape facing the object side and a negative lens L8 of a meniscus shape having a concave surface facing the image side and a positive lens L9 of a biconvex shape in order from the object side to the image side.

A fourth lens group G4 is formed by a negative lens L10 of a biconcave shape.

A fifth lens group G5 is formed by a cemented lens formed by joining together a positive lens L11 of a biconvex shape and a negative lens L12 of a meniscus shape having a concave surface facing the object side.

An aperture stop S is disposed on the object side of the third lens group, and moves integrally with the third lens group.

A filter FL and a seal glass SG are disposed between the fifth lens group G5 and an image surface IMG.

Table 13 shows lens data of a fourth numerical example in which concrete numerical values are applied to the variable focal length lens system 14 according to the fourth embodiment.

Formed as an aspheric surface in the variable focal length lens system 14 are both surfaces of the negative lens L4 in the second lens group G2 (surface number 6 and surface number 7), a surface on the image side of the positive lens L6 in the second lens group G2 (surface number 10), a surface on the object side of the positive lens L7 in the third lens group G3 (surface number 12), a surface on the object side of the negative lens L10 in the fourth lens group G4 (surface number 17), and a surface on the object side of the positive lens L11 in the fifth lens group G5 (surface number 19). The aspheric coefficients A, B, C, and D of the 4th order, the 6th order, the 8th order, and the 10th order of the aspheric surfaces in the fourth numerical example are shown in Table 14 together with the conic constant κ.

Incidentally, in Table 14 and each table showing aspheric coefficients to be described later, "E-i" is an exponential representation having a base of 10, that is, "E-i" denotes "$10^{-i}$." For example, "0.12345E-05" denotes "0.12345× $10^{-5}$."

TABLE 14

|  | κ | A | B | C | D |
|---|---|---|---|---|---|
| 6TH SURFACE | 0.000 | 1.7853E-04 | -3.3354E-06 | 2.5327E-08 | -7.4264E-11 |
| 7TH SURFACE | 0.000 | 1.9613E-04 | -5.9267E-07 | 2.3956E-08 | -7.5958E-10 |
| 10TH SURFACE | 0.000 | -2.3794E-05 | 6.6830E-07 | 5.9809E-09 | 0.0 |
| 12TH SURFACE | -0.46867 | -3.0276E-06 | 1.2088E-07 | 2.9761E-09 | 0.0 |
| 17TH SURFACE | 0.000 | -5.1040E-07 | 1.0504E-06 | -2.8375E-08 | 0.0 |
| 19TH SURFACE | 0.000 | -1.0204E-05 | -3.1304E-07 | 1.1441E-08 | 0.0 |

TABLE 13

| SURFACE NUMBER | RADIUS OF CURVATURE | SURFACE INTERVAL | INDEX OF REFRACTION | ABBE NUMBER |
|---|---|---|---|---|
| 1 | 90.833 | 1.4 | 1.91082 | 35.25 |
| 2 | 42.338 | 6.186 | 1.497 | 81.61 |
| 3 | -249.504 | 0.1 | | |
| 4 | 38.969 | 4.734 | 1.59282 | 68.63 |
| 5 | 217.347 | (D5) | | |
| 6 (ASP) | ∞ | 1.0 | 1.88072 | 37.30 |
| 7 (ASP) | 8.757 | 4.704 | | |
| 8 | -20.461 | 0.435 | 1.90366 | 31.32 |
| 9 | 15.722 | 3.917 | 2.00178 | 19.32 |
| 10 (ASP) | -41.960 | (D10) | | |
| 11 | ∞ | 1.2 | (APERTURE STOP) | |
| 12 (ASP) | 10.082 | 3.302 | 1.76802 | 49.24 |
| 13 | 44.087 | 0.611 | 1.80610 | 33.27 |
| 14 | 9.756 | 0.464 | | |
| 15 | 19.783 | 2.452 | 1.59282 | 68.63 |
| 16 | -24.126 | (D16) | | |
| 17 (ASP) | -65.364 | 1.0 | 1.688935 | 31.16 |
| 18 | 91.707 | (D18) | | |
| 19 (ASP) | 17.708 | 2.950 | 1.58313 | 59.46 |
| 20 | -11.595 | 0.7 | 1.90366 | 31.32 |
| 21 | -26.642 | (D21) | | |
| 22 | ∞ | 0.43 | 1.516798 | 64.19 |
| 23 | ∞ | 1.0 | 1.552320 | 63.4 |
| 24 | ∞ | (BF) | | |

In the variable focal length lens system 14, changed when power is varied between a wide-angle end state and a telephoto end state are a surface interval D5 between the first lens group G1 and the second lens group G2, a surface interval D10 between the second lens group G2 and the aperture stop S, a surface interval D16 between the third lens group G3 and the fourth lens group G4, a surface interval D18 between the fourth lens group G4 and the fifth lens group G5, and a surface interval D21 between the fifth lens group G5 and the filter FL. Each surface interval and variable intervals in the wide-angle end state, an intermediate focal length state, and the telephoto end state of back focus in the fourth numerical example are shown in Table 15 together with an F-number, an angle of view, image height, and total lens length.

TABLE 15

|  | WIDE-ANGLE END | INTERMEDIATE FOCAL LENGTH | TELEPHOTO END |
|---|---|---|---|
| FOCAL LENGTH | 4.38 | 22.10 | 148.44 |
| F-NUMBER | 2.84 | 3.67 | 5.02 |
| ANGLE OF VIEW | 86.7 | 19.67 | 2.92 |
| IMAGE HEIGHT | 3.88 | 3.88 | 3.88 |

TABLE 15-continued

| | WIDE-ANGLE END | INTERMEDIATE FOCAL LENGTH | TELEPHOTO END |
|---|---|---|---|
| TOTAL LENS LENGTH | 98.16 | 109.71 | 128.9 |
| D5 | 0.75 | 28.037 | 49.136 |
| D10 | 40.635 | 11.28 | 1.15 |
| D16 | 3.942 | 9.34 | 16.027 |
| D18 | 6.681 | 7.368 | 17.893 |
| D21 | 7.585 | 15.12 | 6.12 |
| BF | 2.087 | 2.065 | 2.072 |

The starting surface and focal length of each group in the fourth numerical example are shown in Table 16.

TABLE 16

| GROUP | STARTING SURFACE | FOCAL LENGTH |
|---|---|---|
| 1 | 1 | 67.459 |
| 2 | 6 | −8.85 |
| 3 | 12 | 19.161 |
| 4 | 17 | −54.834 |
| 5 | 19 | 25.810 |

Figure 22:
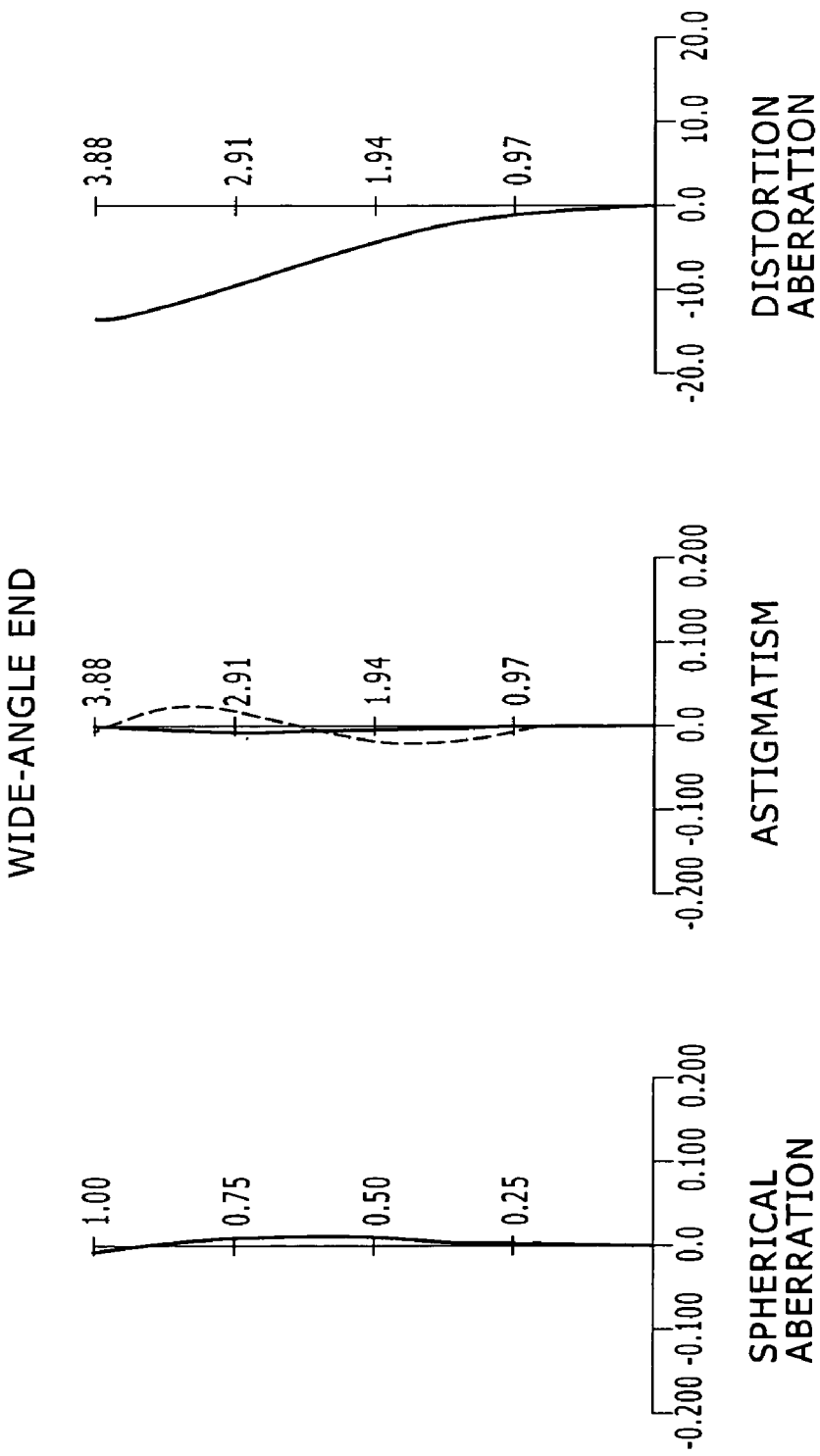
FIG. 22, in conjunction with FIGS. 23 to 27, is a diagram of aberrations of a numerical example in which concrete numerical values are applied to the fourth embodiment, the present diagram showing spherical aberration, astigmatism, and distortion aberration in a wide-angle end state.
Figure 23:
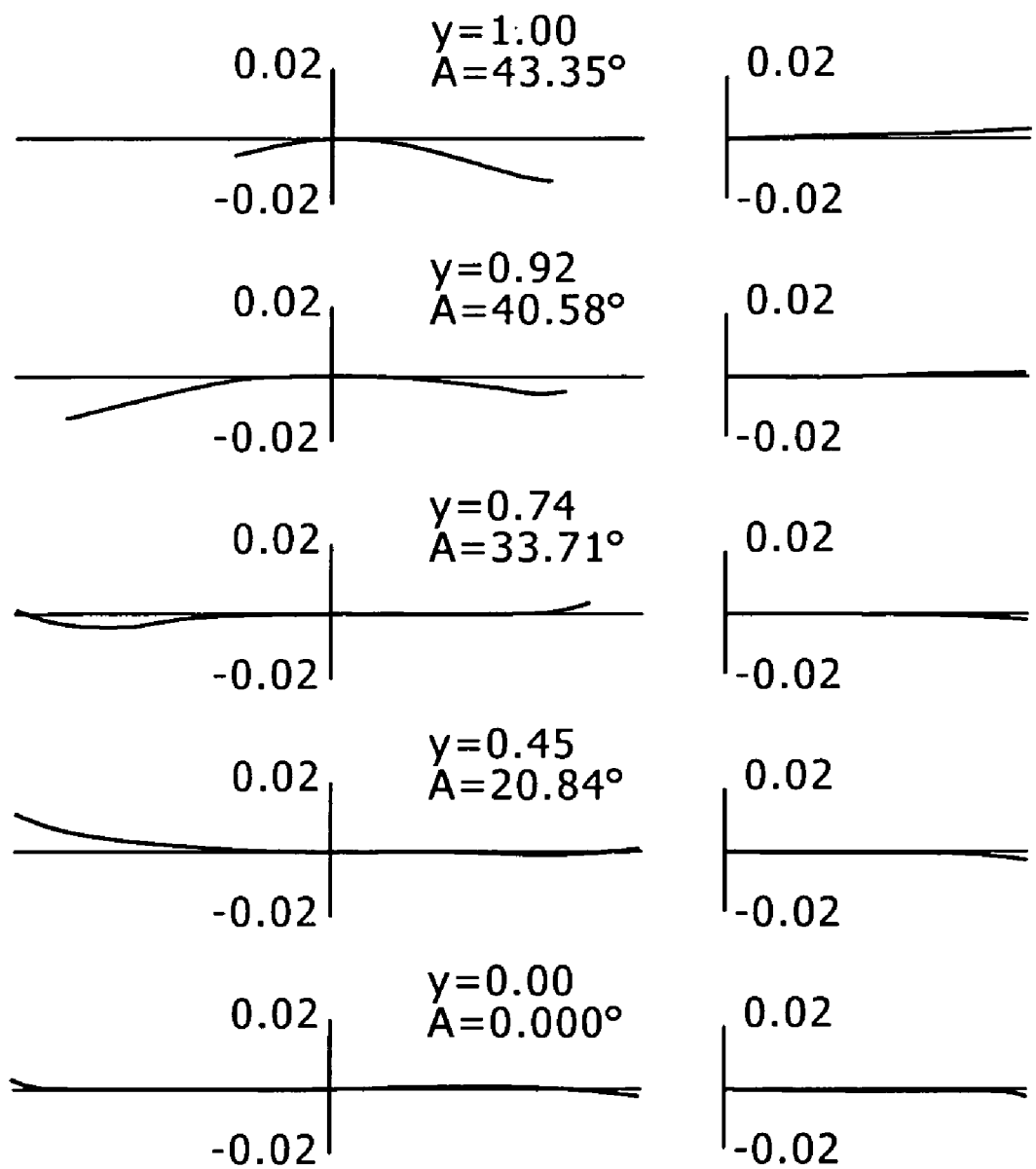
FIG. 23 is a diagram showing lateral aberration in the telephoto end state.
Figure 24:
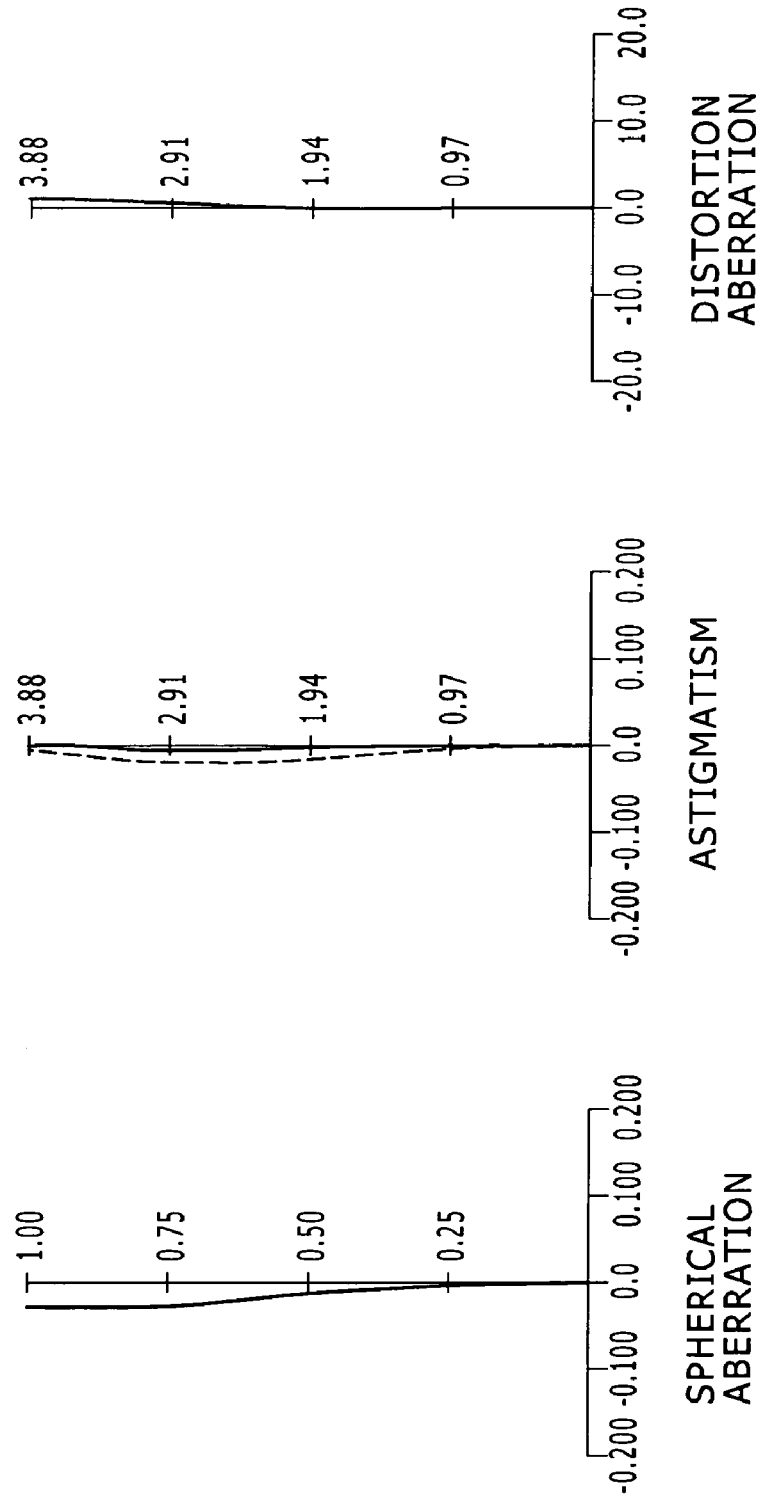
FIG. 24 is a diagram showing spherical aberration, astigmatism, and distortion aberration in an intermediate focal length state.
Figure 25:
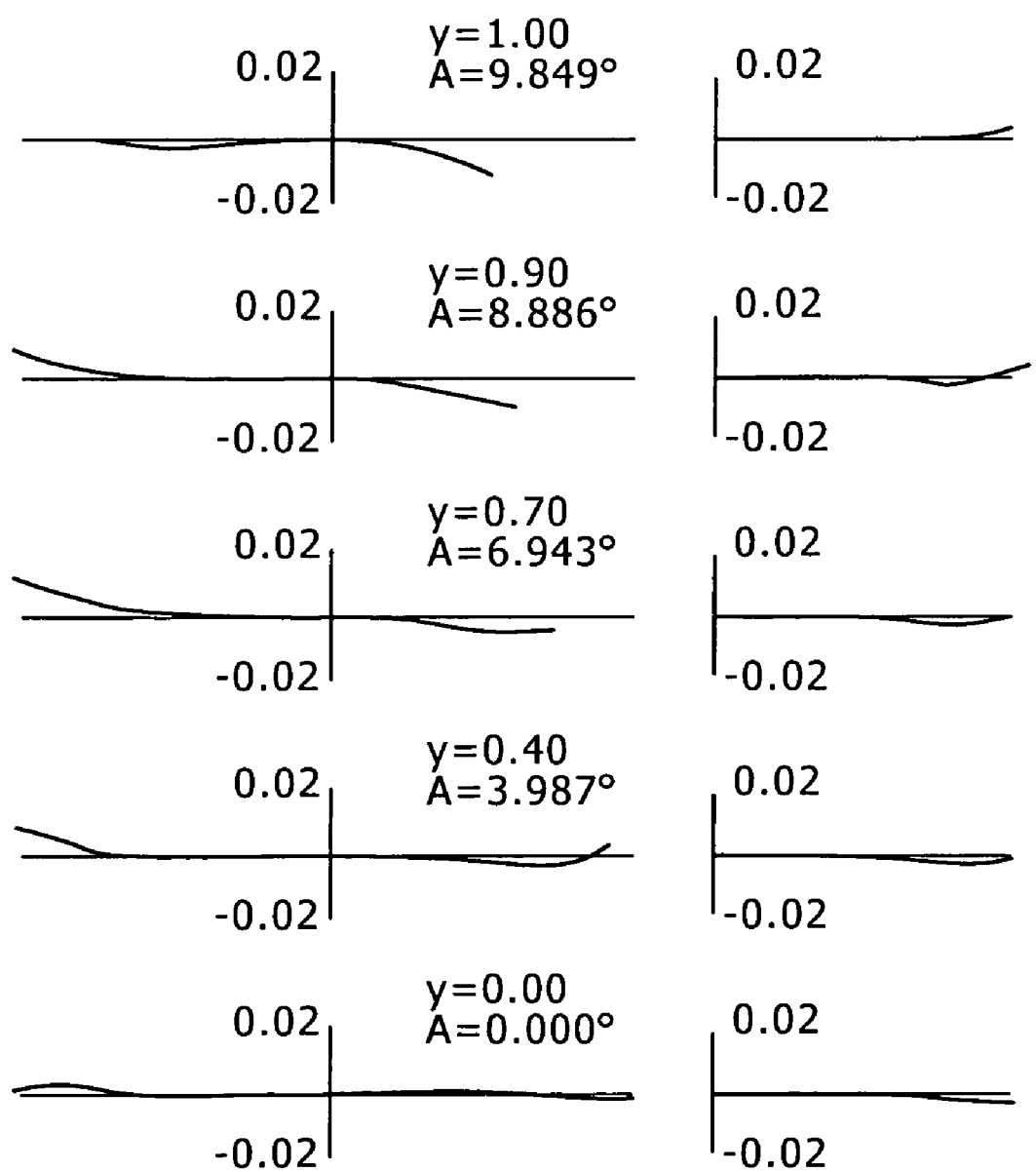
FIG. 25 is a diagram showing lateral aberration in the intermediate focal length state.
Figure 26:
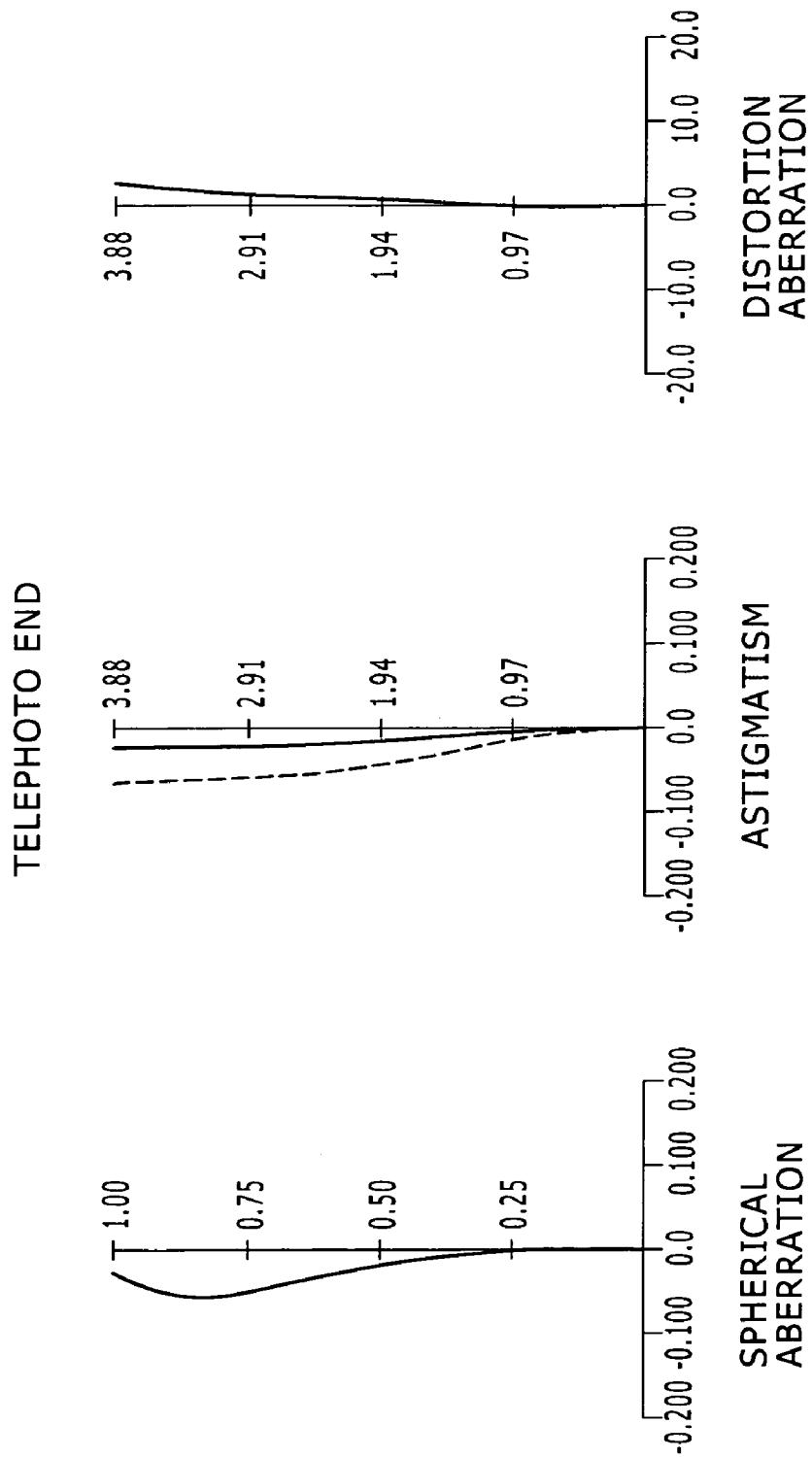
FIG. 26 is a diagram showing spherical aberration, astigmatism, and distortion aberration in a telephoto end state.
Figure 27:
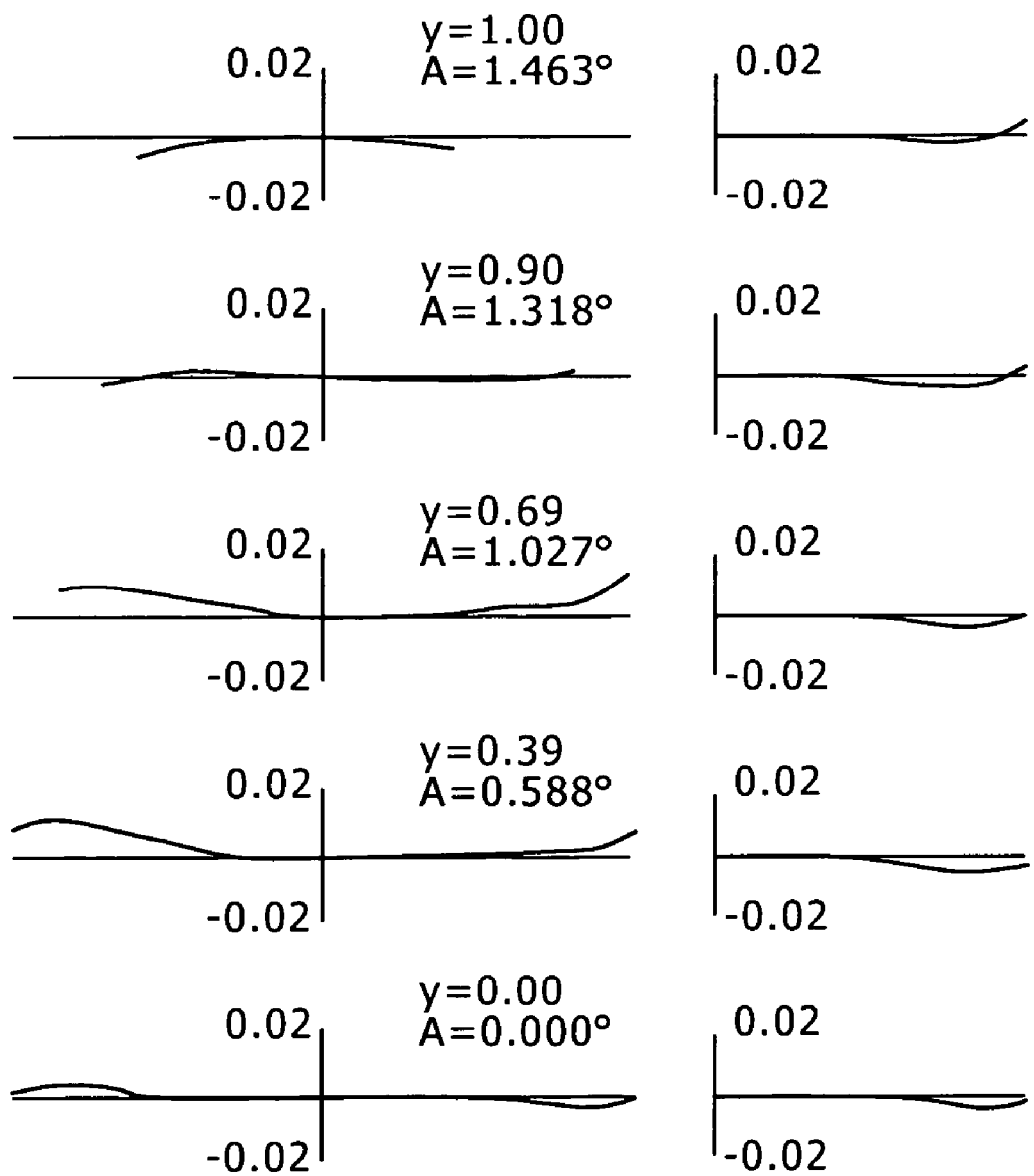
FIG. 27 is a diagram showing lateral aberration in the telephoto end state.

FIGS. 22 to 27 are diagrams of aberrations in an infinity focused state of the fourth numerical example. FIG. 22 and FIG. 23 are diagrams of aberrations in the wide-angle end state. FIG. 24 and FIG. 25 are diagrams of aberrations in the intermediate focal length state. FIG. 26 and FIG. 27 are diagrams of aberrations in the telephoto end state.

In FIGS. 22 to 27, a solid line in astigmatism diagrams represents values on a sagittal image surface and a broken line in the astigmatism diagrams represents values on a meridional image surface, and A in lateral aberration diagrams denotes an angle of view (half angle of view) and y in the lateral aberration diagrams denotes image height.

It is clear from the aberration diagrams that the fourth numerical example excellently corrects various aberrations, and has excellent image forming performance.

Fifth Embodiment

Fifth Numerical Example

Figure 28:
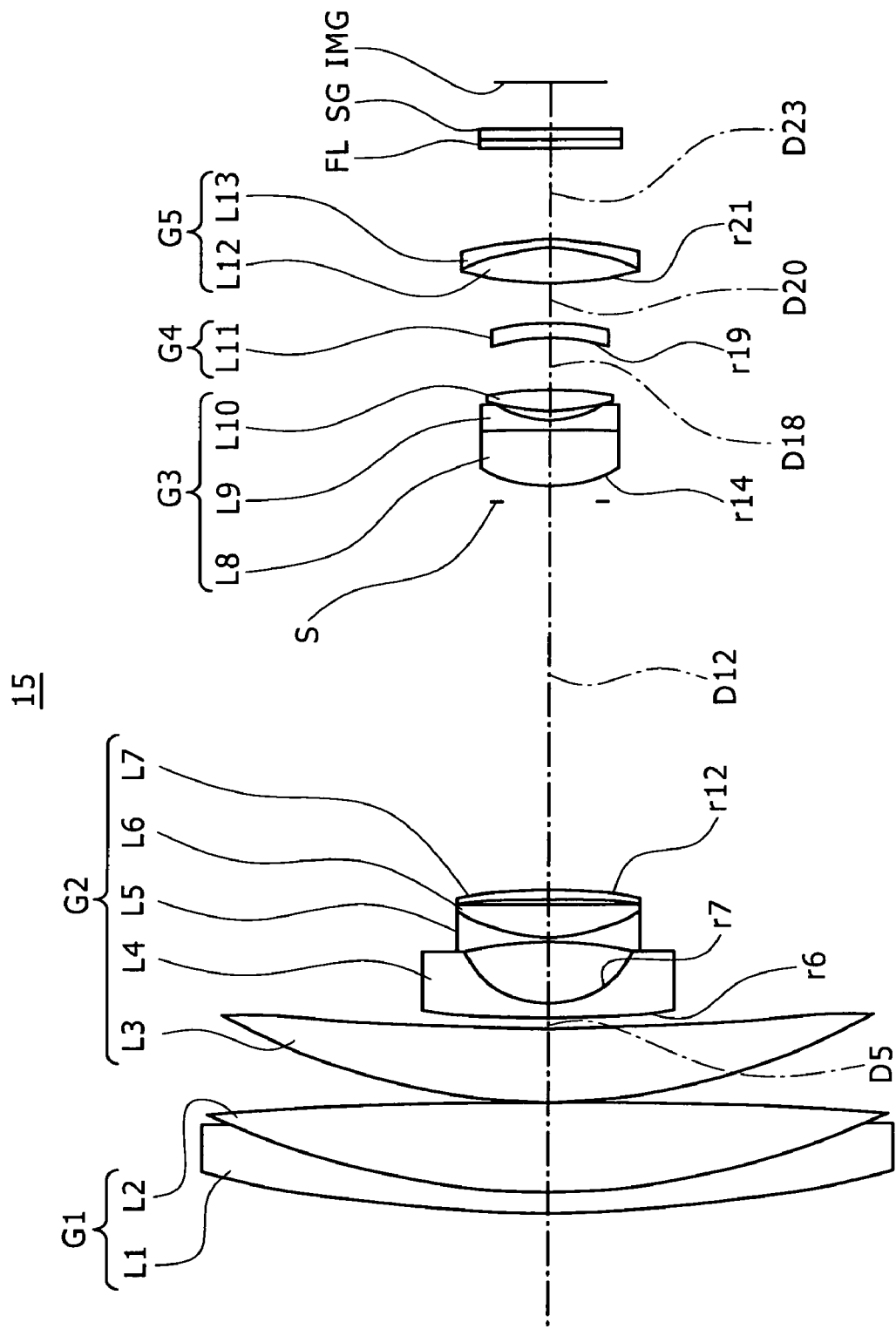
FIG. 28 is a diagram showing a lens configuration of a fifth embodiment of the variable focal length lens system according to the present invention.

FIG. 28 shows a lens configuration of a variable focal length lens system 15 according to a fifth embodiment. The variable focal length lens system 15 has 13 lenses. A first lens group G1 is formed by arranging a cemented lens formed by joining together a negative lens L1 of a meniscus shape having a convex surface facing an object side and a positive lens L2 of a biconvex shape and a positive lens L3 of a meniscus shape having a convex surface facing the object side in order from the object side to an image side.

A second lens group G2 is formed by arranging a negative lens L4 having a concave surface facing the image side, a cemented lens formed by joining together a negative lens L5 of a biconcave shape and a positive lens L6 of a biconvex shape, and a positive lens L7 of a meniscus shape having a convex surface facing the image side in order from the object side to the image side.

A third lens group G3 is formed by arranging a cemented lens formed by joining together a positive lens L8 of a biconvex shape and a negative lens L9 of a biconcave shape and a positive lens L10 of a biconvex shape in order from the object side to the image side.

A fourth lens group G4 is formed by a negative lens L11 of a meniscus shape having a concave surface facing the object side.

A fifth lens group G5 is formed by a cemented lens formed by joining together a positive lens L12 of a biconvex shape and a negative lens L13 of a meniscus shape having a concave surface facing the object side.

An aperture stop S is disposed on the object side of the third lens group, and moves integrally with the third lens group.

A filter FL and a seal glass SG are disposed between the fifth lens group G5 and an image surface IMG.

Table 17 shows lens data of a fifth numerical example in which concrete numerical values are applied to the variable focal length lens system 15 according to the fifth embodiment.

TABLE 17

| SURFACE NUMBER (r) | RADIUS OF CURVATURE | SURFACE INTERVAL | INDEX OF REFRACTION | ABBE NUMBER |
|---|---|---|---|---|
| 1 | 109.946 | 1.4 | 1.91082 | 35.25 |
| 2 | 52.606 | 6.5 | 1.497 | 81.61 |
| 3 | −327.243 | 0.1 | | |
| 4 | 46.805 | 5.0 | 1.59282 | 68.63 |
| 5 | 178.822 | (D5) | | |
| 6 (ASP) | ∞ | 1.2 | 1.88072 | 37.30 |
| 7 (ASP) | 7.839 | 4.221 | | |
| 8 | −26.466 | 0.4 | 1.90366 | 31.32 |
| 9 | 11.655 | 2.565 | 1.94595 | 17.98 |
| 10 | −134.870 | 0.318 | | |
| 11 | −90.396 | 0.8 | 1.88300 | 40.25 |
| 12 (ASP) | −38.27 | (D12) | | |
| 13 | ∞ | 1.1 | (APERTURE STOP) | |
| 14 (ASP) | 9.103 | 4.2 | 1.76802 | 49.24 |
| 15 | −284.136 | 0.7 | 1.80610 | 33.27 |
| 16 | 8.604 | 0.627 | | |
| 17 | 20.642 | 1.565 | 1.61800 | 63.4 |
| 18 | −17.477 | (D18) | | |
| 19 (ASP) | −12.433 | 1.0 | 1.82115 | 24.06 |
| 20 | −18.852 | (D20) | | |
| 21 (ASP) | 21.116 | 2.770 | 1.58313 | 59.46 |
| 22 | −12.041 | 0.7 | 1.90366 | 31.32 |
| 23 | −20.520 | (D23) | | |
| 24 | ∞ | 0.43 | 1.516798 | 64.19 |
| 25 | ∞ | 1.0 | 1.552320 | 63.4 |
| 26 | ∞ | (BF) | | |

Formed as an aspheric surface in the variable focal length lens system 15 are both surfaces of the negative lens L4 in the second lens group G2 (surface number 6 and surface number 7), a surface on the image side of the positive lens L7 in the second lens group G2 (surface number 12), a surface on the object side of the positive lens L8 in the third lens group G3 (surface number 14), a surface on the object side of the negative lens L11 in the fourth lens group G4 (surface number 19), and a surface on the object side of the positive lens L12 in the fifth lens group G5 (surface number 21). The aspheric coefficients A, B, C, and D of the 4th order, the 6th order, the 8th order, and the 10th order of the aspheric surfaces in the fifth numerical example are shown in Table 18 together with the conic constant κ.

TABLE 18

| | κ | A | B | C | D |
|---|---|---|---|---|---|
| 6TH SURFACE | 0.000 | 2.7785E−04 | −3.1672E−06 | 1.0217E−08 | 1.3363E−11 |
| 7TH SURFACE | 0.000 | 3.6234E−04 | −5.9267E−07 | 2.3956E−08 | −7.5958E−10 |
| 12TH SURFACE | 0.000 | −7.0810E−05 | 1.1845E−06 | −1.7132E−08 | 0.0 |
| 14TH SURFACE | −0.0935 | −7.9322E−05 | −3.2379E−07 | 0.0 | 0.0 |
| 19TH SURFACE | 0.000 | 4.5668E−05 | 1.1157E−06 | −1.2644E−08 | 0.0 |
| 21ST SURFACE | 0.000 | −4.0958E−05 | −8.3875E−07 | 4.1977E−08 | −6.2284E−10 |

In the variable focal length lens system 15, changed when power is varied between a wide-angle end state and a telephoto end state are a surface interval D5 between the first lens group G1 and the second lens group G2, a surface interval D12 between the second lens group G2 and the aperture stop S, a surface interval D18 between the third lens group G3 and the fourth lens group G4, a surface interval D20 between the fourth lens group G4 and the fifth lens group G5, and a surface interval D23 between the fifth lens group G5 and the filter FL. Each surface interval and variable intervals in the wide-angle end state, an intermediate focal length state, and the telephoto end state of back focus in the fifth numerical example are shown in Table 19 together with an F-number, an angle of view, image height, and total lens length.

TABLE 19

| | WIDE-ANGLE END | INTERMEDIATE FOCAL LENGTH | TELEPHOTO END |
|---|---|---|---|
| FOCAL LENGTH | 4.43 | 22.14 | 150.16 |
| F-NUMBER | 2.87 | 3.77 | 5.01 |
| ANGLE OF VIEW | 82.4 | 19.86 | 2.9 |
| IMAGE HEIGHT | 3.88 | 3.88 | 3.88 |
| TOTAL LENS LENGTH | 81.4 | 112.5 | 143.2 |
| D5 | 0.75 | 36.621 | 68.353 |
| D12 | 27.745 | 6.602 | 1.1 |
| D18 | 4.0 | 9.17 | 11.439 |
| D20 | 2.668 | 5.418 | 16.815 |
| D23 | 7.396 | 14.814 | 6.66 |
| BF | 2.39 | 2.381 | 2.387 |

The starting surface and focal length of each group in the fifth numerical example are shown in Table 20.

TABLE 20

| GROUP | STARTING SURFACE | FOCAL LENGTH |
|---|---|---|
| 1 | 1 | 87.7 |
| 2 | 6 | −8.31 |
| 3 | 13 | 16.42 |
| 4 | 19 | −47.37 |
| 5 | 21 | 22.60 |

Figure 29:
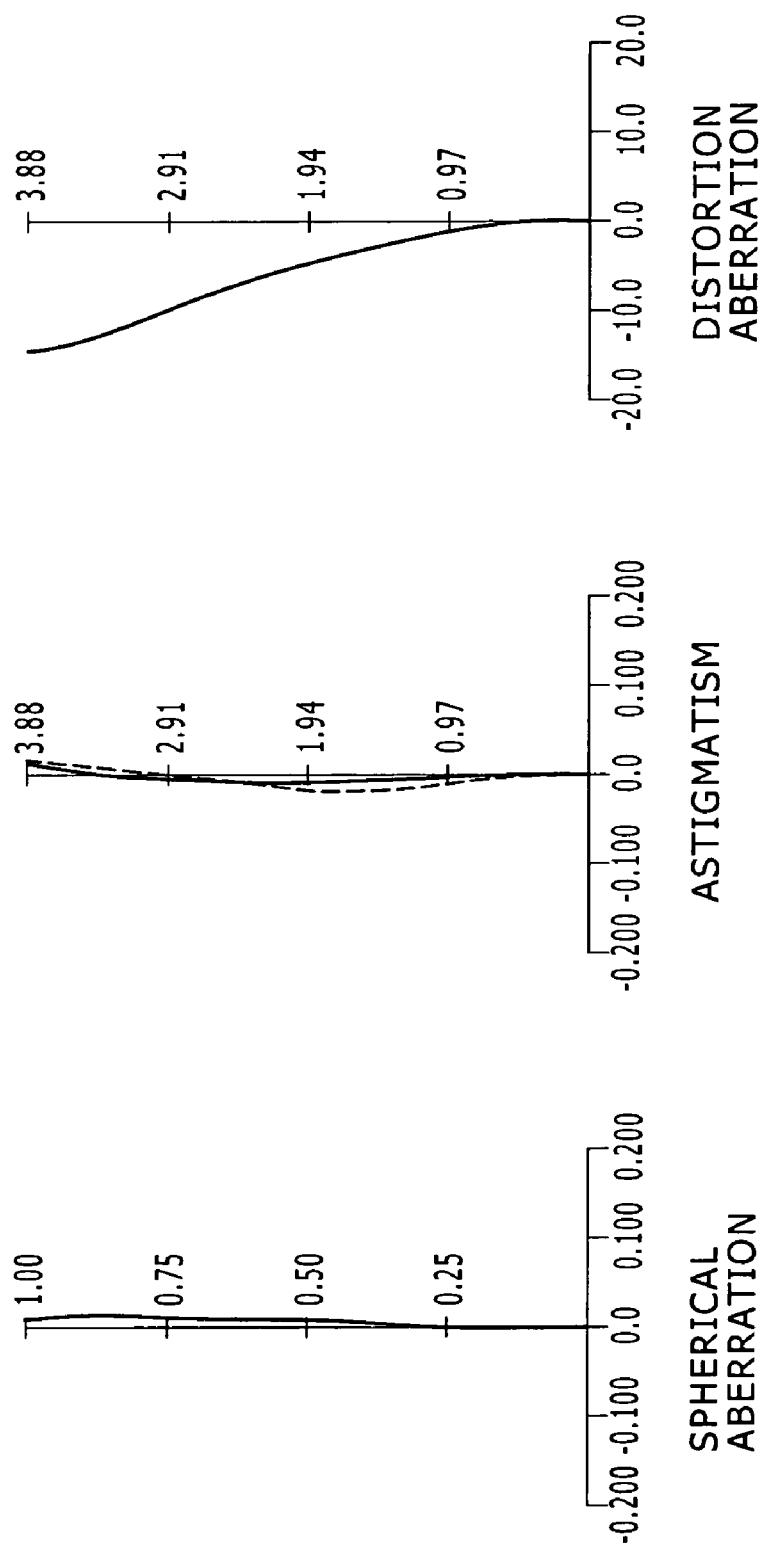
FIG. 29, in conjunction with FIGS. 30 to 34, is a diagram of aberrations of a numerical example in which concrete numerical values are applied to the fifth embodiment, the present diagram showing spherical aberration, astigmatism, and distortion aberration in a wide-angle end state.
Figure 30:
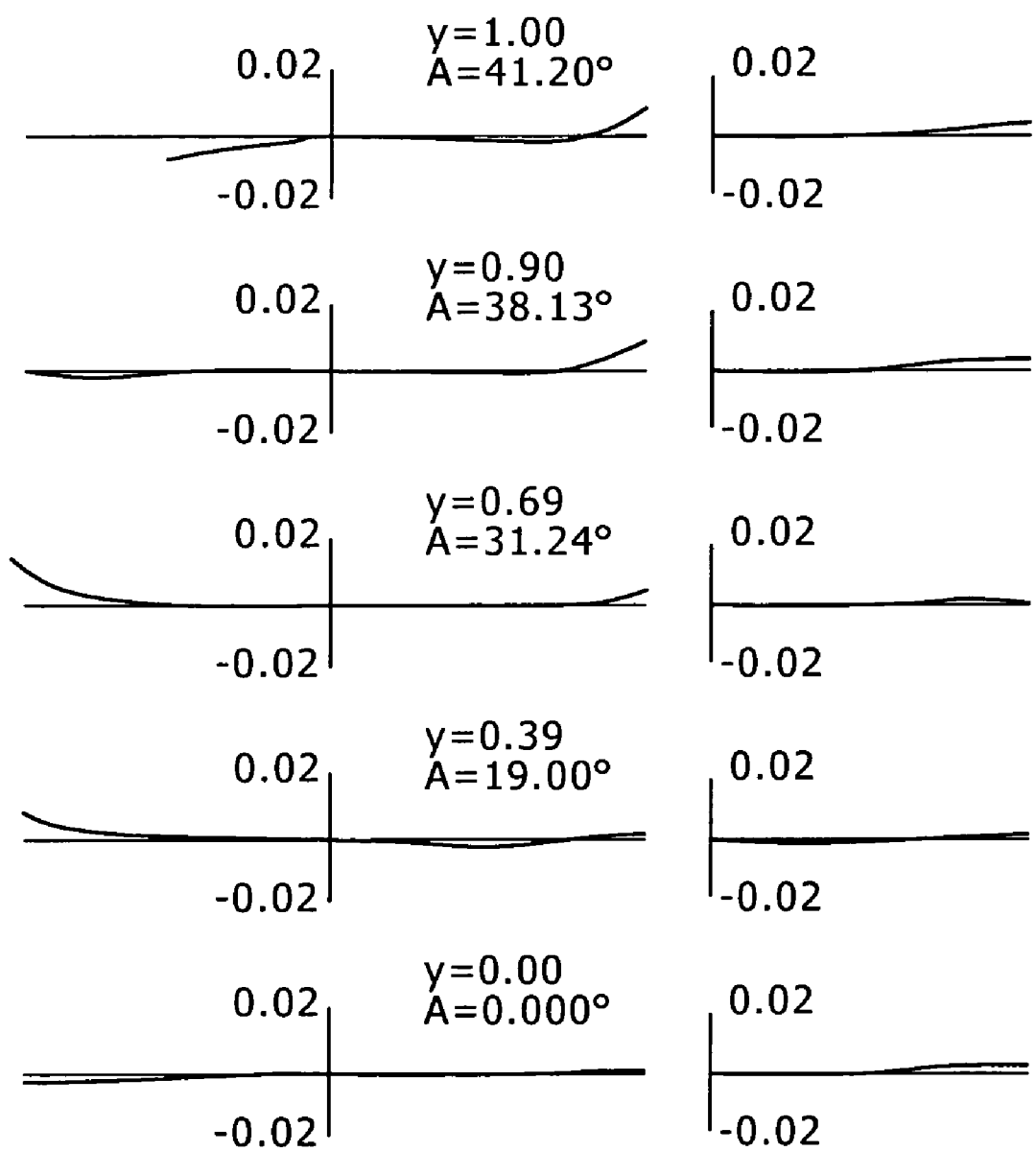
FIG. 30 is a diagram showing lateral aberration in the telephoto end state.
Figure 31:
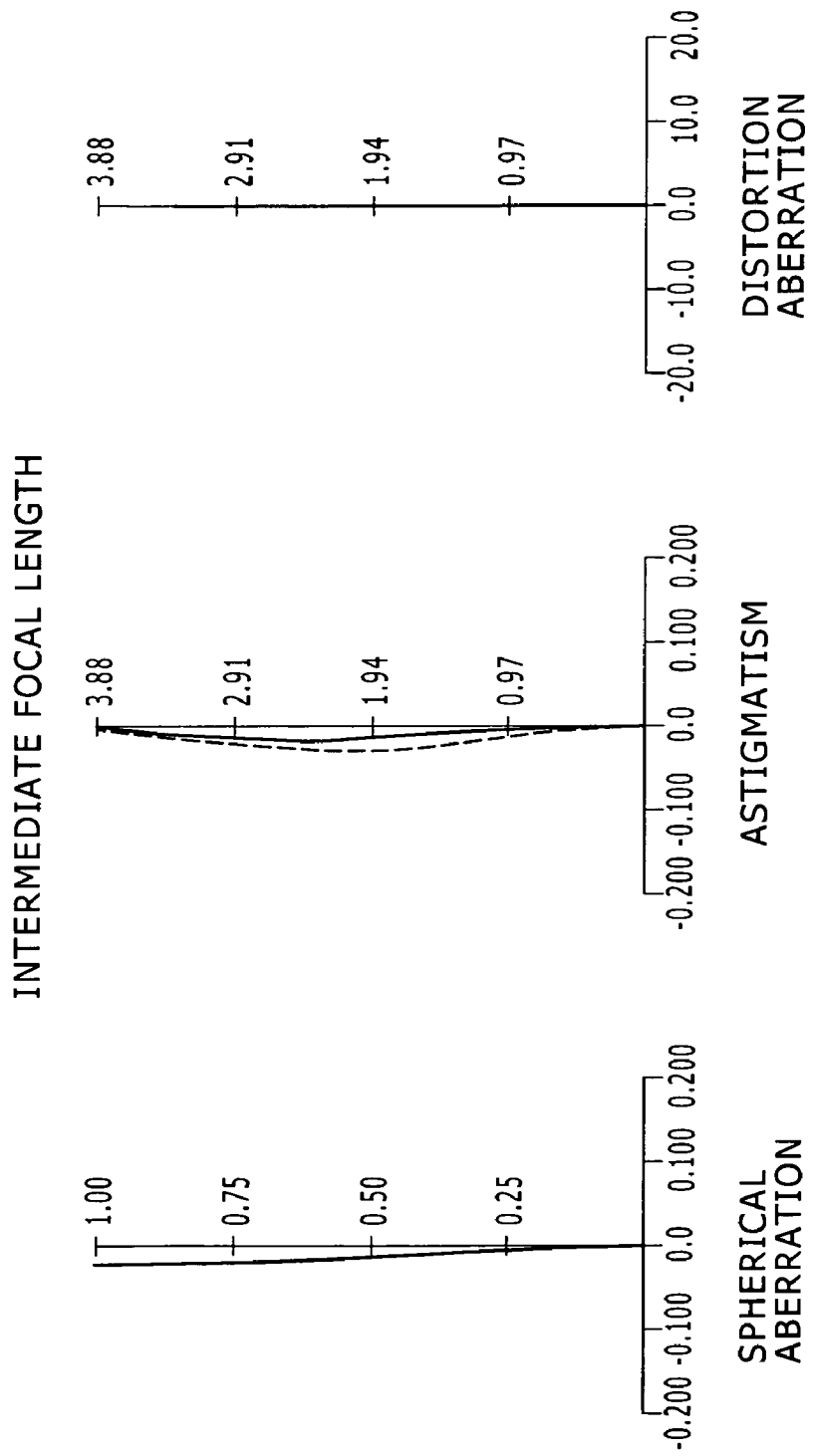
FIG. 31 is a diagram showing spherical aberration, astigmatism, and distortion aberration in an intermediate focal length state.
Figure 32:
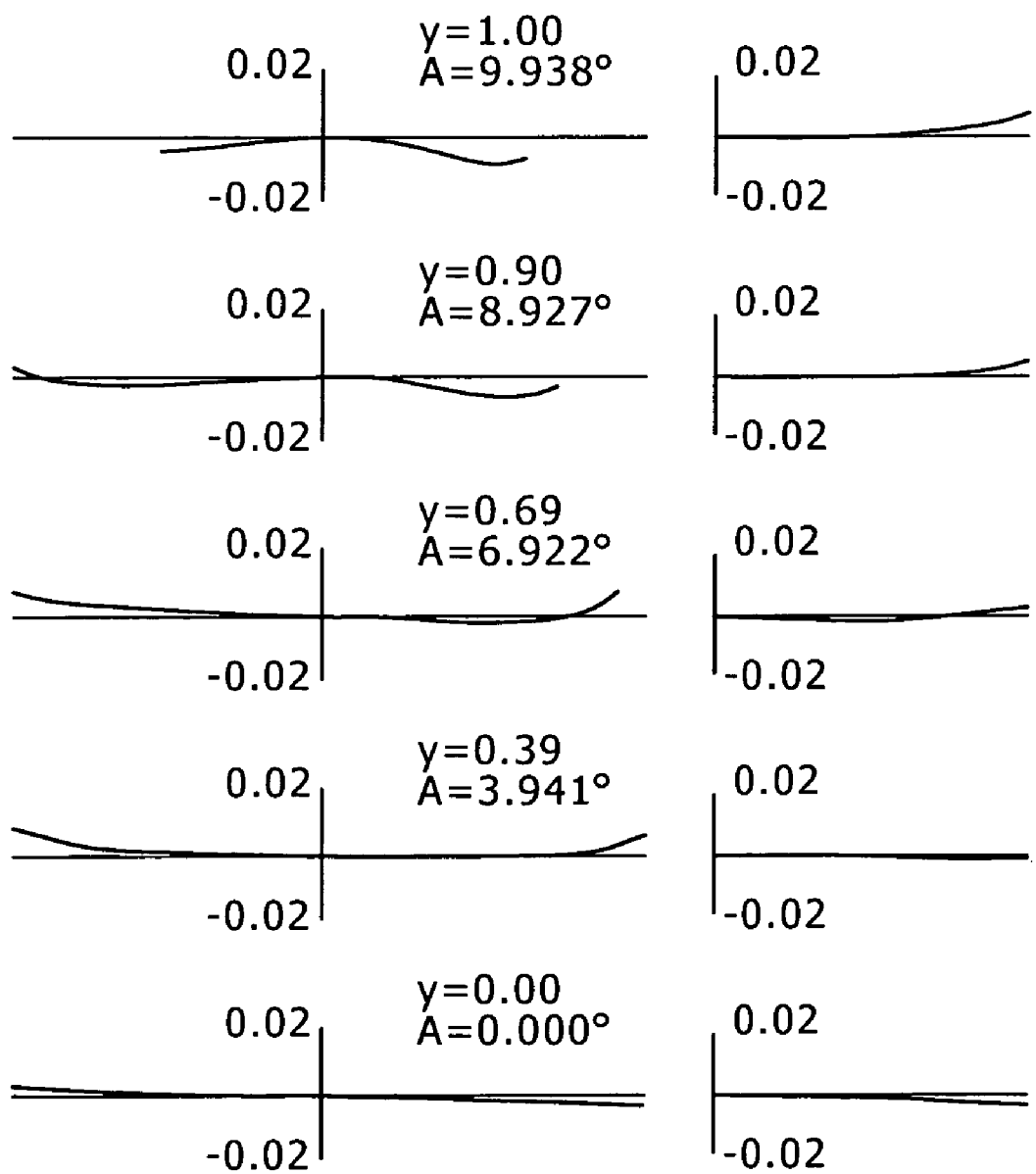
FIG. 32 is a diagram showing lateral aberration in the intermediate focal length state.
Figure 33:
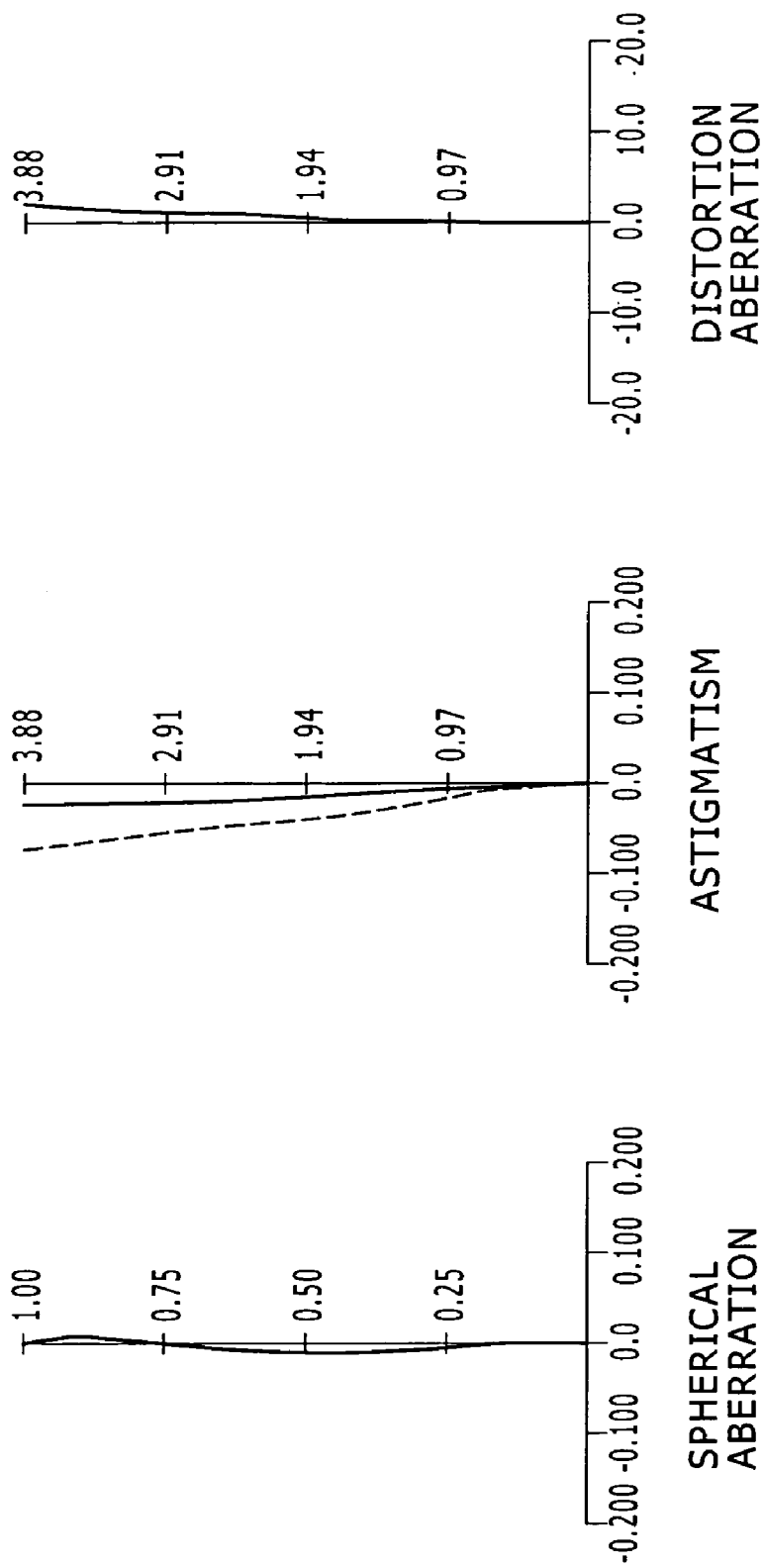
FIG. 33 is a diagram showing spherical aberration, astigmatism, and distortion aberration in a telephoto end state.
Figure 34:
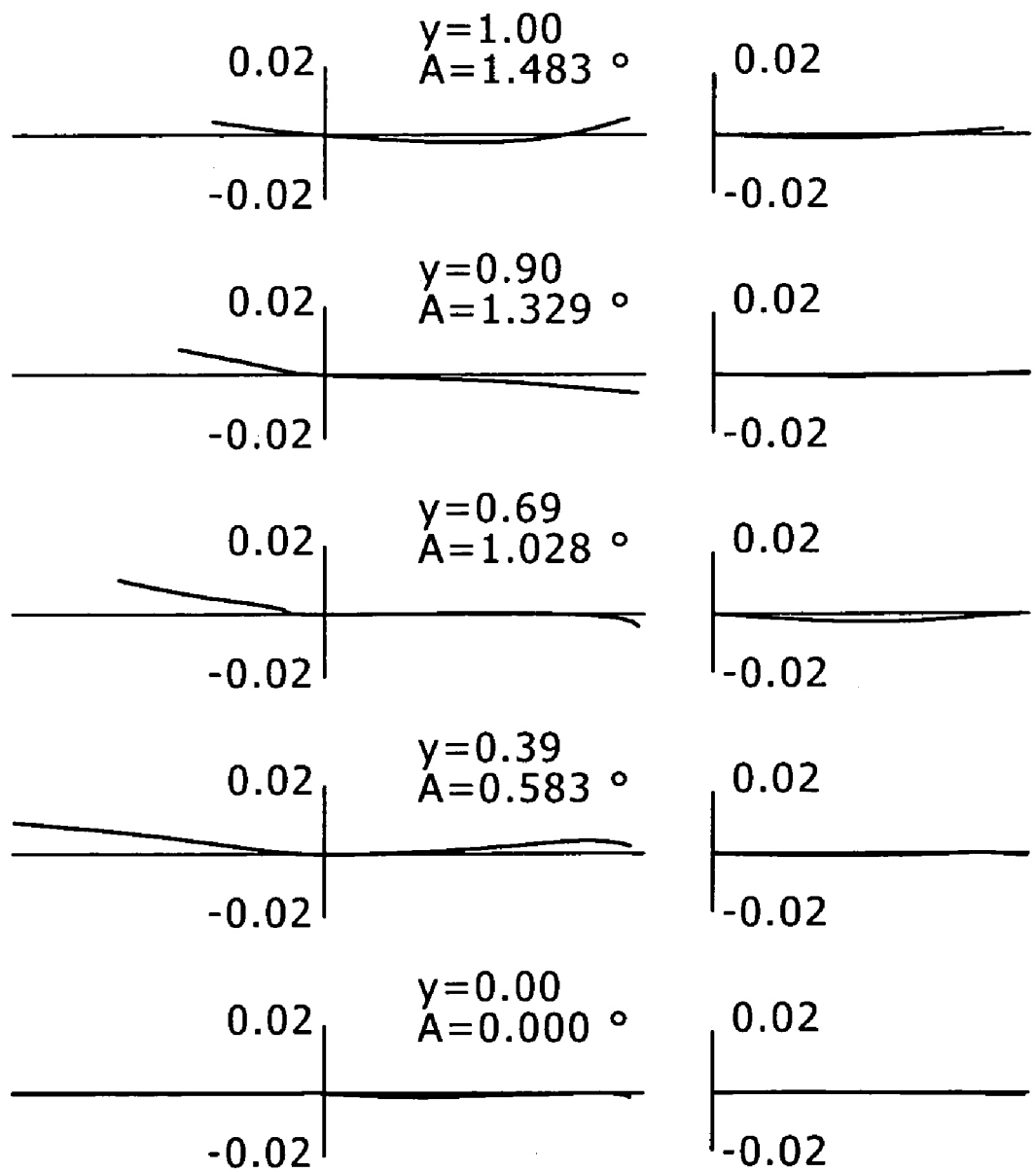
FIG. 34 is a diagram showing lateral aberration in the telephoto end state.

FIGS. 29 to 34 are diagrams of aberrations in an infinity focused state of the fifth numerical example. FIG. 29 and FIG. 30 are diagrams of aberrations in the wide-angle end state. FIG. 31 and FIG. 32 are diagrams of aberrations in the intermediate focal length state. FIG. 33 and FIG. 34 are diagrams of aberrations in the telephoto end state.

In FIGS. 29 to 34, a solid line in astigmatism diagrams represents values on a sagittal image surface and a broken line in the astigmatism diagrams represents values on a meridional image surface, and A in lateral aberration diagrams denotes an angle of view (half angle of view) and y in the lateral aberration diagrams denotes image height.

It is clear from the aberration diagrams that the fifth numerical example excellently corrects various aberrations, and has excellent image forming performance.

[Values of Conditional Expressions in Variable Focal Length Lens Systems]

Table 21 shows values of the conditional expressions (9) to (12) in the variable focal length lens system 14 and the variable focal length lens system 15.

TABLE 21

| | | FOURTH NUMERICAL EXAMPLE | FIFTH NUMERICAL EXAMPLE |
|---|---|---|---|
| | f1 | 67.46 | 87.7 |
| | ft | 148.44 | 150.16 |
| CONDITIONAL EXPRESSION (9) | f1/ft | 0.454 | 0.584 |
| | Δ1 | 30.73 | 61.8 |
| CONDITIONAL EXPRESSION (10) | Δ1/ft | 0.207 | 0.411 |
| | Lt | 128.9 | 143.2 |
| CONDITIONAL EXPRESSION (11) | Lt/ft | 0.868 | 0.953 |
| | f4 | −54.83 | −47.38 |
| | fw | 4.38 | 4.43 |
| CONDITIONAL EXPRESSION (12) | $f4/(fw \cdot ft)^{1/2}$ | −2.15 | −1.84 |

As is clear from Table 21, the variable focal length lens system 14 and the variable focal length lens system 15 satisfy the conditional expressions (9) to (12).

[Constitution of Image Pickup Device According to an Embodiment of the Present Invention Having Variable Focal Length Lens System According to an Embodiment of the Present Invention]

An image pickup device according to an embodiment of the present invention including a variable focal length lens system according to an embodiment of the present invention will be described in the following.

The image pickup device according to the embodiment of the present invention includes a variable focal length lens system and an image pickup element for converting an optical image formed by the variable focal length lens system into an electric signal.

In the image pickup device according to the embodiment of the present invention, the variable focal length lens system is formed by arranging a first lens group having positive refractive power, a second lens group having negative refractive power, a third lens group having positive refractive power, a fourth lens group having negative refractive power, and a fifth lens group having positive refractive power in order from an object side to an image side.

In addition, in the variable focal length lens system of the image pickup device according to the embodiment of the present invention, when a lens position state is changed from a wide-angle end state to a telephoto end state, an interval between the first lens group and, the second lens group is increased, an interval between the second lens group and the third lens group is decreased, an interval between the third lens group and the fourth lens group is increased, and an interval between the fourth lens group and the fifth lens group is changed.

Further, in the variable focal length lens system of the image pickup device according to the embodiment of the present invention, when the lens position state is changed from the wide-angle end state to the telephoto end state, the first lens group, the fourth lens group, and the fifth lens group move in a direction of an optical axis, the second lens group moves to the image side, and the third lens group moves to the object side.

Further, in the variable focal length lens system of the image pickup device according to the embodiment of the present invention, the first lens group is situated on the object side in the telephoto end state as compared with the wide-angle end state, and an aperture stop moves integrally with the third lens group.

In addition, the variable focal length lens system of the image pickup device according to the embodiment of the present invention satisfies the following conditional expressions (9) and (10):

$$0.4 < f1/ft < 0.6 \quad (9)$$

$$0.15 < \Delta 1/ft < 0.45 \quad (10)$$

where f1 is focal length of the first lens group, ft is focal length of the lens system as a whole in the telephoto end state, and $\Delta 1$ is an amount of travel of the first lens group from the wide-angle end state to the telephoto end state.

The conditional expression (9) defines the focal length of the first lens group in the telephoto end state.

When f1/ft exceeds the upper limit of the conditional expression (9), the refractive power of the first lens group becomes too weak. Therefore, a travel distance from the wide-angle end to the telephoto end has to be lengthened to obtain a high variable power ratio, and miniaturization becomes difficult.

When f1/ft is less than the lower limit of the conditional expression (9), on the other hand, the refractive power of the first lens group becomes too strong. Thus, while miniaturization can be achieved, aberration tends to occur in the first lens group, and it is difficult for the second and subsequent lens groups to correct the aberration occurring in the first lens group.

Thus, when the variable focal length lens system satisfies the conditional expression (9), a higher variable power and miniaturization can be achieved, and higher performance can be achieved by suppressing the occurrence of aberration in the first lens group.

The conditional expression (10) defines an amount of travel of the first lens group from the wide-angle end state to the telephoto end state.

When $\Delta 1/ft$ exceeds the upper limit of the conditional expression (10), the amount of travel of the first lens group is increased, an amount of travel of the lens system as a whole is increased, and thus miniaturization becomes difficult.

In a case where $\Delta 1/ft$ is less than the lower limit of the conditional expression (10), on the other hand, aberration tends to occur when the refractive power of the first lens group is strengthened to achieve a higher variable power, so that characteristics are degraded.

Thus, when the variable focal length lens system satisfies the conditional expression (10), a higher variable power and miniaturization can be achieved, and higher performance can be achieved by suppressing the occurrence of aberration.

Incidentally, in the variable focal length lens system of the image pickup device according to the embodiment of the present invention, the fifth lens group moves so as to compensate for variation in image surface position which variation is attendant on the movement of each lens group, and the aperture stop is disposed in the vicinity of the third lens group.

The variable focal length lens system of the image pickup device according to the embodiment of the present invention, being formed as described above, can secure an angle of view in the wide-angle end state of 75 degrees to 95 degrees, a variable power ratio of 30 times to 40 times, and a value of about 2.8 as an F-number in the wide-angle end state.

Thus, miniaturization is ensured and a higher variable power can be achieved. In addition, lens barrel structure can be simplified.

[One Embodiment of Image Pickup Device]

Figure 35:
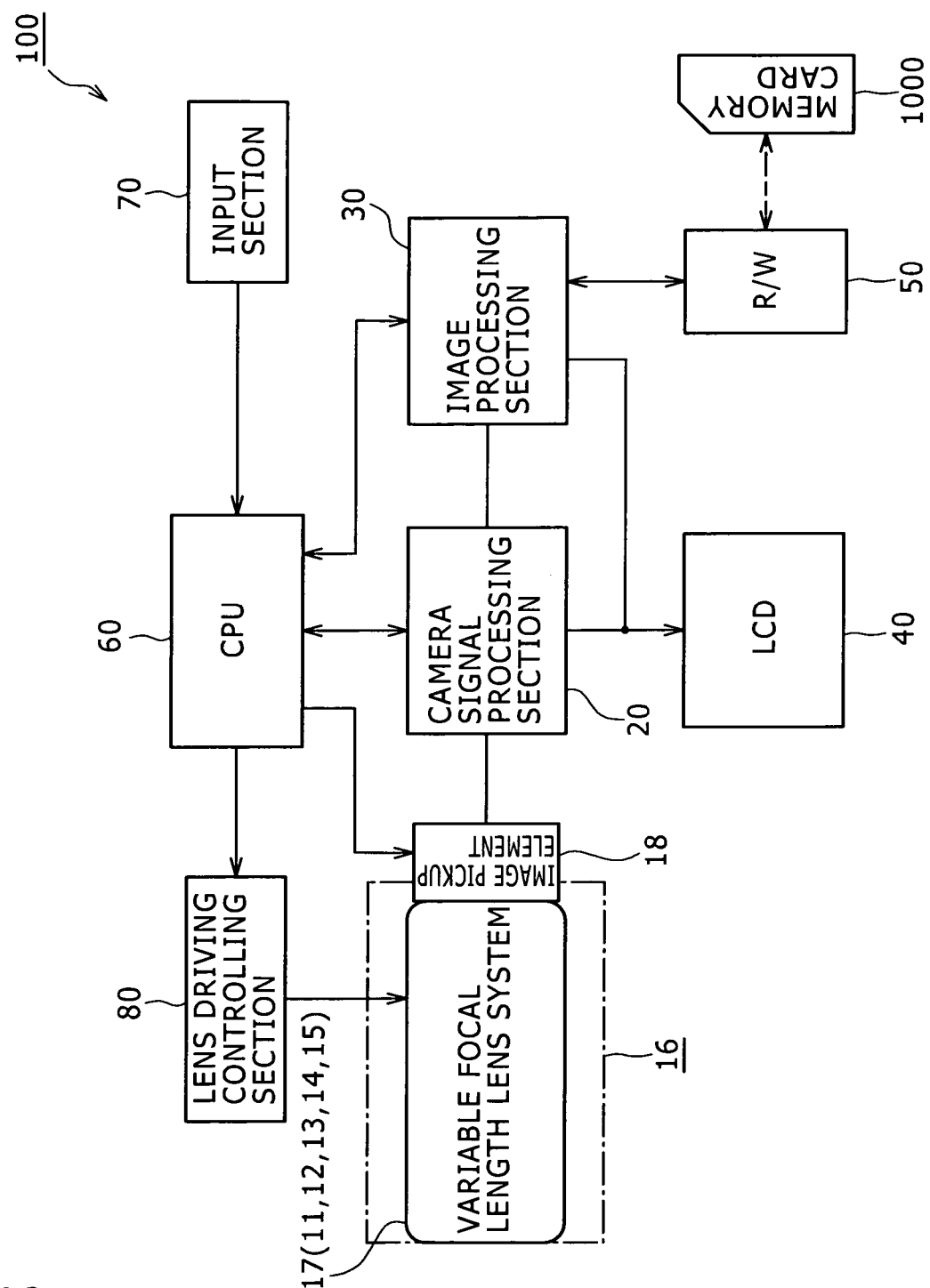
FIG. 35 is a block diagram showing an embodiment of an image pickup device.

FIG. 35 is a block diagram of a digital still camera according to an embodiment of the image pickup device according to the present invention and the image pickup device according to the present invention.

The image pickup device (digital still camera) 100 includes a camera block 16 for performing an image pickup function, a camera signal processing section 20 for subjecting a photographed image signal to signal processing such as analog-to-digital conversion and the like, and an image processing section 30 for recording and reproducing the image signal. The image pickup device 100 also includes an LCD (Liquid Crystal Display) 40 for displaying a photographed image and the like, an R/W (reader/writer) 50 for writing and reading an image signal to and from a memory card 1000, and a CPU (Central Processing Unit) 60 for controlling the whole of the image pickup device 100. The image pickup device 100 further includes an input section 70 formed by various switches and the like on which desired operation is performed by a user and a lens driving control section 80 for controlling the driving of lenses arranged in the camera block 16.

The camera block 16 is formed by an optical system including a variable focal length lens system 17 (the variable focal length lens systems 11, 12, 13, 14, and 15 to which the present invention and the present invention are applied) and an image pickup element 18 such as a CCD (Charge Coupled Device), a CMOS (Complementary Metal Oxide Semiconductor) or the like.

The camera signal processing section 20 performs various signal processing such as conversion of an output signal from the image pickup element 18 into a digital signal, noise removal, image quality correction, conversion into a luminance signal and a color-difference signal, and the like.

The image processing section 30 performs the processing of compression coding and decompression decoding of an image signal on the basis of a predetermined image data format and the processing of conversion of data specifications such as resolution and the like.

The LCD 40 has a function of displaying a state of operation on the input section 70 by the user and various data such as a photographed image and the like.

The R/W 50 writes image data coded by the image processing section 30 to the memory card 1000 and reads image data recorded in the memory card 1000.

The CPU 60 functions as a control processing section for controlling each circuit block provided in the image pickup device 100. The CPU 60 controls each circuit block on the basis of an instruction input signal from the input section 70 and the like.

The input section 70 includes for example a shutter release button for performing shutter operation and a selecting switch for selecting an operation mode. The input section 70 outputs an instruction input signal corresponding to an operation by the user to the CPU 60.

The lens driving controlling section 80 controls a motor and the like not shown in FIG. 35 for driving each lens of the variable focal length lens system 17 on the basis of a control signal from the CPU 60.

The memory card 1000 is for example a semiconductor memory that can be inserted into and removed from a slot connected to the R/W 50.

Operation of the image pickup device 100 will be described in the following.

In a standby state for picture taking, under control of the CPU 60, an image signal photographed by the camera block 16 is output to the LCD 40 via the camera signal processing section 20 to be displayed as a camera-through image. In addition, when an instruction input signal for zooming is input from the input section 70, the CPU 60 outputs a control signal to the lens driving controlling section 80, so that a predetermined lens in the variable focal length lens system 17 is moved on the basis of control of the lens driving controlling section 80.

When a shutter not shown in FIG. 35 within the camera block 16 is operated according to an instruction input signal from the input section 70, a photographed image signal is output from the camera signal processing section 20 to the image processing section 30, subjected to compression coding processing, and converted into digital data in a predetermined data format. The converted data is output to the R/W 50, and written to the memory card 1000.

Incidentally, focusing is for example performed by the moving of a predetermined lens in the variable focal length lens system 17 by the lens driving controlling section 80 on the basis of a control signal from the CPU 60 when the shutter release button of the input section 70 is pressed halfway down or pressed all the way down for recording (photographing).

When image data recorded in the memory card 1000 is reproduced, the R/W 50 reads the predetermined image data from the memory card 1000 according to an operation of the input section 70, and the image processing section 30 subjects the image data to decompression decoding processing. Thereafter, a reproduced image signal is output to the LCD 40, and a reproduced image is displayed.

Other Embodiments

In the foregoing embodiments, description has been made of a case where the aperture stop S is disposed in the vicinity of the third lens group G3 and on the object side of the third lens group G3 in order to reduce the lens diameter of each lens group and excellently correct variation in off-axis aberration which variation is attendant on change in lens position state.

However, the present invention is not limited to this. The aperture stop S may be disposed in the vicinity of the third lens group G3 and on the image side of the third lens group G3.

Further, in the foregoing embodiments, description has been made of a case where the aperture stop is disposed in the vicinity of the third lens group G3 on the object side of the third lens group G3, and is moved integrally with the third lens group G3. However, the present invention is not limited to this. The aperture stop may be moved independently of the third lens group G3 by being driven separately from the third lens group G3.

Further, in the foregoing embodiments, an example has been illustrated in which the image pickup device is applied to a digital still camera. However, the scope of application of the image pickup device is not limited to digital still cameras. The image pickup device is widely applicable as for example a camera section of digital input-output devices such as digital video cameras, portable telephones including a camera, PDAs (Personal Digital Assistants) including a camera, and the like.

The shapes and numerical values of respective parts shown in each of the foregoing embodiments are each a mere example of embodiment for carrying out the present invention, and the technical scope of the present invention is not to be construed in a restricted manner by these shapes and numerical values.

The present application contains subject matter related to that disclosed in Japanese Priority Patent Application JP 2009-245743 filed in the Japan Patent Office on Oct. 26, 2009 and Japanese Priority Patent Application JP 2009-229578 filed in the Japan Patent Office on Oct. 1, 2009, the entire contents of which are hereby incorporated by reference.

What is claimed is:

1. A variable focal length lens system comprising a first lens group having positive refractive power, a second lens group having negative refractive power, a third lens group having positive refractive power, a fourth lens group having negative refractive power, and a fifth lens group having positive refractive power, said first lens group, said second lens group, said third lens group, said fourth lens group, and said fifth lens group being arranged in order from an object side, wherein when a lens position state is changed from a wide-angle end state to a telephoto end state, each lens group moves such that an air interval between said first lens group and said second lens group is increased, an air interval between said second lens group and said third lens group is decreased, an air interval between said third lens group and said fourth lens group is increased, and an air interval between said fourth lens group and said fifth lens group is changed, said second lens group moves to an image side, said third lens group moves to the object side, said first lens group is situated on the object side in the telephoto end state as compared with the wide-angle end state, and an aperture stop is disposed in proximity to said third lens group, and the variable focal length lens system satisfies following conditional expressions (1) to (3):

$$0.95 < f13T/ft < 1.4 \quad (1)$$

$$0.08 < f2/f4 < 0.3 \quad (2)$$

$$0.06 < \Delta 3/ft < 0.22 \quad (3)$$

where f13T is combined focal length of the first to third lens groups in the telephoto end state, ft is focal length of the lens system as a whole in the telephoto end state, f2 is focal length of the second lens group, f4 is focal length of the fourth lens group, and $\Delta 3$ is an amount of travel of the third lens group from the wide-angle end state to the telephoto end state.

2. The variable focal length lens system according to claim 1,
wherein said variable focal length lens system satisfies a following conditional expression (4):

$$0.35 < \beta_{2w} \cdot \beta_{2t} < 0.6 \quad (4)$$

where $\beta_{2w}$ is lateral magnification of the second lens group in the wide-angle end state, and $\beta_{2t}$ is lateral magnification of the second lens group in the telephoto end state.

3. The variable focal length lens system according to claim 1,
wherein said fifth lens group moves in a direction of an optical axis when a subject position changes, and satisfies a following conditional expression (5):

$$0.45 < \beta_{5t} < 0.7 \quad (5)$$

where $\beta_{5t}$ is lateral magnification of the fifth lens group in the telephoto end state.

4. The variable focal length lens system according to claim 1,
wherein said variable focal length lens system satisfies a conditional expression (6):

$$0.3 < f_1/f_t < 0.5 \quad (6)$$

where f1 is focal length of the first lens group.

5. The variable focal length lens system according to claim 4,
wherein said variable focal length lens system satisfies a following conditional expression (7):

$$0.03 < \Delta_1/f_t < 0.2 \quad (7)$$

where $\Delta_1$ is an amount of change of the first lens group in the wide-angle end state and the telephoto end state (a direction from an image surface to the object side is a positive direction).

6. The variable focal length lens system according to claim 1,
wherein said variable focal length lens system satisfies a following conditional expression (8):

$$0.7 < TLt/f_t < 0.9 \quad (8)$$

where TLt is total lens length in the telephoto end state.

7. An image pickup device comprising:
a variable focal length lens system; and
an image pickup element for converting an optical image formed by the variable focal length lens system into an electric signal;
wherein said variable focal length lens system includes a first lens group having positive refractive power, a second lens group having negative refractive power, a third lens group having positive refractive power, a fourth lens group having negative refractive power, and a fifth lens group having positive refractive power, said first lens group, said second lens group, said third lens group, said fourth lens group, and said fifth lens group being arranged in order from an object side, when a lens position state is changed from a wide-angle end state to a telephoto end state, each lens group moves such that an air interval between said first lens group and said second lens group is increased, an air interval between said second lens group and said third lens group is decreased, an air interval between said third lens group and said fourth lens group is increased, and an air interval between said fourth lens group and said fifth lens group is changed, said second lens group moves to an image side, said third lens group moves to the object side, said first lens group is situated on the object side in the telephoto end state as compared with the wide-angle end state, and an aperture stop is disposed in proximity to said third lens group, and
the variable focal length lens system satisfies following conditional expressions (1) to (3):

$$0.95 < f_{13T}/f_t < 1.4 \quad (1)$$

$$0.08 < f_2/f_4 < 0.3 \quad (2)$$

$$0.06 < \Delta_3/f_t < 0.22 \quad (3)$$

where f13T is combined focal length of the first to third lens groups in the telephoto end state, ft is focal length of the lens system as a whole in the telephoto end state, f2 is focal length of the second lens group, f4 is focal length of the fourth lens group, and $\Delta_3$ is an amount of travel of the third lens group from the wide-angle end state to the telephoto end state.

8. A variable focal length lens system formed by arranging a first lens group having positive refractive power, a second lens group having negative refractive power, a third lens group having positive refractive power, a fourth lens group having negative refractive power, and a fifth lens group having positive refractive power in order from an object side to an image side,
wherein when a lens position state is changed from a wide-angle end state to a telephoto end state, said first lens group, said fourth lens group, and said fifth lens group move in a direction of an optical axis, said second lens group moves to the image side, and said third lens group moves to the object side such that an interval between said first lens group and said second lens group is increased, an interval between said second lens group and said third lens group is decreased, an interval between said third lens group and said fourth lens group is increased, and an interval between said fourth lens group and said fifth lens group is changed,
said first lens group is situated on the object side in the telephoto end state as compared with the wide-angle end state,
an aperture stop moves integrally with the third lens group, and
the variable focal length lens system satisfies following conditional expressions (9) and (10):

$$0.4 < f_1/f_t < 0.6 \quad (9)$$

$$0.15 < \Delta_1/f_t < 0.45 \quad (10)$$

where f1 is focal length of the first lens group, ft is focal length of the lens system as a whole in the telephoto end state, and $\Delta_1$ is an amount of travel of the first lens group from the wide-angle end state to the telephoto end state.

9. The variable focal length lens system according to claim 8,
wherein the variable focal length lens system satisfies a following conditional expression (11):

$$0.8 < Lt/f_t < 1.1 \quad (11)$$

where Lt is total length in the telephoto end state.

10. The variable focal length lens system according to claim 8,
wherein the variable focal length lens system satisfies a following conditional expression (12):

$$-2.5 < f_4/(f_w \cdot f_t)^{1/2} < -1.3 \quad (12)$$

where f4 is focal length of the fourth lens group, and fw is focal length of the lens system as a whole in the wide-angle end state.

11. The variable focal length lens system according to claim 8,
wherein said first lens group is formed by a cemented lens formed by joining together a negative lens situated on the object side and a positive lens situated on the image side and a positive lens situated on the image side of the cemented lens.

12. The variable focal length lens system according to claim 8,
wherein said second lens group is formed by a cemented lens formed by joining together a negative lens of a biconcave shape situated on the object side and a positive lens of a biconvex shape situated on the image side and a negative lens of a meniscus shape situated on the object side of the cemented lens and having a concave surface facing the image side.

13. The variable focal length lens system according to claim 8,
wherein said third lens group is formed by a cemented lens formed by joining together a positive lens of a biconvex shape situated on the object side and a negative lens of a biconcave shape situated on the image side and a positive lens situated on the image side of the cemented lens.

14. The variable focal length lens system according to claim 8,
wherein said fourth lens group is formed by a negative lens of a biconcave shape.

15. The variable focal length lens system according to claim 8,
wherein said fifth lens group is formed by a cemented lens formed by joining together a positive lens of a biconvex shape situated on the object side and a negative lens of a meniscus shape situated on the image side and having a concave surface facing the object side.

16. An image pickup device comprising:
a variable focal length lens system; and
an image pickup element for converting an optical image formed by the variable focal length lens system into an electric signal;
wherein said variable focal length lens system is formed by arranging a first lens group having positive refractive power, a second lens group having negative refractive power, a third lens group having positive refractive power, a fourth lens group having negative refractive power, and a fifth lens group having positive refractive power in order from an object side to an image side,
when a lens position state is changed from a wide-angle end state to a telephoto end state, said first lens group, said fourth lens group, and said fifth lens group move in a direction of an optical axis, said second lens group moves to the image side, and said third lens group moves to the object side such that an interval between said first lens group and said second lens group is increased, an interval between said second lens group and said third lens group is decreased, an interval between said third lens group and said fourth lens group is increased, and an interval between said fourth lens group and said fifth lens group is changed,
said first lens group is situated on the object side in the telephoto end state as compared with the wide-angle end state,
an aperture stop moves integrally with the third lens group, and
the variable focal length lens system satisfies following conditional expressions (9) and (10):

$$0.4 < f1/ft < 0.6 \quad (9)$$

$$0.15 < \Delta 1/ft < 0.45 \quad (10)$$

where f1 is focal length of the first lens group, ft is focal length of the lens system as a whole in the telephoto end state, and Δ1 is an amount of travel of the first lens group from the wide-angle end state to the telephoto end state.

* * * * *